United States Patent
Dutta

(10) Patent No.: US 11,095,555 B2
(45) Date of Patent: Aug. 17, 2021

(54) FLEXIBLE LABEL VALUE ENCODING IN LABEL SWITCHED PACKET NETWORKS

(71) Applicant: Nokia Solutions and Networks Oy, Espoo (FI)

(72) Inventor: Pranjal Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 112 days.

(21) Appl. No.: 16/469,415

(22) PCT Filed: Jun. 14, 2018

(86) PCT No.: PCT/IB2018/000745
§ 371 (c)(1),
(2) Date: Jun. 13, 2019

(87) PCT Pub. No.: WO2019/239173
PCT Pub. Date: Dec. 19, 2019

(65) Prior Publication Data
US 2020/0287824 A1  Sep. 10, 2020

(51) Int. Cl.
*G06F 15/16* (2006.01)
*H04L 12/723* (2013.01)
(Continued)

(52) U.S. Cl.
CPC .......... *H04L 45/507* (2013.01); *H04L 45/122* (2013.01); *H04L 45/20* (2013.01); *H04L 45/22* (2013.01); *H04L 45/28* (2013.01)

(58) Field of Classification Search
CPC ..... H04L 45/507; H04L 45/122; H04L 45/20; H04L 45/22; H04L 45/28; H04L 45/64; H04L 45/50
See application file for complete search history.

(56) References Cited

U.S. PATENT DOCUMENTS 9,485,150 B2   11/2016   Filsfils et al.
2002/0091855 A1   7/2002   Yemini et al.
(Continued)

OTHER PUBLICATIONS

Gredler, H. et al., "North-Bound Distribution of Link-State and Traffic Engineering (TE) Information Using BGP", Internet Engineering Task Force, RFC 7752, Mar. 2016, 48 pages.
(Continued)

*Primary Examiner* — Hieu T Hoang
(74) *Attorney, Agent, or Firm* — Tong, Rea, Bentley & Kim, LLC

(57) ABSTRACT

Various example embodiments for supporting packet forwarding in communication networks are described. Various example embodiments for supporting packet forwarding in communication networks may be configured to support packet forwarding in label switched packet networks. Various example embodiments for supporting packet forwarding in label switched packet networks may utilize a variable-sized label value field to encode label values within a header of a label switched packet. Various example embodiments for supporting packet forwarding in label switched packet networks may utilize a variable-sized label value field to encode label values within a label stack in a header of a label switched packet. Various example embodiments for supporting packet forwarding in label switched packet networks may encode a label value within a label stack in a header of a label switched packet using a variable-sized label value field having a size that is based on the label value.

20 Claims, 14 Drawing Sheets

(51) Int. Cl.
    *H04L 12/733*    (2013.01)
    *H04L 12/707*    (2013.01)
    *H04L 12/703*    (2013.01)

(56) References Cited

U.S. PATENT DOCUMENTS

| | | | |
|---|---|---|---|
| 2004/0190517 A1* | 9/2004 | Gupta | H04L 45/48 370/392 |
| 2007/0115913 A1* | 5/2007 | Li | H04L 47/825 370/349 |
| 2007/0274286 A1* | 11/2007 | Krishnan | H04L 69/22 370/351 |
| 2011/0128975 A1* | 6/2011 | Kang | H04L 69/22 370/477 |
| 2011/0216656 A1 | 9/2011 | Pratt, Jr. et al. | |
| 2012/0198064 A1* | 8/2012 | Boutros | H04L 12/18 709/225 |
| 2013/0301656 A1* | 11/2013 | Park | H04L 69/03 370/474 |
| 2013/0336315 A1* | 12/2013 | Guichard | H04L 45/50 370/389 |
| 2014/0269714 A1* | 9/2014 | Bryant | H04L 45/50 370/392 |
| 2015/0003458 A1* | 1/2015 | Li | H04L 12/04 370/392 |
| 2015/0003463 A1* | 1/2015 | Li | H04L 12/4641 370/395.53 |
| 2015/0029837 A1 | 1/2015 | Ashwood-Smith | |
| 2015/0180771 A1 | 6/2015 | Ashwood-Smith | |
| 2015/0207736 A1 | 7/2015 | Roch et al. | |
| 2015/0372903 A1 | 12/2015 | Hui et al. | |
| 2016/0269298 A1 | 9/2016 | Li et al. | |
| 2018/0205642 A1* | 7/2018 | Li | H04L 45/24 |

OTHER PUBLICATIONS

Filsfils, C. et al., "Segment Routing Architecture," draft-ietf-spring-segment-routing-12, Network Working Group, Jun. 20, 2017, 28 pages.
Rosen, E. et al., "Multiprotocol Label Switching Architecture," Network Working Group, RFC 3031, Jan. 2001, 57 pages.
Iana, "Special-Purpose Multiprotocol Label Switching (MPLS) Label Values," https://www.iana.org/assignments/mpls-label-values/mpls-label-values.xhtml), printed on Nov. 26, 2018, 2 pages.
Iana, "IEEE 802 Numbers," https://www.iana.org/assignments/ieee-802-numbers/ieee-802-numbers.xhtm, printed on Nov. 26, 2018, 15 pages.
Previdi, S., et al., "IS-IS Extensions for Segment Routing," draft-ietf-isis-segment-routing-extensions-16, IS-IS for IP Internets, Apr. 19, 2018, 35 pages.
Psenak, P., et al., "OSPF Extensions for Segment Routing," draft-ietf-ospf-segment-routing-extensions-19, Open Shortest Path First IGP, Aug. 25, 2017, 28 pages.
Lindem, A., et al., "Extensions to OSPF for Advertising Optional Router Capabilities," Internet Engineering Rask Force, RFC 7770, Feb. 2016, 15 pages.
Psenak, P., et al., "OSPFv3 Extensions for Segment Routing," draft-ietf-ospf-ospfv3-segment-routing-extensions-10, Open Shortest Path First IGP, Sep. 5, 2017, 36 pages.
Lindem, A., et al., "Extensions to OSPF for Advertising Optional Router Capabilities," Network Working Group, RFC 4970, Jul. 2007, 13 pages.
Previdi, S., et al., "BGP Link-State Extensions for Segment Routing," draft-ietf-idr-bgo-ls-segment-routing-ext-03, Inter-Domain Routing, Jul. 26, 2017, 27 pages.
Iana, "Border Gateway Protocol—Link State (BGP-LS) Parameters," https://www.iana.org/assignments/bgp-ls-parameters/bgp-ls-parameters.xhtml, printed on Nov. 26, 2018, 6 pages.
Andersson, L. et al., "LDP Specification," Network Working Group, RFC 5036, Oct. 2007, 135 pages.

Thomas, B. et al., "LDP Capabilities," Network Working Group, RFC 5561, Jul. 2009, 12 pages.
Iana, "Label Distribution Protocol (LDP) Parameters," https://www.iana.org/assignments/ldp-namespaces/ldp-namespaces.xhtml, printed on Nov. 26, 2018, 13 pages.
Awduche, D., et al., "RSVP-TE: Extensions to RSVP for LSP Tunnels," Network Working Group, RFC 3209, Dec. 2001, 61 pages.
Rekhter, Y., et al., "Carrying Label Information in BGP-4," Network Working Group, RFC 3107, May 2001, 8 pages.
Iana, "Subsequent Address Family Identifiers (SAFI) Parameters," https://www.iana.org/assignments/safi-namespace/safi-namespace.xhtml, printed on Nov. 26, 2018, 2 pages.
Filsils, C. et al., "Segment Routing with MPLS Data Plane," draft-ietf-spring-segment-routing-mpls-10, Network Working Group, Jun. 22, 2017.
Filsfils, C. et al., "Segment Routing Policy for Traffic Engineering," draft-filsfils-spring-segment-routing-policy-01.txt, Network Working Group, Jul. 3, 2017, 31 pages.
Atlas, A. et al., "Basic Specification for IP Fast Reroute: Loop-Free Alternates," Network Working Group, RFC 5286, Sep. 2008, 32 pages.
Bryant, S., et al., "Remote Loop-Free Alternate (LFA) Fast Reroute (FRR)," Internet Engineering Task Force, RFC 7490, Apr. 2015, 30 pages.
Francois, P., et al., "Topology Independent Fast reroute using Segment Routing," draft-francois-segment-routing-ti-lfa-00, Network Working Group, Nov. 18, 2013, 11 pages.
Pan, P. et al., "Fast Reroute Extensions to RSVP-TE for LSP Tunnels," Network Working Group, RFC 4090, May 2005, 39 pages.
Deering, S., et al., "Internet Protocol, Version 6 (IPv6) Specification," Network Working Group, RFC 2460, Dec. 1998, 37 pages.
Previdi, S. et al., "IPv6 Segment Routing Header (SRH)," draft-ietf-6man-segment-routing-header-07, Network Working Group, Jul. 20, 2017, 34 pages.
Iana, "Internet Protocol Version 6 (IPv6) Parameters," https://www.iana.org/assignments/ipv6-parameters/ipv6-parameters.xhtml, printed on Jun. 10, 2019, 4 pages.
Ginsberg, L. et al., "IS-IS Extensions for advertising Router Information," Internet Engineering Rask Force, RFC 7981, Oct. 2016, 11 pages.
Information Sciences Institute, University of Southern California, "DARPA Internet Program Protocol Specification," Internet Protocol, RFC 791, Sep. 1981, 89 pages.
Iana, "Internet Protocol Version 4 (IPv4) Parameters," https://www.iana.org/assignments/ip-parameters/ip-parameters.xhtml, printed on Jun. 10, 2019, 3 pages.
Iana, "Protocol Numbers," https://www.iana.org/assignments/protocol-numbers/protocol-numbers.xhtml, printed on Jun. 10, 2019, 10 pages.
Katz, D., "IP Router Alert Option," Network Working Group, RFC 2113, Feb. 1997, 4 pages.
IANA, "IANA IPv4 Special-Purpose Address Registry," https://www.iana.org/assignments/iana-ipv4-special-registry/iana-ipv4-special-registry.xhtml, printed on Jun. 10, 2019, 2 pages.
Oran, D., "OSI IS-IS Intra-domain Routing Protocol," Network Working Group, RFC 1142, Feb. 1990, 205 pages.
Iana, "IS-IS TLV Codepoints," https://www.iana.org/assignments/isis-tlv-codepoints/isis-tlv-codepoints.xhtml, printed on Jun. 11, 2019, 14 pages.
Berger, L. et al., "The OSPF Opaque LSA Option," Network Working Group, RFC 5250, Jul. 2008, 18 pages.
Hinden, R. et al., "Unique Local IPv6 Unicast Addresses," Network Working Group, RFC 4193, Oct. 2005, 17 pages.
IANA, "IANA IPv6 Special-Purpose Address Registry," https://www.iana.org/assignments/iana-ipv6-special-registry/iana-ipv6-special-registry.xhtml, printed on Jun. 11, 2019, 2 pages.
Hinden R. et al., "IP Version 6 Addressing Architecture," Network Working Group, RFC 4291, Feb. 2006, 26 pages.
Coltun, R., et al., "OSPF for IPv6," Network Working Group, RFC 5340, Jul. 2008, 95 pages.

(56) References Cited

OTHER PUBLICATIONS

Filsfils, C. et al., "Segment Routing with MPLS Data Plane," draft-ietf-spring-segment-routing-mpls-11, Network Working Group, Oct. 2017, 19 pages.
Moy, J., "OSPF Version 2," Network Working Group, RFC 2328, Apr. 1998, 244 pages.
Psenak, P. et al., "OSPF Extensions for Segment Routing," draft-ietf-ospf-segment-routing-extensions-24, Open Shortest Path First IGP, Dec. 14, 2017, 30 pages.
Psenak, P. et al., "Multi-Topology (MT) Routing in OSPF," Network Working Group, RFC 4915, Jun. 2007, 21 pages.
Braden, R. et al., "Resource ReSerVation Protocol—Version 1 Functional Specification," Network Working Group, RFC 2205, Sep. 1997, 112 pages.
Reynolds, J. et al., "Assigned Numbers," Network Working Group, RFC 1700, Oct. 1994, 230 pages.
International Search Report and Written Opinion mailed in corresponding PCT/IB2018/000745 dated Feb. 5, 2019, 13 pages.

\* cited by examiner

FLEXIBLE LABEL VALUE ENCODING IN LABEL SWITCHED PACKET NETWORKS

CROSS-REFERENCE TO RELATED APPLICATIONS

This application is based on and claims the benefit of International Patent Application No. PCT/IB2018/000745, filed on Jun. 14, 2018, which is hereby incorporated herein by reference in its entirety.

TECHNICAL FIELD

Various example embodiments relate generally to communication networks and, more particularly but not exclusively, to supporting packet forwarding in label switched packet networks.

BACKGROUND

In many communication networks, various communications technologies may be used to support communications.

SUMMARY

Various example embodiments relate generally to supporting packet forwarding in label switched packet networks.

In at least some example embodiments, an apparatus is provided. The apparatus includes at least one processor. The apparatus includes at least one memory including computer program code. The at least one memory and the computer program code are configured to, with the at least one processor, cause the apparatus to at least handle a label switched packet, the label switched packet including a header and a payload, wherein the header includes a label value field encoding a label value, wherein a size of the label value field is based on the label value. In at least some embodiments, the label value is associated with a forwarding context. In at least some embodiments, the size of the label value field is a first size when the label value is within a first range of values, the size of the label value field is a second size when the label value is within a second range of values, or the size of the label value field is a third size when the label value is within a third range of values. In at least some embodiments, the first range of values is 1 to 127, the second range of values is 128 to 16383, and the third range of values is 26384 to 2097151. In at least some embodiments, the label value field includes a set of label units, wherein a quantity of label units in the label value field is based on the label value. In at least some embodiments, the label value field includes one label unit when the label value is within a first range of values, the label value field includes two label units when the label value is within a second range of values, or the label value field includes three label units when the label value is within a third range of values. In at least some embodiments, the label value field encoding the label value includes a label unit. In at least some embodiments, the label unit includes a value field configured to encode at least a portion of the label value and a size indicator field configured to indicate whether a next label unit in the header is part of the label value field or is part of a next label value field encoding a next label value. In at least some embodiments, the value field is a 7-bit field and the size indicator field is a 1-bit field. In at least some embodiments, the header includes a common header portion and a label stack, wherein the label value field is included within the label stack. In at least some embodiments, the common header portion includes a field configured to indicate a length of the label stack and a field configured to indicate whether an additional label is present below the label stack. In at least some embodiments, the header includes a label having a fixed-sized label value field encoding an additional label value. In at least some embodiments, the label encapsulates the header or the header encapsulates the label. In at least some embodiments, to handle the label switched packet, the at least one memory and the computer program code are configured to, with the at least one processor, cause the apparatus to at least generate the header including the label value field, associate the header with the payload to form thereby the label switched packet, and send the label switched packet toward a network element. In at least some embodiments, to handle the label switched packet, the at least one memory and the computer program code are configured to, with the at least one processor, cause the apparatus to at least receive the label switched packet, process the label switched packet based on the header of the label switched packet, and send the label switched packet toward a network element. In at least some embodiments, to handle the label switched packet, the at least one memory and the computer program code are configured to, with the at least one processor, cause the apparatus to at least receive the label switched packet, process the label switched packet based on the header of the label switched packet, and send a payload of the label switched packet toward a network element. In at least some embodiments, to handle the label switched packet, the at least one memory and the computer program code are configured to, with the at least one processor, cause the apparatus to at least encode the label value within the label value field or decode the label value from the label value field. In at least some embodiments, the at least one memory and the computer program code are configured to, with the at least one processor, cause the apparatus to at least support advertisement of control plane information configured to support use of variable-sized label value fields. In at least some embodiments, the control plane information includes at least one of a capability of the apparatus to support use of a variable-sized label value field or label information associated with use of a variable-sized label value field. In at least some embodiments, the control plane information is advertised using at least one of a segment routing control plane or a label switching control plane. In at least some embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some embodiments, the control plane information is advertised using at least one of Label Distribution Protocol (LDP), Resource Reservation Protocol (RSVP)-Traffic Engineering (RSVP-TE), or Border Gateway Protocol. In at least some embodiments, to support advertisement of control plane information configured to support use of variable-sized label value fields, the at least one memory and the computer program code are configured to, with the at least one processor, cause the apparatus to at least generate the control plane information and send the control plane information toward at least one network element. In at least some embodiments, to support advertisement of control plane information configured to support use of a variable-sized label value field, the at least one memory and the computer program code are configured to, with the at least one processor, cause the apparatus to at least receive the control plane information from at least one network element and use the control plane information to support use of the variable-sized label value fields.

In at least some example embodiments, a method is provided. The method includes handling a label switched packet, the label switched packet including a header and a payload, wherein the header includes a label value field encoding a label value, wherein a size of the label value field is based on the label value. In at least some embodiments, the label value is associated with a forwarding context. In at least some embodiments, the size of the label value field is a first size when the label value is within a first range of values, the size of the label value field is a second size when the label value is within a second range of values, or the size of the label value field is a third size when the label value is within a third range of values. In at least some embodiments, the first range of values is 1 to 127, the second range of values is 128 to 16383, and the third range of values is 26384 to 2097151. In at least some embodiments, the label value field includes a set of label units, wherein a quantity of label units in the label value field is based on the label value. In at least some embodiments, the label value field includes one label unit when the label value is within a first range of values, the label value field includes two label units when the label value is within a second range of values, or the label value field includes three label units when the label value is within a third range of values. In at least some embodiments, the label value field encoding the label value includes a label unit. In at least some embodiments, the label unit includes a value field configured to encode at least a portion of the label value and a size indicator field configured to indicate whether a next label unit in the header is part of the label value field or is part of a next label value field encoding a next label value. In at least some embodiments, the value field is a 7-bit field and the size indicator field is a 1-bit field. In at least some embodiments, the header includes a common header portion and a label stack, wherein the label value field is included within the label stack. In at least some embodiments, the common header portion includes a field configured to indicate a length of the label stack and a field configured to indicate whether an additional label is present below the label stack. In at least some embodiments, the header includes a label having a fixed-sized label value field encoding an additional label value. In at least some embodiments, the label encapsulates the header or the header encapsulates the label. In at least some embodiments, handling the label switched packet includes generating the header including the label value field, associating the header with the payload to form thereby the label switched packet, and sending the label switched packet toward a network element. In at least some embodiments, handling the label switched packet includes receiving the label switched packet, processing the label switched packet based on the header of the label switched packet, and sending the label switched packet toward a network element. In at least some embodiments, handling the label switched packet includes receiving the label switched packet, processing the label switched packet based on the header of the label switched packet, and sending a payload of the label switched packet toward a network element. In at least some embodiments, handling the label switched packet includes encoding the label value within the label value field or decoding the label value from the label value field. In at least some embodiments, the method includes supporting advertisement of control plane information configured to support use of variable-sized label value fields. In at least some embodiments, the control plane information includes at least one of a capability to support use of a variable-sized label value field or label information associated with use of a variable-sized label value field. In at least some embodiments, the control plane information is advertised using at least one of a segment routing control plane or a label switching control plane. In at least some embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some embodiments, the control plane information is advertised using at least one of Label Distribution Protocol (LDP), Resource Reservation Protocol (RSVP)-Traffic Engineering (RSVP-TE), or Border Gateway Protocol. In at least some embodiments, supporting advertisement of control plane information configured to support use of variable-sized label value fields includes generating the control plane information and sending the control plane information toward at least one network element. In at least some embodiments, supporting advertisement of control plane information configured to support use of a variable-sized label value field includes receiving the control plane information from at least one network element and using the control plane information to support use of the variable-sized label value fields.

In at least some example embodiments, a non-transitory computer readable medium is provided. The non-transitory computer-readable medium includes program instructions for causing an apparatus to at least handle a label switched packet, the label switched packet including a header and a payload, wherein the header includes a label value field encoding a label value, wherein a size of the label value field is based on the label value. In at least some embodiments, the label value is associated with a forwarding context. In at least some embodiments, the size of the label value field is a first size when the label value is within a first range of values, the size of the label value field is a second size when the label value is within a second range of values, or the size of the label value field is a third size when the label value is within a third range of values. In at least some embodiments, the first range of values is 1 to 127, the second range of values is 128 to 16383, and the third range of values is 26384 to 2097151. In at least some embodiments, the label value field includes a set of label units, wherein a quantity of label units in the label value field is based on the label value. In at least some embodiments, the label value field includes one label unit when the label value is within a first range of values, the label value field includes two label units when the label value is within a second range of values, or the label value field includes three label units when the label value is within a third range of values. In at least some embodiments, the label value field encoding the label value includes a label unit. In at least some embodiments, the label unit includes a value field configured to encode at least a portion of the label value and a size indicator field configured to indicate whether a next label unit in the header is part of the label value field or is part of a next label value field encoding a next label value. In at least some embodiments, the value field is a 7-bit field and the size indicator field is a 1-bit field. In at least some embodiments, the header includes a common header portion and a label stack, wherein the label value field is included within the label stack. In at least some embodiments, the common header portion includes a field configured to indicate a length of the label stack and a field configured to indicate whether an additional label is present below the label stack. In at least some embodiments, the header includes a label having a fixed-sized label value field encoding an additional label value. In at least some embodiments, the label encapsulates the header or the header encapsulates the label. In at least some embodiments, to handle the label switched packet, the non-transitory computer-readable medium includes program instructions for causing the apparatus to at least generate the header including the label value field, associate the header with the payload to form thereby the label switched packet, and send the label switched packet toward a network element. In at least some embodiments, to handle the label switched packet, the non-transitory computer-readable medium includes program instructions for causing the apparatus to at least receive the label switched packet, process the label switched packet based on the header of the label switched packet, and send the label switched packet toward a network element. In at least some embodiments, to handle the label switched packet, the non-transitory computer-readable medium includes program instructions for causing the apparatus to at least receive the label switched packet, process the label switched packet based on the header of the label switched packet, and send a payload of the label switched packet toward a network element. In at least some embodiments, to handle the label switched packet, the non-transitory computer-readable medium includes program instructions for causing the apparatus to at least encode the label value within the label value field or decode the label value from the label value field. In at least some embodiments, the non-transitory computer-readable medium includes program instructions for causing the apparatus to at least support advertisement of control plane information configured to support use of variable-sized label value fields. In at least some embodiments, the control plane information includes at least one of a capability of the apparatus to support use of a variable-sized label value field or label information associated with use of a variable-sized label value field. In at least some embodiments, the control plane information is advertised using at least one of a segment routing control plane or a label switching control plane. In at least some embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some embodiments, the control plane information is advertised using at least one of Label Distribution Protocol (LDP), Resource Reservation Protocol (RSVP)-Traffic Engineering (RSVP-TE), or Border Gateway Protocol. In at least some embodiments, to support advertisement of control plane information configured to support use of variable-sized label value fields, the non-transitory computer-readable medium includes program instructions for causing the apparatus to at least generate the control plane information and send the control plane information toward at least one network element. In at least some embodiments, to support advertisement of control plane information configured to support use of a variable-sized label value field, the non-transitory computer-readable medium includes program instructions for causing the apparatus to at least receive the control plane information from at least one network element and use the control plane information to support use of the variable-sized label value fields.

In at least some example embodiments, an apparatus is provided. The apparatus includes means for handling a label switched packet, the label switched packet including a header and a payload, wherein the header includes a label value field encoding a label value, wherein a size of the label value field is based on the label value. In at least some embodiments, the label value is associated with a forwarding context. In at least some embodiments, the size of the label value field is a first size when the label value is within a first range of values, the size of the label value field is a second size when the label value is within a second range of values, or the size of the label value field is a third size when the label value is within a third range of values. In at least some embodiments, the first range of values is 1 to 127, the second range of values is 128 to 16383, and the third range of values is 26384 to 2097151. In at least some embodiments, the label value field includes a set of label units, wherein a quantity of label units in the label value field is based on the label value. In at least some embodiments, the label value field includes one label unit when the label value is within a first range of values, the label value field includes two label units when the label value is within a second range of values, or the label value field includes three label units when the label value is within a third range of values. In at least some embodiments, the label value field encoding the label value includes a label unit. In at least some embodiments, the label unit includes a value field configured to encode at least a portion of the label value and a size indicator field configured to indicate whether a next label unit in the header is part of the label value field or is part of a next label value field encoding a next label value. In at least some embodiments, the value field is a 7-bit field and the size indicator field is a 1-bit field. In at least some embodiments, the header includes a common header portion and a label stack, wherein the label value field is included within the label stack. In at least some embodiments, the common header portion includes a field configured to indicate a length of the label stack and a field configured to indicate whether an additional label is present below the label stack. In at least some embodiments, the header includes a label having a fixed-sized label value field encoding an additional label value. In at least some embodiments, the label encapsulates the header or the header encapsulates the label. In at least some embodiments, the means for handling the label switched packet includes means for generating the header including the label value field, means for associating the header with the payload to form thereby the label switched packet, and means for sending the label switched packet toward a network element. In at least some embodiments, the means for handling the label switched packet includes means for receiving the label switched packet, means for processing the label switched packet based on the header of the label switched packet, and means for sending the label switched packet toward a network element. In at least some embodiments, the means for handling the label switched packet includes means for receiving the label switched packet, means for processing the label switched packet based on the header of the label switched packet, and means for sending a payload of the label switched packet toward a network element. In at least some embodiments, the means for handling the label switched packet includes means for encoding the label value within the label value field or decode the label value from the label value field. In at least some embodiments, the apparatus includes means for supporting advertisement of control plane information configured to support use of variable-sized label value fields. In at least some embodiments, the control plane information includes at least one of a capability of the apparatus to support use of a variable-sized label value field or label information associated with use of a variable-sized label value field. In at least some embodiments, the control plane information is advertised using at least one of a segment routing control plane or a label switching control plane. In at least some embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some embodiments, the control plane information is advertised using at least one of Label Distribution Protocol (LDP), Resource Reservation Protocol (RSVP)-Traffic Engineering (RSVP-TE), or Border Gateway Protocol. In at least some embodiments, the means for supporting advertisement of control plane information configured to support use of variable-sized label value fields includes means for generating the control plane information and means for sending the control plane information toward at least one network element. In at least some embodiments, the means for supporting advertisement of control plane information configured to support use of a variable-sized label value field includes means for receiving the control plane information from at least one network element and means for using the control plane information to support use of the variable-sized label value fields.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
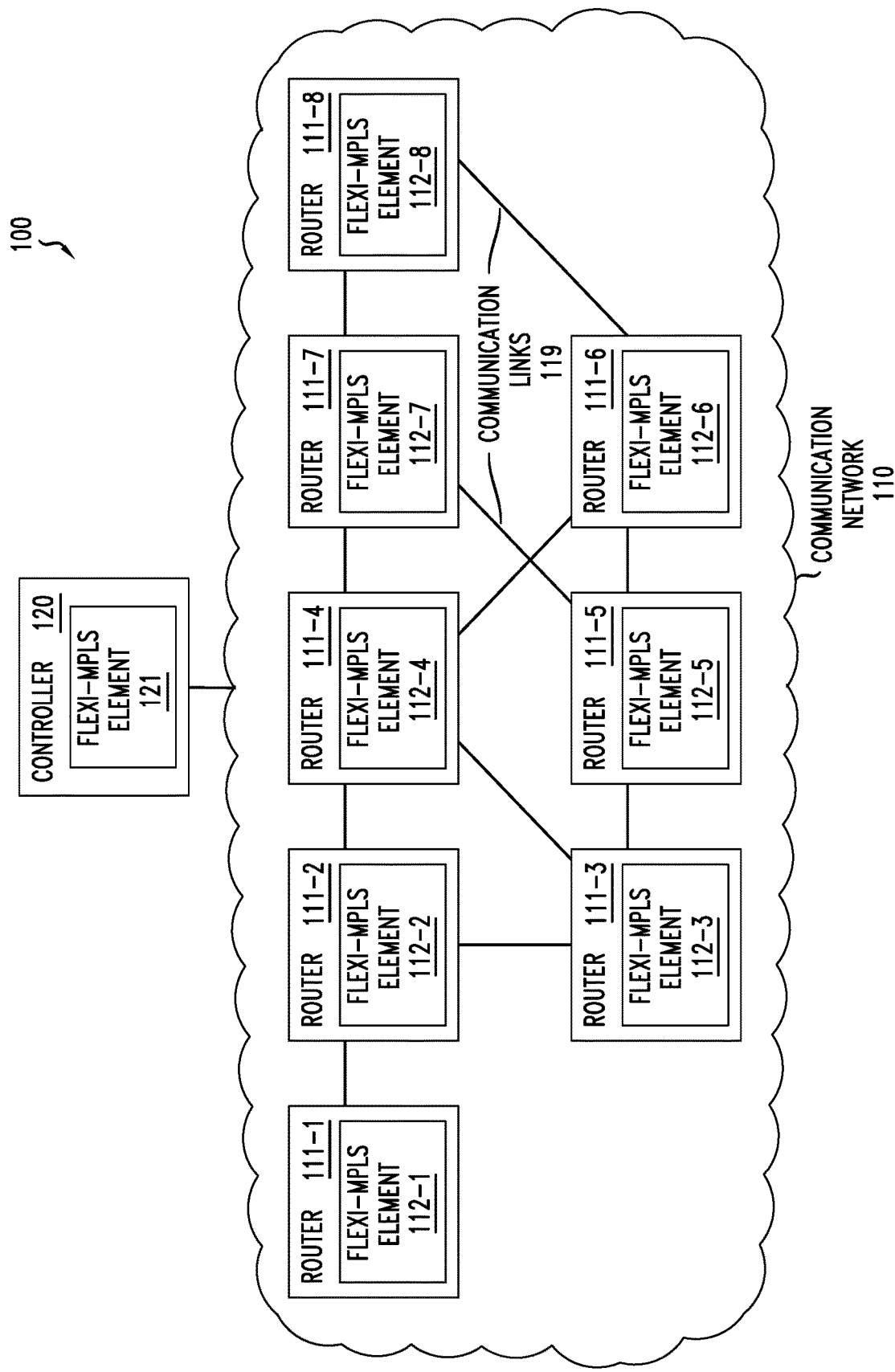
FIG. 1 depicts an example embodiment of a communication system configured to support packet forwarding based on Flexi-MPLS.

Various example embodiments for supporting packet forwarding in communication networks are described. Various example embodiments for supporting packet forwarding in communication networks may be configured to support packet forwarding in label switched packet networks. Various example embodiments for supporting packet forwarding in label switched packet networks may utilize a variable-sized label value field to encode a label value within a header of a label switched packet. Various example embodiments for supporting packet forwarding in label switched packet networks may utilize a variable-sized label value field to encode a label value within a label stack in a header of a label switched packet. Various example embodiments for supporting packet forwarding in label switched packet networks may encode a label value within a label stack in a header of a label switched packet using a variable-sized label value field having a size that is based on the label value. Various example embodiments for supporting packet forwarding in label switched packet networks may encode a label value within a label stack in a header of a label switched packet using a variable-sized label value field having a size that is based on the label value, where the size of the variable-sized label value field depends on where the label value is within a range of potential label values (e.g., using a first size where the label value falls within a first portion of the range of potential label values, using a second size where the label value falls within a second portion of the range of potential label values, or the like). Various example embodiments for supporting packet forwarding in label switched packet networks may encode a label value within a label stack in a header of a label switched packet using a set of label units to provide the variable-sized label value field, where a number of label units included in the set of label units used to encode the label value is based on the label value. Various example embodiments for supporting packet forwarding in label switched packet networks may encode a label value within a label stack in a header of a label switched packet using a variable-sized label value field composed of a set of label units, where a label unit is configured to encode at least a portion of the label value and is configured to indicate a number of label units in the set of label units for the label value and, thus, the number of label units of which the variable-sized label value field is composed. Various example embodiments for supporting packet forwarding in label switched packet networks may enable significant reductions in header overhead for transporting label values within headers of label switched packets. Various example embodiments for supporting packet forwarding in label switched packet networks utilizing variable-sized label value fields to encode label values within headers of label switched packets may be configured to support a control plane configured to support advertisement of control plane information (e.g., router capabilities, label ranges, label mapping information, or the like, as well as various combinations thereof) associated with use of variable-sized label value fields to encode label values within headers of label switched packets. Various example embodiments for supporting packet forwarding in label switched packet networks may be applied for supporting forwarding of label switched packets using Multiprotocol Label Switching (MPLS) and, thus, may be referred to herein as Flexi-MPLS; however, it will be appreciated that various example embodiments for supporting packet forwarding in label switched packet networks may be applied for supporting packet forwarding in label switched packet networks based on various other protocols. It is noted that these and various other example embodiments and potential advantages related to supporting packet forwarding in label switched packet networks may be further understood by way of reference to the various figures, which are discussed further below.

FIG. 1 depicts an example embodiment of a communication system configured to support packet forwarding based on Flexi-MPLS.

The communication system 100 includes a communication network 110 and a controller 120. The communication network 110 is a label switched packet network including a set of routers 111-1-111-8 (collectively, routers 111, which are also referred to herein using the notation Rx) and a set of communication links 119 via which the routers 111 are communicatively connected. The communication network 110 is configured to support various data plane functions and control plane functions for supporting communication of traffic using label switching based forwarding of label switched packets. The controller 120 is configured to provide control functions for the communication network 110 (e.g., computing and installing routes within communication network 110, performing monitoring and rerouting functions for communication network 110, or the like, as well as various combinations thereof). The communication system 100 is configured to support various embodiments for supporting packet forwarding within the communication network 110. Various embodiments for supporting packet forwarding within the communication network 110 may be further understood by first considering various aspects of communication networks.

In general, many packet-switched networks, such as communication network 110, are built on mesh topologies in which there are multiple paths available to reach a given destination. The links in the mesh topology are point-to-point links between routers (illustratively, communication links 119 between routers 111). In general, a path to a destination may go through any number of routers 111 and the path may change at any time due to various conditions (e.g., traffic problems, failed links, failed nodes, or the like). In this type of environment, there are generally at least two possible packet-routing methods available: hop-by-hop destination-based routing and source routing.

In hop-by-hop destination-based routing, a packet has a source address (SA) and a destination address (DA) and, at each router along the route, the router checks the destination address and makes a routing decision as to how to forward the packet based on the DA. Thus, decisions are made on a hop-by-hop basis in the network until the packet reaches its destination. In other words, this scheme is similar to getting directions along the way.

In source routing, also called explicit path addressing, a head-end router may partially or completely specify the route that the packet takes through the network. The head-end router discovers an explicit path for a packet flow through the network (e.g., locally or based on interaction with a controller) in advance of sending packets of the packet flow. The explicit path is "encoded" into the packet and transit routers forward the packet based on that explicit path. In general, as discussed further below, source routing may use a loose source route, a strict source route, or a combination thereof.

In general, source routing, as compared with hop-by-hop destination-based routing, reduces the state information needed in transit nodes in order for the transit nodes to forward a packet, since each transit node typically maintains forwarding information to next-hop nodes (rather than maintaining forwarding information to each possible packet destination, as in hop-by-hop destination-based routing). A generic method of source routing is explained below with respect to FIG. 1.

In FIG. 1, R1 (the head-end router) decides to send a packet along the path R1-R2-R4-R7-R8. For example, in the IPv4 addressing scheme, R8 may be something like 1.1.1.1. In this example, assume that R1, R2, R3 . . . , R8 are loopback addresses assigned as node/router identifiers. So, R1 encodes the explicit path with node identifiers as {R4, R7, R8} into the packet and sends the packet to R2. When R2 receives the packet, it reads and pops the first hop in the explicit path, which is R4, and then forwards the packet to R4 with the explicit path in the packet as {R7, R8}. When R4 receives the packet, it reads and pops the first hop in the explicit path, which is R7, and forwards the packet to R7 with the explicit path {R8}. When R7 receives the packet, it reads and pops the first hop, which is R8, and forwards the packet to R8 without any explicit path. The packet may then be forwarded by destination based routing at R8 and onwards toward the ultimate destination for the packet.

As indicated above, source routing may use a loose source route, in which an intermediate router can choose among multiple paths to reach a specified next hop. For example, if R2 finds that the "optimal" path to R4 is via R2-R3-R4, instead of R3-R4 specified in the packet, then it will not pop R4 from the explicit path and would forward the packet to R3 with the explicit path {R4, R7, R8}. When R3 receives the packet and finds the first hop in the path as R4, it pops R4 since R4 is the immediate next-hop for the packet and sends the packet to R4 with the explicit path {R7, R8}. In other words, when an explicit path includes one or more node identifiers then it may be considered a loose source route since a transit router, for a given node, can choose one among the available paths (e.g., a loopback address of the node) to reach the specified node.

As indicated above, source routing may use a strict source route, in which the head-end router specifies the path that is to be taken by the packet. For example, R1 encodes a set of next-hop identifiers such as {R2->R4, R4->R7, R7->R8} to specify the path to be taken by the packet. A next-hop identifier can be represented by the next-hop address on a link. For example, R2->R4 can be encoded as the IP address on R2-R4 link at the R4 end (conversely, R4->R2 means the IP address on R2-R4 link at the R2 end). Using the IPv4 addressing scheme, it is possible to encode something like R2->R4=10.10.10.2 and R4->R2=10.10.10.1, where the R2-R4 link is assigned the subnet 10.10.10.1/30. It is noted that use of a strict source route may be preferable when a packet belonging to a service or application needs to meet strict QoS requirements or SLAs and, thus, is to follow a strict path with links satisfying the QoS requirements or SLAs.

It is noted that source routing may use a combination of strict source routes and loose source routes. For example, R1 can specify a mix of strict and loose hops such as {R2->R4, R8}.

A variant of strict source routing with constraints is called constraint-based source routing (CBSR), which works as follows. The network includes network elements (e.g., nodes and links) that are arranged in a topology. Various Traffic Engineering (TE) parameters are assigned into the network elements. For example, the TE parameters of a network element may describe characteristics such as cost, delay, throughput, available bandwidth, packet loss, or the like, as well as various combinations thereof. The topology and TE parameters of the network elements are learned by a path computation element (PCE) and are maintained in a centralized TE database (TEDB) hosted by the PCE. For example, the PCE may be an external agent such as an SDN controller, a server, or the like. The PCE can learn the topology and TE parameters by listening to link-state advertisements (LSAs) from one or more Interior Gateway Protocols (IGPs) (e.g., Intermediate System to Intermediate System (IS-IS), Open Shortest Path First (OSPF), OSPF version 3 (OSPFv3), or the like) running among the routers, by using a Border Gateway Protocol (BGP) (e.g., BGP-Link State (BGP-LS), e.g., as defined in RFC 7752, or the like), by using a push/pull mechanism to gather such information from the routers, or the like, as well as various combinations thereof. The head-end router classifies packets into flows based on an application or a service, where each flow may be associated with a specific QoS requirement or SLA. The head-end router sends a request to the PCE for the PCE to compute an explicit path (typically the optimal path) that meets specified QoS requirements or SLA. The PCE typically computes such a path by running a Constraint Shortest Path First (CSPF) process based on the TEDB. Once a path is allocated, the PCE updates the dynamic TE state (e.g., residual bandwidth) of the network elements along that path into the TEDB. The head-end router sends all packets belonging to a flow over the explicit path that meets the QoS requirement/SLA of the flow. The explicit path is encoded into the packet. Thus, it is possible that packets of different flows to the same destination follow diverse paths. It is noted that, since per flow states typically are maintained only at the head-end router, and the transit routers are agnostic of a flow (including the associated QoS requirement/SLA of the flow), this results in significant reduction of cost and complexity at the transit routers.

A technique for providing TE in conjunction with source routing is Segment Routing (SR), which is an innovative technique to provide TE by simplifying control plane operations. SR is described in the IETF draft entitled "Segment Routing Architecture". SR relies on the source routing paradigm and can be deployed in packet networks supporting Multiprotocol Label Switching (MPLS). In SR, packet flows are enforced through a specific path by applying, at the ingress/head-end router, a specifically designed stack of segment identifiers (SIDs) fully compatible with the MPLS data plane. The stack of SIDs is referred to as a segment list and corresponds to the stack of labels in the MPLS architecture. The ingress/head-end router sends a label switched packet with the list of SIDs (stack of labels), where each SID indicates a next-hop to be traversed by the packet. At the transit routers, the top SID in the list is processed during packet forwarding and the packet is forwarded along the shortest path toward the network element represented by the top SID. In SR, a Prefix-SID represents an Equal Cost Multipath (ECMP)-aware shortest-path to a prefix (e.g., IGP-Prefix) which identifies a specific router (e.g., IGP-Node Segment) and an Adjacency-SID represents a hop over a specific adjacency between two nodes in the IGP (e.g., IGP-Adjacency Segment). It is noted that a Prefix Segment is typically a multi-hop path, whereas an Adjacency Segment is typically a one-hop path. Unlike in traditional MPLS networks, SR typically maintains per-flow state only at the ingress/head-end router, where the segment list is applied, and, thus, a signaling protocol (e.g., Resource Reservation Protocol (RSVP)-Traffic Engineering (RSVP-TE)) is not required to populate the forwarding tables of the transit routers. In this way, a simplified control plane is employed (merely relying on the IGP that is properly extended to advertise SIDs as additional attributes of LSAs) such that the scalability of transit routers is greatly improved since MPLS label switched path state information is not required. In SR-Traffic Engineering (SR-TE), a strict-hop path includes a stack of Adjacency-SIDs where each such Adjacency-SID designates a strict hop to be traversed. Thus, a label switched packet traversing 30 strict next-hops will start from the ingress/head-end router with a label stack of 30 labels.

Various example embodiments for supporting packet forwarding in label switched packet networks, as indicated above, are configured to improve the overhead imposed by the label stack in SR-TE. For example, as discussed above, a label switched packet traversing 30 strict hops will initially include an ordered list of 30 labels, where each label represents an Adjacency-SID, in the label stack. At each subsequent hop in the path, the node pops the top label and forwards the packet to the next-hop specified by the popped label. Thus, in the absence of additional labels pushing at transit routers, the amount of labels on the packet will decrease as the packet is sent to each hop in the path (e.g., subsequent hops will see 29 labels, then 28 labels, then 27 labels, and so forth, respectively); however, intermediate hops may push additional labels onto the label stack in certain situations (e.g., such as when performing a Fast Reroute (FRR), in order to the cause the packet to traverse a backup path). In MPLS, an MPLS label is 4 bytes in size and has the following format:

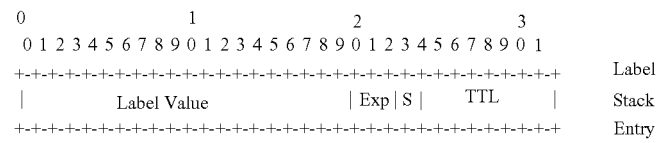

The MPLS label, as indicated above, includes a Label Value field, an Experimental Use field (denoted as Exp), a Bottom of Stack field (denoted as S), and a Time to Live (TTL) field. The Label Value field includes a 20-bit label value. The Experimental Use field is a 3-bit field for experimental use. The Bottom of Stack field is a 1-bit field which indicates whether this label is the last (oldest) label in the label stack. The Time to Live field is an 8-bit field that indicates a TTL value for the packet. In other words, an MPLS label includes 4 bytes. As such, an MPLS header that includes a stack of 30 MPLS labels results in 120 bytes of overhead on the packet. In a packet that includes 1500 bytes (which is the standard Media Transmission Unit (MTU) size in Ethernet), an MPLS header that includes a stack of 30 MPLS labels imposes an 8% overhead penalty, which translates to a loss of 800 megabits per second on a 10 Gigabit per second link. Similarly, if packets smaller than 1500 bytes, such as 512 bytes, are sent across the link, then the overhead penalty of an MPLS header that includes a stack of 30 MPLS labels is 23.4% or 2.30 gigabits per second on a 10 Gigabit per second link. While such overhead may be tolerable in certain networks (e.g., in private networks such as datacenter (DC) networks using intra-DC links links), it may not be able to scale to the economics in SR deployments in public networks (e.g., Software Defined Wide Area Networks (SD-WANs), Inter-Data-Centre networks, or the like). Various example embodiments for supporting packet forwarding in label switched packet networks, as indicated above, are configured to improve the overhead imposed by the MPLS label stack in SR-TE. Various example embodiments for supporting packet forwarding in label switched packet networks are configured to improve the overhead imposed by the MPLS label stack in SR-TE based on use of a variable-sized, rather than a fixed-sized, encoding of label values in the MPLS data plane.

Various example embodiments for supporting packet forwarding in label switched packet networks may utilize a variable-sized label value field to encode label values within a header of a label switched packet for use in forwarding of the label switched packet in the MPLS data plane.

The label value for a label switched packet in a label switched packet network is generally associated with or indicative of a forwarding context for forwarding of the label switched packet in the data plane of the label switched packet network. In MPLS, for example, the forwarding context for a label value typically is referred to as a Forwarding Equivalence Class (FEC), where a FEC may be any object to which the label value is assigned (e.g., an adjacency/next-hop between directly connected routers (which is called a Adjacency-Segment-Id in SR), a routable prefix (which is called a Prefix-Segment-Id in SR), a virtual private network (VPN) instance, a virtual private routed network (VPRN) instance, a virtual private local area network (LAN) service (VPLS) instance, a pseudowire (PW), an IGP area, an autonomous system (AS), or the like, as well as various combinations thereof). It will be appreciated that, in other protocols (e.g., other label switching protocols in label switched packet networks or other protocols using labels for forwarding of packets in the data plane), the forwarding context may represent other objects to which the associated label value may be assigned.

The variable-sized encoding of label values in the MPLS data plane may be performed for label switched packets. A label switched packet includes a header and a payload. The payload of the label switched packet may be any data which may be transported within a label switched packet (e.g., data, packets (e.g., Internet Protocol (IP) packets, MPLS packets, Ethernet packets, or the like), or the like). The header of the label switched packet may be a header configured to support variable-sized encoding of label values. The variable-sized encoding of label values may be based on use of a header that includes a common portion and a label stack portion. The common portion of the header may include various fields including information common to the label stack portion. The label stack portion of the header may include one or more variable-sized encodings of one or more label values. The header of the label switched packet, as indicated above, may be used to encapsulate a payload (e.g., any suitable type of packet or data) to be transported based on the header.

The variable-sized encoding of a label value may be based on use of a variable-sized label value field. The variable-sized label value field may have a size that is based on the label value. The variable-sized label value field may be considered to be variable in that the size of the label value field may be different for different label values. The label value field may be a first size (e.g., 1 octet or other suitable size) when the label value is within a first range of values (e.g., 1 to 127 or other suitable range of label values), a second size (e.g., 2 octets or other suitable size) when the label value is within a second range of values (e.g., 128 to 16383 or other suitable range of label values), or a third size (e.g., 3 octets or other suitable size) when the label value is within a third range of values (e.g., 26384 to 2097151 or other suitable range of label values). It is noted that a variable-sized label value field encoding a label value may be composed of a set of one or more other fields.

The variable-sized encoding of a label value may be based on use of a variable-sized label value field that includes a set of label units, where a quantity of label units included in the set of label units used to encode the label value is based on the label value. The label value field may include one label unit (e.g., of 1 octet or other suitable size) when the label value is within a first range of values (e.g., 1 to 127 or other suitable range of label values), two label units (e.g., 1 octet each or other suitable size) when the label value is within a second range of values (e.g., 128 to 16383 or other suitable range of label values), or three label units (e.g., 1 octet each or other suitable size) when the label value is within a third range of values (e.g., 26384 to 2097151 or other suitable range of label values). The variable-sized label value field may be provided using a set of label units, where a label unit is configured to encode at least a portion of the label value (e.g., all or part of a label value depending on the label value) and is configured to indicate a number of label units in the set of label units for the label value (e.g., one to three label units). It is noted that the label units may be considered to be fields of the label stack portion of the header (and, again, that a set of label units encoding a given label value may be referred to collectively as providing as a label value field for encoding the given label value).

The improvements in overhead that may be achieved based on use of a variable-sized encoding of label values in the MPLS data plane may be further understood by way of some examples. For example, the use of variable-sized label values encoded using 1 to 3 octets enables the MPLS label stack overhead in SR to be reduced by up to 75% (e.g., where 1 LU is used, rather than a fixed-sized 4-octet MPLS header, for each of the label values in the label stack) or at least by a minimum of 25% (e.g., where 3 LUs are used, rather than a fixed-sized 4-octet MPLS header, for each of the label values in the label stack). For example, where a router has no more than 112 next-hops, since Adjacency-SIDs are locally significant to the router, each of Adjacency-SID labels distributed by the router could be encoded in 1 octet. In a typical SR-TE deployment, 112 next-hops in a router is more than sufficient. Similarly, for example, if all routers in the network have no more than 112 next-hops, then any SR-TE path across the network can be encoded within labels that are 1 octet is size.

Various example embodiments for supporting packet forwarding in label switched packet networks are configured to support use of variable-sized label values in the MPLS data plane based on use of control plane capabilities for distributing control plane information (e.g., label mappings (e.g., SIDs), router capabilities, SID-label bindings, or the like, as well as various combinations thereof) for the variable-sized labels being used in the MPLS data plane. The control plane capabilities may include control plane capabilities for providing an SR control plane for Flexi-MPLS (e.g., using IGPs (e.g., IS-IS, OSPF, OSPFv3, or the like), using BGPs (e.g., BGP-LS or the like), or the like, as well as various combinations thereof), control plane capabilities for signaling Flexi-MPLS in the MPLS control plane (e.g., using MPLS control plane protocols, such as Label Distribution Protocol (LDP), RSVP-TE, BGP, or the like, as well as various combinations thereof), or the like, as well as various combinations thereof.

The architecture supporting use of variable-sized labels in the MPLS data plane and use of control plane capabilities for distribution of control plane information for the variable-sized label values in the MPLS data plane is referred to herein as Flexible MPLS (Flexi-MPLS), such that the label space supporting use of Flexi-MPLS may be referred to as the Flexi-MPLS label space, the data plane supporting use of Flexi-MPLS may be referred to as the Flexi-MPLS data plane, the control plane supporting use of Flexi-MPLS may be referred to as the Flexi-MPLS control plane, and so forth. It is noted that, unless indicated otherwise herein, "MPLS" refers to traditional MPLS that uses a fixed-sized 4-octet MPLS header in the data plane (including a fixed-sized 20-bit label value field), whereas Flexi-MPLS refers to use of a variable-sized MPLS header in the data plane and associated capabilities supporting use of a variable-sized MPLS header in the data plane (e.g., label allocation from the Flexi-MPLS label space, data plane functions supporting use of a variable-sized label value field for transport of a label value, control plane functions for distribution of control plane information for the variable-sized labels in the Flexi-MPLS label space, or the like, as well as various combinations thereof).

As depicted in FIG. 1, the communication system 100 is configured to support various example embodiments for supporting packet forwarding in label switched packet networks. The routers 111-1-111-8 include Flexi-MPLS elements 112-1-112-8 (collectively, Flexi-MPLS elements 112), respectively. The Flexi-MPLS elements 112 of the routers 111 may be configure to provide various functions of various embodiments for supporting packet forwarding in label switched packet networks as presented herein (e.g., Flexi-MPLS data plane functions, Flexi-MPLS control plane functions, or the like, as well as various combinations thereof). The controller 120 includes a Flexi-MPLS element 121. The Flexi-MPLS element 121 of the controller 120 may be configure to provide various functions of various embodiments for supporting packet forwarding in label switched packet networks as presented herein (e.g., Flexi-MPLS label space management functions, Flexi-MPLS control plane functions, or the like, as well as various combinations thereof).

Various example embodiments for supporting packet forwarding in label switched packet networks are configured to support a Flexi-MPLS label space.

The Flexi-MPLS label space supports label values which may be used within the Flexi-MPLS data plane. The Flexi-MPLS label space may be independent of the MPLS label space, such that MPLS label values may be allocated from the MPLS label space and Flexi-MPLS label values may be allocated from the Flexi-MPLS label space). The label spaces of MPLS and Flexi-MPLS may overlap (i.e., the same label values may be used in both label spaces, since the encoding of the label values may be performed in a way that enables routers to distinguish between label values of the different label spaces). This approach allows a router to support MPLS and Flexi-MPLS data planes together.

It is noted that, in MPLS, the Internet Assigned Numbers Authority (IANA) reserves label values 1 to 15 as special purpose labels. These special purpose labels also may be applicable to the Flexi-MPLS label space (e.g., when those labels appear within the Flexi-MPLS label stack, then the meaning and functionality of those labels may be the same as defined in MPLS).

In Flexi-MPLS, label values from 16 onwards are available for dynamic allocation from the Flexi-MPLS label space. A router may begin distributing labels in Flexi-MPLS label space in ascending order (e.g., starting from 16). This ensures that, as long as a router distributes fewer than 113 Flexi-MPLS labels (e.g., only labels in the range from 16 to 127), that each of those labels can be encoded with a single label unit.

Various example embodiments for supporting packet forwarding in label switched packet networks are configured to support a Flexi-MPLS data plane.

A Flexi-MPLS data plane may support use of a Flexi-MPLS packet including a Flexi-MPLS header and an associated payload. The payload may be any payload which may be transported using a Flexi-MPLS header (e.g., data, a packet, or the like). The Flexi-MPLS header may include a common header portion and a Flexi-MPLS label stack. The Flexi-MPLS header may be formatted as follows:

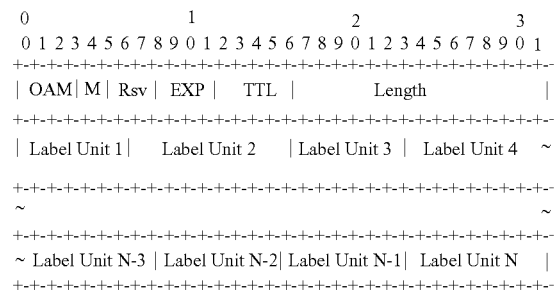

The Flexi-MPLS Header, as indicated above, includes a set of common header fields (illustratively, in the first four octets which include fields denoted as OAM, M, Rsv, EXP, TTL, and Length) followed by a Flexi-MPLS label stack including a set of labels values encoded using a set of N label units (LUs) (illustratively, Label Unit 1 (LU-1) through Label Unit N (LU-N).

The common header fields of the Flexi-MPLS Header, as indicated above, include an Operations, Administration, and Maintenance (OAM) field, an MPLS Label indicator field (denoted as M), a Reserved field (denoted as Rsv), an Experimental field (denoted as EXP), a Time to Live (TTL) field, and a Length field.

The OAM field of the common header portion of the Flexi-MPLS Header is a 2-bit field configured for use in indicating whether the label switched packet is an OAM packet. By default, these two bits are set to zero by the originator, and are not modified by other routers. These two bits have no effect on the path taken by a Flexi-MPLS packet, and have no effect on the QoS applied to a Flexi-MPLS packet. These bits are set if the Flexi-MPLS Label Stack carries an OAM packet.

The MPLS Label indicator field of the common header portion of the Flexi-MPLS Header is a 1-bit field configured for use in indicating whether a traditional MPLS label is present below the Flexi-MPLS label stack in the Flexi-MPLS header. For example, a value of "1" may be used to indicate that a traditional MPLS label is present below the Flexi-MPLS label stack in the Flexi-MPLS header. For example, a value of "0" may be used to indicate that the payload of the Flexi-MPLS follows the last label in the Flexi-MPLS label stack in the Flexi-MPLS header.

The Reserved field of the common header portion of the Flexi-MPLS Header is a 2-bit field that is currently unused. These bits are set to zero upon transmission and are ignored upon reception.

The Experimental field of the common header portion of the Flexi-MPLS Header is a 3-bit field that has its usual meaning in an MPLS label stack entry, as described in the MPLS specification (RFC 3031).

The TTL field of the common header portion of the Flexi-MPLS Header is a 1-octet field that has its usual meaning in an MPLS label stack entry, as described in the MPLS specification (RFC 3031). When a Flexi-MPLS packet is received, its "incoming TTL" is taken from this field. If the packet is forwarded to one or more next-hops, the Flexi-MPLS header carried by the forwarded packet may have a TTL field whose value is one less than that of the incoming TTL.

The Length field of the common header portion of the Flexi-MPLS Header is 2-octet field. The Length field includes a value indicative of the total length of the Flexi-MPLS label stack of the Flexi-MPLS header (i.e., excluding the initial four octets of the Flexi-MPLS header). The Length field may specify the total length of the Flexi-MPLS label stack of the Flexi-MPLS header in terms of a number of octets or in terms of a number of LUs included in the Flexi-MPLS label stack.

The Flexi-MPLS label stack of the Flexi-MPLS Header, as indicated above, includes a set of labels values encoded using a set of N LUs (illustratively, Label Unit 1 (LU-1) through Label Unit N (LU-N).

The Flexi-MPLS label stack includes a series of label values which are encoded within the label stack using variable-sized label value fields. The variable-sized encoding of a label value may be based on use of a variable-sized label value field that includes a set of LUs, where a quantity of LUs included in the set of LUs used to encode the label value is based on the label value and where an LU is configured to encode at least a portion of the label value (e.g., all or part of a label value depending on the label value) and is configured to indicate the quantity of LUs in the set of LUs for the label value (e.g., one to three LUs). An LU may be 1 octet in size and may be defined as follows:

```
 0 1 2 3 4 5 6 7
+-+-+-+-+-+-+-+-+
| Value       |N|
+-+-+-+-+-+-+-+-+
```

The LU, as indicated above, includes a Value field and an N field. The Value field of the LU is a 7-bit field that includes all or part of the label value that is being encoded by the LU. The N field of the LU is a 1-bit field that indicates whether the next LU in the label stack is part of the current label value in the label stack or is associated with the next label value in the label stack. If the N field is set (e.g., equal to "1"), this indicates that the next LU in the label stack is part of the current label value of the label stack. If the N field is not set (e.g., equal to "0"), this indicates that the next LU in the label stack is associated with the next label value in the label stack.

The number of LUs used to encode a label value depends on the label value. The number of LUs that are used to encode a label value may be based on the label value as follows: (1) label values from 1 to 127 (inclusive) can be encoded with 1 LU, (2) label values from 128 to 16383 (inclusive) can be encoded with 2 LUs, and (3) label values from 26384 to U.S. Pat. No. 2,097,151 (inclusive) can be encoded with 3 LUs. It is noted that, when a label value uses multiple LUs, the label value may be encoded among LUs in the network byte order.

It is noted that, in a network where all routers originate no more than 112 Adjacency Segments, then each of the Adjacency Segment IDs across the network can be encoded using a single LU and, thus, any SR-TE path in the network would consume 1 LU per label value in the Flexi-MPLS label stack of the Flexi-MPLS header. In the above example (1 LU per label value as indicated above), if a SR-TE path consists of 30 strict hops of Adjacency Segment IDs, then the Flexi-MPLS header overhead would be 34 bytes (i.e., the initial 4 octets which form the common portion of the Flexi-MPLS header plus the thirty 1-octet LUs encoding the 30 label values for the 30 strict hops). As described above, the same label stack in MPLS would consume 120 bytes (4 bytes for each of the 30 label values carried by the 30 labels for the 30 strict hops), such that, in this scenario, Flexi-MPLS would provide about a 75% reduction in header overhead. In the above example (1 LU per label value as indicated above), if a SR-TE path consists of 30 strict hops of Adjacency Segment IDs, then in a packet that includes 1500 bytes (which is the standard MTU size in Ethernet), a Flexi-MPLS header that includes a stack of 30 label values imposes only about a 2.3% overhead penalty (as opposed to about 8% in the example previously discussed for MPLS). Similarly, in the above example (1 LU per label value as indicated above), if a SR-TE path consists of 30 strict hops of Adjacency Segment IDs, then in a packet that is smaller than 1500 bytes (e.g., 512 bytes)), a Flexi-MPLS header that includes a stack of 30 label values imposes only about a 6.7% overhead penalty (as opposed to about 23.4% in the example previously discussed for MPLS).

It will be appreciated that the Flexi-MPLS header encapsulates a payload, which may be any suitable data or packet which may be transported based on a Flexi-MPLS header, to form a label switched packet which may be forwarded based on label switching.

It will be appreciated that a Flexi-MPLS label switched packet (including a Flexi-MPLS header and an associated payload of the Flexi-MPLS header) may be encapsulated within a payload of an encapsulating packet (e.g., an Ethernet frame or other type of packet suitable for transporting a Flexi-MPLS label switched packet). The encapsulating packet may include an encapsulating packet header that is configured to indicate that the encapsulated header is a Flexi-MPLS header (as opposed to an MPLS header or other header). For example, in the case of an Ethernet frame that is encapsulating a Flexi-MPLS label switched packet (e.g., having an Ethernet frame header and an Ethernet frame payload where the Ethernet frame payload includes the Flexi-MPLS label switched packet including a Flexi-MPLS header and associated payload of the Flexi-MPLS header), the indication that the encapsulated header is a Flexi-MPLS header may be provided using the Ether Type field of the Ethernet frame header. For example, one or more new Ether Type values may be reserved from the IANA registry for use in indicating that the payload encapsulated by an Ethernet frame is a label switched packet including a Flexi-MPLS header. For example, an Ether Type value of 0xB847 (or other suitable value from the IANA registry) may be used to indicate that the payload encapsulated by an Ethernet frame is a Flexi-MPLS label switched packet including a Flexi-MPLS header. For example, an Ether Type value of 0xB848 (or other suitable value from the IANA registry) may be used to indicate that the payload encapsulated by an Ethernet frame is Flexi-MPLS label switched packet including a Flexi-MPLS header with Upstream Assigned Label. It will be appreciated that, for other packet types which may be used to transport Flexi-MPLS label switched packets, various other header fields may be used to indicate that the payload encapsulated within the packet is a Flexi-MPLS label switched packet including a Flexi-MPLS header and an associated payload of the Flexi-MPLS header.

Various example embodiments for supporting packet forwarding in label switched packet networks may be configured to provide an SR data plane for Flexi-MPLS.

Various nodes may be involved in handling of a label switched packet that is based on Flexi-MPLS. For example, the source node of the label switched path, that originates the label switched packet, may form the label switched packet (e.g., generating a header for the label switched packet and associating the header with a payload to form the label switched packet) and send the label switched packet to a next-hop node of the label switched path. For example, transit nodes along the label switched path may receive the label switched packet along the label switched path and send the label switched packet toward a next-hop node of the label switched path (e.g., based on label switching operations). For example, a destination node of the label switched path, which terminates the label switched packet, may receive the label switched packet and send a payload of the label switched packet toward a network element (e.g., remove the header of the label switched packet to recover the payload and determine handling of the payload based on the header of the label switched packet). These various nodes that handle the label switched packet along the label switched path may perform various types of functions and processing based on the role in which the nodes are operating (e.g., as a source node of the label switched packet, as a transit node of the label switched packet, as a destination node of the label switched packet, as a sender (original or intermediate) of the label switched packet, as a receiver (intermediate or final) of the label switched packet, and so forth). It will be appreciated that the intermediate nodes may operate in both the receiving and sending roles. It will be appreciated that the source and transit nodes may operate as encoding nodes for encoding label values within label switched packets and that the transit and destination nodes may operate as decoding nodes for decoding label values within label switched packets. It will be appreciated that, while additional details regarding operations supported by sending and receiving nodes are discussed further below, a more generic process for handling a label switched packet based on Flexi-MPLS is presented with respect to FIG. 2.

Figure 2:
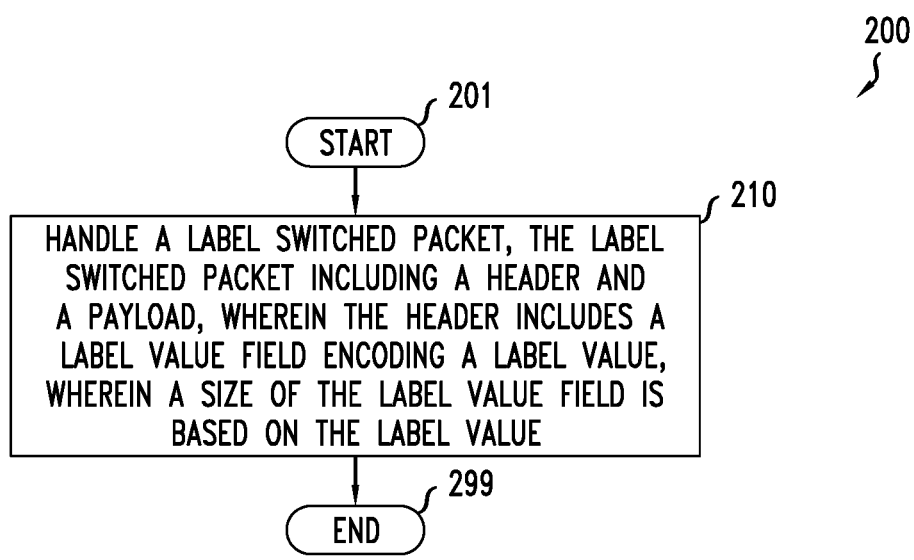
FIG. 2 depicts an example embodiment of a method for use by a network element to handle a label switched packet using Flexi-MPLS.

FIG. 2 depicts an example embodiment of a method for use by a network element to handle a label switched packet using Flexi-MPLS. It will be appreciated that, although primarily presented as being performed serially, at least a portion of the functions of method 200 may be performed contemporaneously or in a different order than as presented in FIG. 2. At block 201, method 200 begins. At block 210, a label switched packet is handled. The label switched packet is associated with a data plane of the network element (e.g., a label value of the label switched packet is associated with a forwarding context, such as a FEC in MPLS). The label switched packet includes a header. The header includes a label value field encoding a label value. The label value field has a size that is based on the label value. It will be appreciated that the handling of the label switched packet may depend on the role of the network element, such as whether the network element is operating as a source node (e.g., ingress LER) for the label switched packet, a transit node (e.g., transit LSR) for the label switched packet, or a destination node (e.g., egress LER) for the label switched packet. For example, handling of the label switched packet when the network element is operating as a source node of the label switched packet may include generating the label switched packet (e.g., obtaining the path for the label switched packet, generating the header for the label switched packet including encoding the label value within the header and associating the header with a payload to form the label switched packet) and sending the label switched packet toward a next hop node. For example, handling of the label switched packet when the network element is operating as a transit node of the label switched packet may include receiving the label switched packet, processing the label switched packet (e.g., determining handling of the label switched packet, reading or popping a label value from the header of the label switched packet, pushing a label into the label switched packet, or the like, as well as various combinations thereof), and sending the label switched packet toward a next hop node. For example, handling of the label switched packet when the network element is operating as a destination node of the label switched packet may include receiving the label switched packet, processing the label switched packet (e.g., popping a label value from the header of the label switched packet, removing the header of the label switched packet, determining handling of the label switched packet, determining handling of the payload of the label switched packet, or the like, as well as various combinations thereof), and sending the payload of the label switched packet toward a downstream network element. It also will be appreciated that the source node and any transit node may be an encoding node configured to encode a label value in a header of a label switched packet and that any transit node and the destination node may be a decoding node configured to decode a label value in a header of a label switched packet. At block 299, method 200 ends.

A description of the behavior of a source node in the SR data plane (e.g., an Ingress LER) for Flexi-MPLS follows.

The source node in the SR data plane for Flexi-MPLS, for a label switched packet to be sent, determines a path of the label switched packet (e.g., identifying each hop to be traversed by the label switched packet). The source node may determine the path by receiving the path from a controller (e.g., a PCE or other control element), computing the path locally, or the like.

The source node in the SR data plane for Flexi-MPLS, for a label switched packet to be sent, generates a Flexi-MPLS header including a Flexi-MPLS label stack and a common header portion, associates the Flexi-MPLS header with a payload to form thereby a label switched packet, and sends the label switched packet toward a next hop.

The source node in the SR data plane for Flexi-MPLS generates a Flexi-MPLS label stack for the Flexi-MPLS header. The source node generates the Flexi-MPLS label stack by encoding each label value of the label stack using a variable-sized label value field for the label value, respectively. The size of the variable-sized label value field that is used to encode a label value depends on the label value as follows. It is noted that in the following description, the label value carries the octets in host byte order.

If the label value is between 1 and 127 (inclusive), then the label value is encoded in 1 LU. The N bit is set to 0 to indicate that next LU in the label stack belongs to the next label value in the label stack. For example, the label value 120 (in binary=1111000) may be encoded as follows (the N bit is underlined):

```
              0
    0 1 2 3 4 5 6 7
    +-+-+-+-+-+-+-+-+
    |1 1 1 1 0 0 0 0|
    +-+-+-+-+-+-+-+-+
```

If the label value is between 128 and 16383 (inclusive), then the label value is encoded in 2 LUs. The N bit of the first LU is set to 1 to indicate that the next LU in the label stack belongs to the same label value in the label stack. The N bit of the second LU is set to 0 to indicate that next LU in the label stack belongs to the next label value in the label stack. The distribution of label value among the 2 LUs follows the order of occurrence of the bits. For example, the first LU will include the bits 0-6 of the label value and second LU will include the bits 7-13 of the label value. For example, the label 4055 (in binary=111111010111) may be encoded as follows (the N bits are underlined):

```
              0                   1
    0 1 2 3 4 5 6 7 8 9 0 1 2 3 4 5
    +-+-+-+-+-+-+-+-+-+-+-+-+-+-+-+-+
    |1 0 1 0 1 1 1 1|0 0 1 1 1 1 1 0|
    +-+-+-+-+-+-+-+-+-+-+-+-+-+-+-+-+
```

If the label value is between 26384 and 2097151 (inclusive), then the label value is encoded in 3 LUs. The N bits of the first and second LUs are set to 1 to indicate that the next LUs in the label stack belong to same label value in the label stack, respectively. The N bit of the third LU is set to 0 to indicate that the next LU in the label stack belongs to the next label value in the label stack. The distribution of label value among the 3 LUs follows the order of occurrence of the bits. For example, the first LU will include the bits 0-6 of the label value, second LU will include the bits 7-13 of the label value, and the third LU will include the bits 14-21 of the label value. For example, the label value 26567 (in binary=110011111000111) may be encoded as follows (the N bits are underlined).

```
              0                   1                   2
    0 1 2 3 4 5 6 7 8 9 0 1 2 3 4 5 6 7 8 9 0 1 2 3
    +-+-+-+-+-+-+-+-+-+-+-+-+-+-+-+-+-+-+-+-+-+-+-+-+
    |1 0 0 0 1 1 1 1|1 0 0 1 1 1 1 1|0 0 0 0 0 0 1 0|
    +-+-+-+-+-+-+-+-+-+-+-+-+-+-+-+-+-+-+-+-+-+-+-+-+
```

The source node in the SR data plane for Flexi-MPLS generates the common header portion of the Flexi-MPLS header. For example, the OAM field, the Experimental field, and the TTL field of the common header portion may be set according to the requirement of the application or service. For example, if the Flexi-MPLS Label Stack is encapsulating a traditional MPLS payload, then the MPLS Label indicator field is set to indicate this (e.g., set to 1). For example, the Length field is set to a value indicative of the total number of LUs in the label stack.

The source node that originates the Flexi-MPLS Label Stack forwards the label switched packet to the next hop (which processes the top label in the Flexi-MPLS Label Stack of the Flexi-MPLS header of the label switched packet).

It is noted that it is expected that the Flexi-MPLS header will include LUs, not a mix of LUs and traditional MPLS labels; however, as discussed herein, a traditional MPLS label may be carried at the bottom of the Flexi-MPLS header (e.g., as indicated by M=1 in Flexi-MPLS Header).

It is noted that, in Flexi-MPLS, the forwarding tables in the Ingress LER remain the same as in MPLS; however, as indicated above, the encoding of the labels in the label stack is different.

Figure 3:
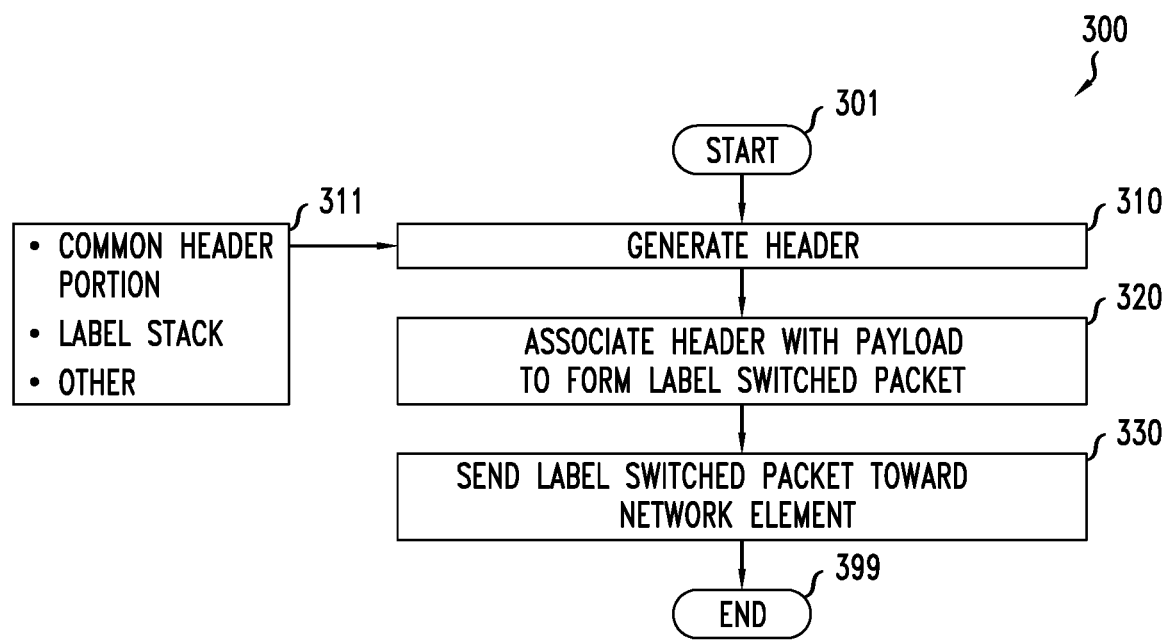
FIG. 3 depicts an example embodiment of a method for use by a source network element to send a label switched packet using Flexi-MPLS.

FIG. 3 depicts an example embodiment of a method for use by a source network element to send a label switched packet using Flexi-MPLS. It will be appreciated that, although primarily presented as being performed serially, at least a portion of the functions of method 300 may be performed contemporaneously or in a different order than as presented in FIG. 3. At block 301, method 300 begins. At block 310, a header is generated. As indicated at block 311, the header includes a common header portion and a label stack. The common header portion includes information common to the label stack. The label stack includes, for each label value to be included in the label stack, a respective label value field encoding the respective label value where the respective label value field has a size that is based on the respective label value. At block 320, the header is associated with a payload to form a label switched packet. The label switched packet is associated with a data plane of the network element (e.g., a label value of the packet is associated with a forwarding context, such as a FEC in MPLS). At block 330, the label switched packet is sent toward a network element. At block 399, method 300 ends. It will be appreciated that, in at least some embodiments, such functions may be supported by any node that sends a packet including a variable-sized encoding of a label value.

Figure 4:
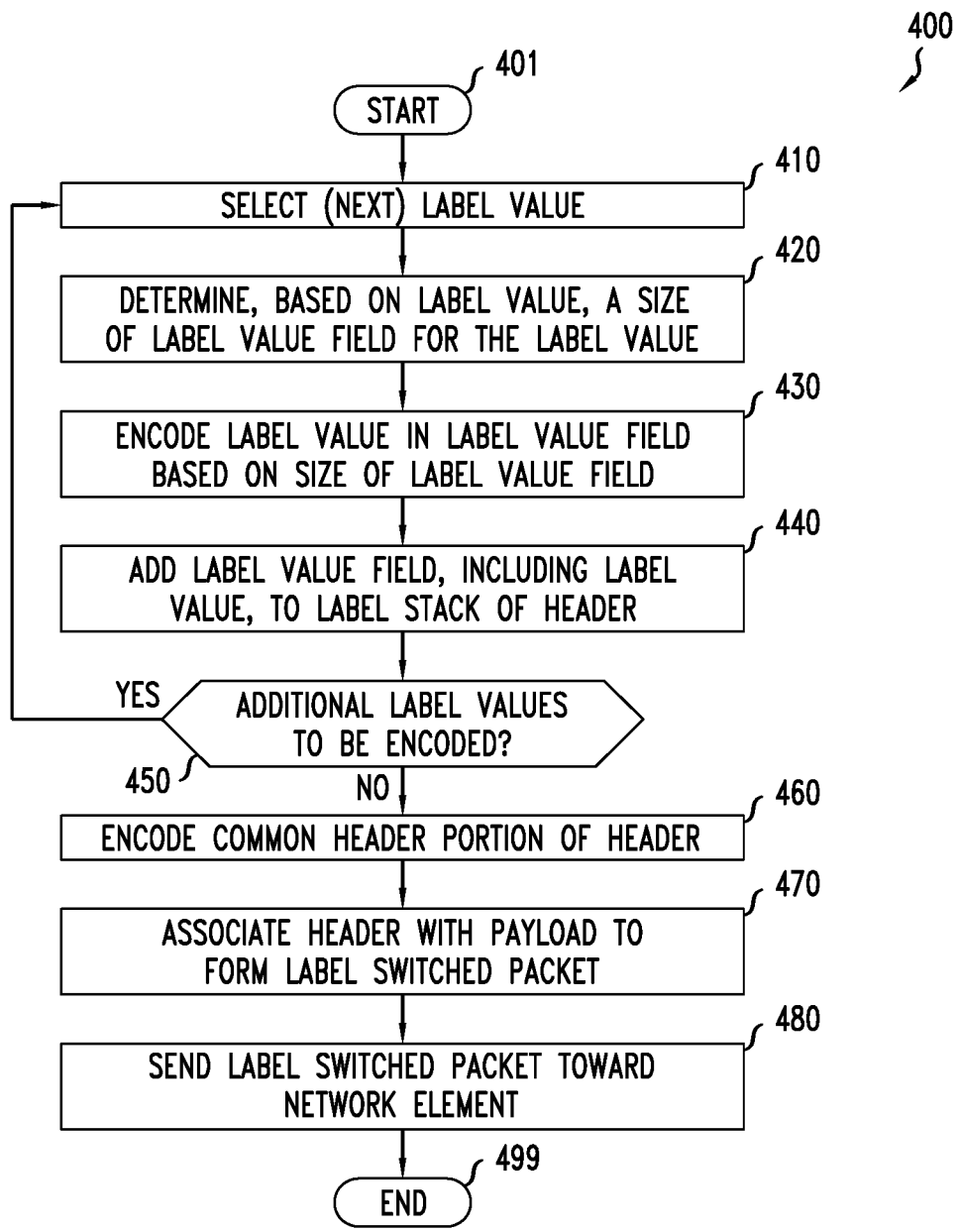
FIG. 4 depicts an example embodiment of a method for use by a source network element to send a label switched packet using Flexi-MPLS.

FIG. 4 depicts an example embodiment of a method for use by a source network element to send a label switched packet using Flexi-MPLS. It will be appreciated that, although primarily presented as being performed serially, at least a portion of the functions of method 400 may be performed contemporaneously or in a different order than as presented in FIG. 4. At block 401, method 400 begins. At block 410, a (next) label value is selected. At block 420, a size of a label value field is determined for the label value based on the label value. At block 430, the label value is encoded in the label value field based on the size of the label value field. The label value may be encoded using one, two, or three labels units. At block 440, the label value field, including the label value, is added to the label stack of the header of the packet to be sent. At block 450, a determination is made as to whether any additional label values are to be encoded. If additional label values are to be encoded, method 400 returns to block 410 (at which point the next label value to be encoded is selected). If additional label values are not to be encoded, method 400 proceeds to block 460 (for encoding of the common header portion of the packet). In this manner, the blocks 410-450 support encoding of the label stack portion of the header of the packet to be sent. At block 460, the common header portion of the header of the packet to be sent is encoded. This may include setting the length value in a length value field based on the lengths of the label value fields used to encode the label values in the label stack of the header of the packet to be sent. This may include setting OAM bits in an OAM field. This may include setting TTL bits in a TTL field. It will be appreciated that the common header portion of the header of the packet may include other fields which may be used to indicate other types of information. At block 470, the header is associated with a payload to form a label switched packet. At block 480, the label switched packet is sent toward a network element. At block 499, method 400 ends. It will be appreciated that, in at least some embodiments, such functions may be supported by any node that sends a packet including a variable-sized encoding of a label value.

It will be appreciated that a source network element may be configured to perform various other functions for supporting sending of label switched packets based on Flexi-MPLS.

It will be appreciated that, in at least some embodiments, various functions primarily presented as being supported by source nodes may be supported by any node that sends a packet including a variable-sized encoding of a label value.

A description of the behavior of a transit node in the SR data plane (e.g., a Transit LSR) for Flexi-MPLS follows.

The transit node in the SR data plane for Flexi-MPLS, for a label switched packet that is received, processes a Flexi-MPLS header of the label switched packet to determine handling of the label switched packet and sends the label switched packet toward a next hop.

The transit node in the SR data plane for Flexi-MPLS, for a label switched packet that is received, processes a Flexi-MPLS header of the packet to determine handling of the label switched packet. The transit node identifies a top label value field in the label stack of the Flexi-MPLS header of the label switched packet, determines the top label value of the label stack of the Flexi-MPLS header from the top label value field in the label stack of the Flexi-MPLS header of the label switched packet, and uses the label value of the top label value field in the label stack of the Flexi-MPLS header of the packet to determine handling of the label switched packet.

The transit node, as indicated above, identifies the top label value field in the label stack of the Flexi-MPLS header of the label switched packet. The transit node may identify the top label value field in the label stack of the Flexi-MPLS header of the label switched packet by determining, based on a portion of the label value field (e.g., value(s) of the N-bit(s) in one or more LUs at the top of the label stack of the Flexi-MPLS header), the size of the label value field. The transit node may extract the label value field from the label stack of the Flexi-MPLS header based on the size of the label value field (e.g., extracting the one or more LUs identified as forming part of the label value field that encodes the label value).

The transit node, as indicated above, determines the top label value of the label stack of the Flexi-MPLS header from the top label value field in the label stack of the Flexi-MPLS header of the label switched packet. The transit node may determine the top label value of the label stack of the Flexi-MPLS header from the top label value field in the label stack of the Flexi-MPLS header of the label switched packet by parsing the top label value field in the Flexi-MPLS header of the packet. The transit node may determine the label value from the label value field by: (1) when the label value field includes one LU, reading the label value field from bits 0-6 of the LU of the label value field, (2) when the label value field includes two LUs, extracting bits 0-6 of the top LU of the label value field and using those bits as bits 0-6 of the label value and extracting bits 0-6 of the next LU of the label value field and using those bits as bits 7-13 of the label value (or potentially less where the label value is encoded in less than 14 bits), or (3) when the label value field includes three LUs, extracting bits 0-6 of the top LU of the label value field and using those bits as bits 0-6 of the label value, extracting bits 0-6 of the next LU of the label value field and using those bits as bits 7-13 of the label value, and, extracting bits 0-6 of the next LU of the label value field and using those bits as bits 14-21 of the label value (or potentially less where the label value is encoded in less than 21 bits).

The transit node, as indicated above, uses the label value of the top label value field in the label stack of the Flexi-MPLS header of the label switched packet to determine handling of the label switched packet. The handling of the label switched packet may be determined by using the label value as a key into one or more tables that have packet handling rules. The handling of the label switched packet may include determining a next hop for the label switched packet and sending the label switched packet toward the next hop. The handling of the label switched packet may include pushing one or more additional label values onto the label stack of the Flexi-MPLS header. The handling of the label switched packet may include pushing one or more labels onto the Flexi-MPLS header of the label switched packet (e.g., where the label switched packet is to be encapsulated within MPLS). The handling of the label switched packet may include various other actions. The label switched packet is forwarded toward the next hop based on the determined handling of the label switched packet.

A transit router that receives a label switched packet including a Flexi-MPLS header including a Flexi-MPLS label stack (e.g., an Ethernet packet encapsulating a label switched packet) may perform the following process for handling the label switched packet:

1. The Ether type in the Ethernet header is checked. If Ether type in the Ethernet header is of the Flexi-MPLS type, then the payload is parsed as a Flexi-MPLS packet.
2. The top label in the Flexi-MPLS label stack is parsed. The top label can be found in the first variable-sized label value field (i.e., in the first 1 to 3 LUs, depending on the label value) following the initial 4-octets in the Flexi-MPLS header.
3. The top label is used to determine whether there is context for the label, for determining handling of the label switched packet. The top label is looked up in the Incoming Label Map (ILM) Table that belongs to the Flexi-MPLS label space. If no context is found for the top label in the ILM Table, proceed to step 4 of the process. If context is found for the top label in the ILM Table, proceed to step 5 of the process.
4. If no context is found for the top label in the ILM table, then the label switched packet is dropped and there is nothing more to do (namely, steps 5 through 10 of the process are not performed).
5. If context is found for the top label in the ILM table, then the variable-sized label value field (including the LU(s) belonging to the top label value) is removed, or popped, from the Flexi-MPLS label stack. If this is the last label in the Flexi-MPLS label stack, remove the Flexi-MPLS header and proceed to step 6 of the process. If this is not the last label in the Flexi-MPLS label stack, proceed to step 7 of the process.

6. The M bit in the Flexi-MPLS header is inspected. If the M bit is not set (e.g., equal to "0"), then the payload type is determined as per the context of the popped label and the payload is provided to the designated forwarder of the payload type. If the M bit is set (e.g., equal to "1"), then it means that the payload starts with MPLS Label and, as such, the MPLS label is looked up in the ILM table that belongs to the traditional MPLS label space and associated MPLS forwarding actions are performed.

7. The TTL is decremented by 1. The processing that is performed then depends on whether decrementing of the TTL causes the TTL to become zero. If TTL becomes 0 and the OAM bits are not set, then the label switched packet is dropped. If TTL becomes 0 and the OAM bits are set, then the label switched packet is sent to the OAM handling module in the control plane. If the TTL does not become 0, proceed to step 8 of the process.

8. The Length is decremented by the number of LUs of the popped label of the MPLS label stack.

9. The forwarding actions are performed as per the Next Hop Label Forwarding Entry (NHLFE) pointed to by the ILM record. If the NHLFE indicates pushing of additional labels into the Flexi-MPLS label stack, then labels are pushed into the Flexi-MPLS label stack. The rules for pushing of Flexi-MPLS labels here are the same as defined above for the source node that originates the Flexi-MPLS label stack.

10. The label switched packet is forwarded to the next-hop designated by the NHLFE with the updated Flexi-MPLS label stack.

In Flexi-MPLS, the forwarding tables in the Transit-LSRs may remain the same as in MPLS; however, there is a behavior change in terms of the encoding of the labels in the stack. As an example, assume that a Transit-LSR receives a label switched packet with the following Flexi-MPLS header (illustratively, with 8 label values in the Flexi-MPLS label stack as 100, 10, 16, 88, 78, 90, 63, and 45, respectively, as shown below):

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|0 0|0|0 0| EXP|    TTL = 30 |        Length = 8              |
+-+-+-+-+-+-+-+-+-+-+-+-+-+-+-+-+-+-+-+-+-+-+-+-+-+-+-+-+-+-+-+-
|  100         |  10         |  16         |  88              |
+-+-+-+-+-+-+-+-+-+-+-+-+-+-+-+-+-+-+-+-+-+-+-+-+-+-+-+-+-+-+-+-
|  78          |  90         |  63         |  45              |
+-+-+-+-+-+-+-+-+-+-+-+-+-+-+-+-+-+-+-+-+-+-+-+-+-+-+-+-+-+-+-+-
```

The Transit-LSR looks up the top label, which is 100, in the ILM table in the Flexi-MPLS label space. In this example, assume that the NHLFE linked to label 100 in the ILM Table directs the label switched packet to be forwarded to a next-hop without pushing additional labels. Then, the label switched packet would be sent to that next-hop with the following Flexi-MPLS header (label 100 is no longer included, and label 10, which was previously the second label in the Flexi-MPLS label stack, is now the top label in the Flexi-MPLS label stack):

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|0 0|0|0 0| EXP |   TTL = 29  |        Length = 7              |
+-+-+-+-+-+-+-+-+-+-+-+-+-+-+-+-+-+-+-+-+-+-+-+-+-+-+-+-+-+-+-+-
|  10          |  16         |  88         |  78              |
+-+-+-+-+-+-+-+-+-+-+-+-+-+-+-+-+-+-+-+-+-+-+-+-+-+-+-+-+-+-+-+-
|  90          |  63         |  45         |
+-+-+-+-+-+-+-+-+-+-+-+-+-+-+-+-+-+-+-+-+-+-+-
```

The label switched packet then continues along the label switched path, being processed and forwarded based on the label values encoded in the label value fields of the Flexi-MPLS label stack of the Flexi-MPLS header until reaching the destination node (e.g., the Egress LER).

Figure 5:
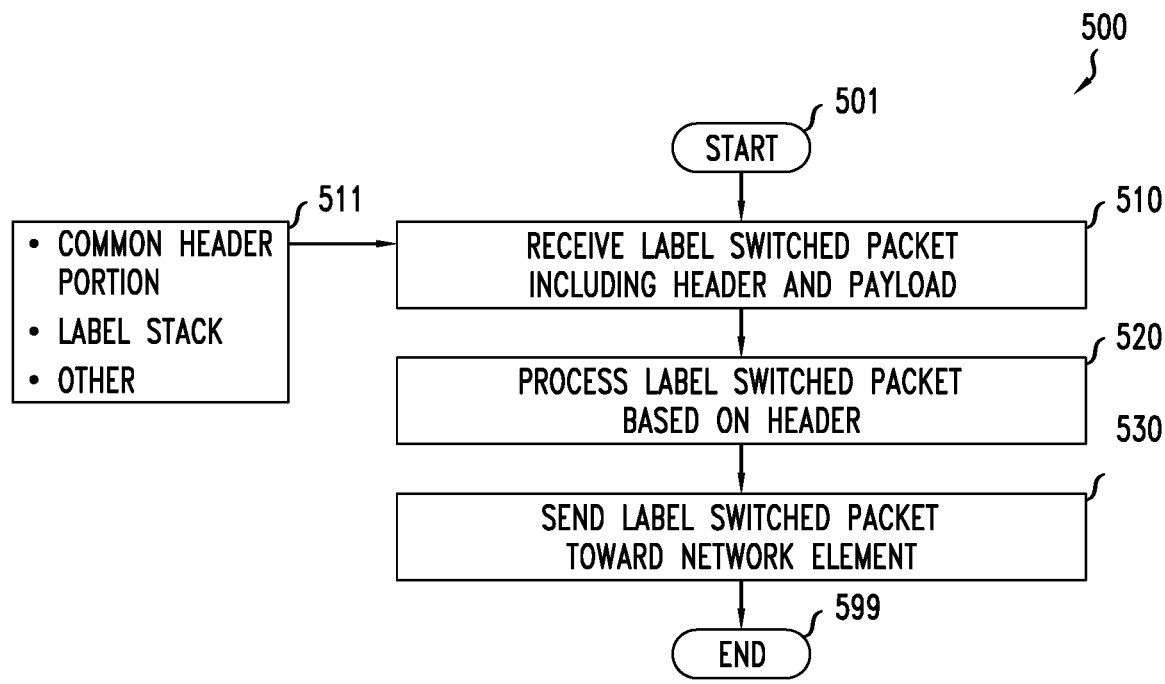
FIG. 5 depicts an example embodiment of a method for use by a transit network element to receive and handle a label switched packet using Flexi-MPLS.

FIG. 5 depicts an example embodiment of a method for use by a transit network element to receive and handle a label switched packet using Flexi-MPLS. It will be appreciated that, although primarily presented as being performed serially, at least a portion of the functions of method 500 may be performed contemporaneously or in a different order than as presented in FIG. 5. At block 501, method 500 begins. At block 510, a label switched packet including a header and a payload is received. As indicated at block 511, the label switched header includes a common header portion and a label stack. The common header portion includes information common to the label stack. The label stack includes, for each label value included in the label stack, a respective label value field encoding the respective label value where the respective label value field has a size that is based on the respective label value. At block 520, the label switched packet is processed based on the header. The processing of the label switched packet may include reading or popping a label value from the header of the label switched packet, determining handling of the label switched packet (e.g., identifying a next hop node for the label switched packet) based the header of the label switched packet (e.g., based on a label value encoded in a label value field in the header of the label switched packet), pushing a label value into the header of the label switched packet, or the like, as well as various combinations thereof. At block 530, the label switched packet is sent toward a network element. At block 599, method 500 ends. It will be appreciated that, in at least some embodiments, such functions may be supported by any node that receives a packet including a variable-sized encoding of a label value.

Figure 6:
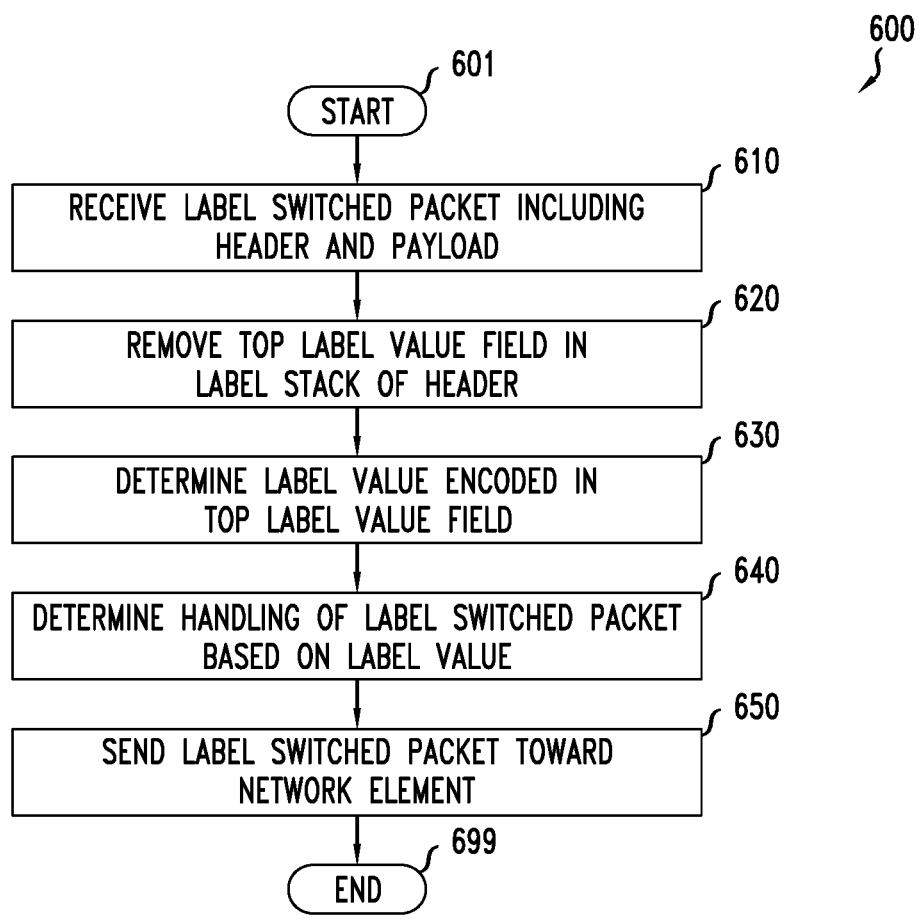
FIG. 6 depicts an example embodiment of a method for use by a transit network element to receive and handle a label switched packet using Flexi-MPLS.

FIG. 6 depicts an example embodiment of a method for use by a transit network element to receive and handle a label switched packet using Flexi-MPLS. It will be appreciated that, although primarily presented as being performed serially, at least a portion of the functions of method 600 may be performed contemporaneously or in a different order than as presented in FIG. 6. At block 601, method 600 begins. At block 610, a label switched packet including a header and a payload is received. The label switched packet is associated with a data plane of the network element (e.g., a label value of the label switched packet is associated with a forwarding context, such as a FEC in MPLS). The header includes a common header portion and a label stack. The common header portion includes information common to the label stack. The label stack includes, for each label value included in the label stack, a respective label value field encoding the respective label value where the respective label value field has a size that is based on the respective label value. At block 620, the top label value field in the label stack of the header is removed from the header. At block 630, the label value encoded within the top label value field is determined. The label value encoded within the top label value field may be determined by determining a size of the label value field and determining the label value based on the size of the label value field. At block 640, handling of the label switched packet is determined based on the label value. At block 650, the label switched packet is sent toward a network element. At block 699, method 600 ends. It will be appreciated that, in at least some embodiments, such functions may be supported by any node that receives a packet including a variable-sized encoding of a label value.

It will be appreciated that a transit network element may be configured to perform various other functions for supporting handling of label switched packets based on Flexi-MPLS.

It will be appreciated that, in at least some embodiments, various functions primarily presented as being supported by transit nodes may be supported by any node that receives a packet including a variable-sized encoding of a label value.

A description of the behavior of a destination node in the SR data plane (e.g., an Egress LER) for Flexi-MPLS follows.

The destination node in the SR data plane for Flexi-MPLS, for a label switched packet that is received, processes a Flexi-MPLS header of the label switched packet to determine handling of the payload of the label switched packet (e.g., processing of the payload, further forwarding of the payload toward a network element, or the like, as well as various combinations thereof).

The destination node in the SR data plane for Flexi-MPLS, for a label switched packet that is received, processes a Flexi-MPLS header of the packet to determine handling of the payload of the label switched packet. The destination node identifies a top label value field in the label stack of the Flexi-MPLS header of the label switched packet (which should be the only label value field remaining in the label switched packet), determines the top label value of the label stack of the Flexi-MPLS header from the top label value field in the label stack of the Flexi-MPLS header of the label switched packet, and uses the label value of the top label value field in the label stack of the Flexi-MPLS header of the packet to determine handling of the payload of the label switched packet. The destination node may identify the top label value field in the label stack of the Flexi-MPLS header of the label switched packet and determines the top label value of the label stack of the Flexi-MPLS header from the top label value field in the label stack of the Flexi-MPLS header of the label switched packet in a manner similar to that described for transit nodes.

The destination node, as indicated above, uses the label value of the top label value field in the label stack of the Flexi-MPLS header of the label switched packet to determine handling of the payload of the label switched packet. The handling of the payload of the label switched packet may be determined by using the label value as a key into one or more tables that have various payload handling rules. The handling of the payload of label switched packet may include processing the payload of the label switched packet, forwarding the payload of the label switched packet. The handling of the payload of label switched packet may depend on the contents of the payload (e.g., the type of packet encapsulated within the label switched packet). The handling of the payload of the label switched packet may include various other actions.

A destination router that receives a label switched packet including a Flexi-MPLS header including a Flexi-MPLS label stack (e.g., an Ethernet packet encapsulating a label switched packet) may perform a process that is similar to the process performed by a transit node for that receives a label switched packet including a Flexi-MPLS header including a Flexi-MPLS label stack (e.g., an Ethernet packet encapsulating a label switched packet) as discussed above. However, it will be appreciated that, since the destination node is the final packet of the label switched path, the Flexi-MPLS header may be removed from the label switched packet to recover the payload of the label switched packet and handling of the payload of the label switched packet may be performed based on the Flexi-MPLS header (e.g., based on a common header portion of the Flexi-MPLS header).

In Flexi-MPLS, the forwarding table in the Egress-LER may remain the same as in MPLS; however, there is a behavior change in terms of the encoding of the labels in the stack. As an example, assume that an Egress-LER receives a label switched packet with the following Flexi-MPLS header (illustratively, with a single remaining label value in the Flexi-MPLS label stack as 45, as shown below):

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
| 0 0|0|0 0| EXP|      TTL = 30    |       Length = 8          |
+-+-+-+-+-+-+-+-+
|   45          |
+-+-+-+-+-+-+-+-+
```

The Egress-LER looks up the top label, which is 45, in the ILM table in the Flexi-MPLS label space. In this example, assume that the NHLFE linked to label 100 in the ILM Table directs the payload of the label switched packet to be forwarded to a next-hop without pushing additional labels. Then, the payload would be sent to that next-hop without a corresponding Flexi-MPLS header.

Figure 7:
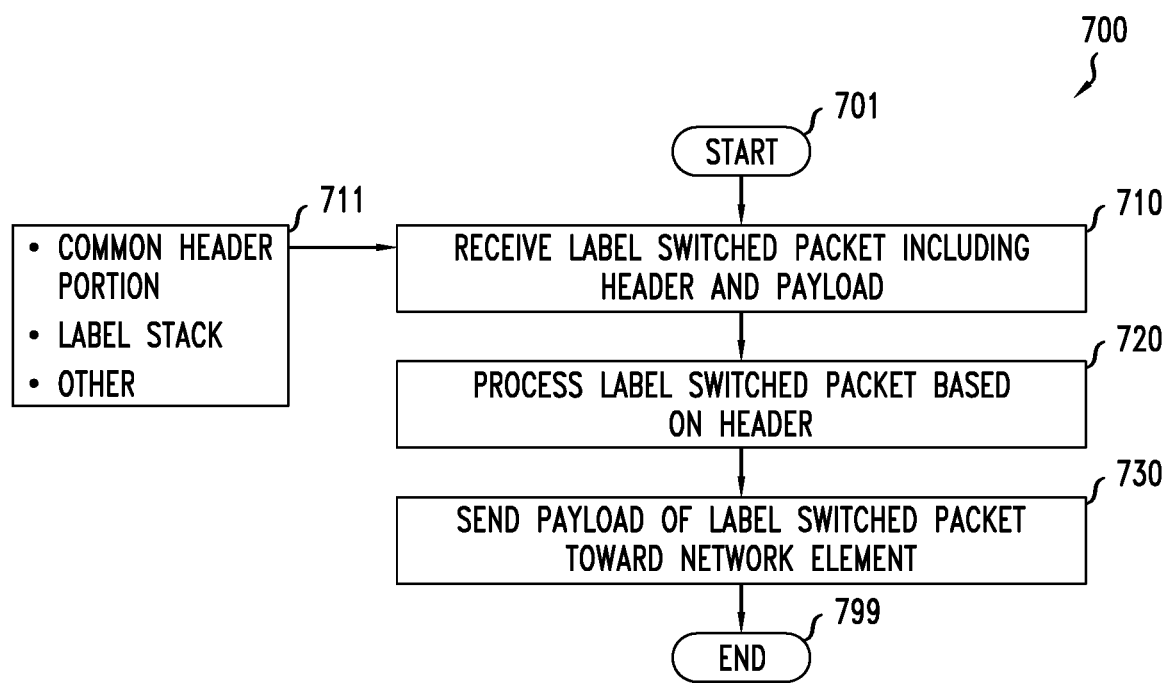
FIG. 7 depicts an example embodiment of a method for use by a destination network element to receive and handle a label switched packet using Flexi-MPLS.

FIG. 7 depicts an example embodiment of a method for use by a destination network element to receive and handle a label switched packet using Flexi-MPLS. It will be appreciated that, although primarily presented as being performed serially, at least a portion of the functions of method 700 may be performed contemporaneously or in a different order than as presented in FIG. 7. At block 701, method 700 begins. At block 710, a label switched packet including a header and a payload is received. As indicated at block 711, the label switched header includes a common header portion and a label stack. The common header portion includes information common to the label stack. The label stack includes a label value field encoding a label value where the label value field has a size that is based on the label value. At block 720, the label switched packet is processed based on the header of the label switched packet. The processing of the label switched packet may include popping a label value from the header of the label switched packet, removing the header of the label switched packet, determining handling of the payload of the label switched packet, or the like, as well as various combinations thereof), At block 730, the payload of the label switched packet is sent toward a network element. At block 799, method 700 ends. It will be appreciated that, in at least some embodiments, such functions may be supported by any node that receives a packet including a variable-sized encoding of a label value.

Figure 8:
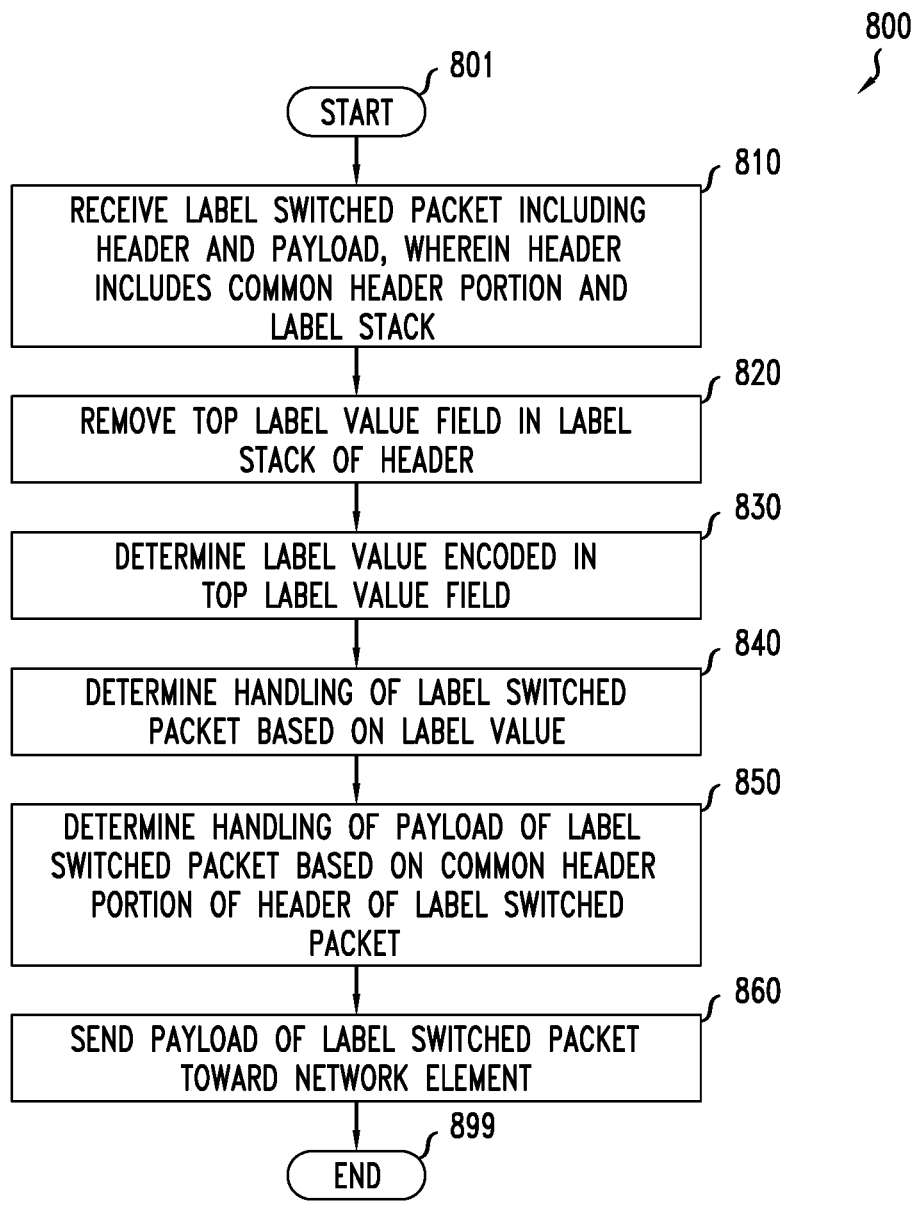
FIG. 8 depicts an example embodiment of a method for use by a destination network element to receive and handle a label switched packet using Flexi-MPLS.

FIG. 8 depicts an example embodiment of a method for use by a destination network element to receive and handle a label switched packet using Flexi-MPLS. It will be appreciated that, although primarily presented as being performed serially, at least a portion of the functions of method 800 may be performed contemporaneously or in a different order than as presented in FIG. 8. At block 801, method 800 begins. At block 810, a label switched packet including a header and a payload is received. The label switched packet is associated with a data plane of the network element (e.g., a label value of the label switched packet is associated with a forwarding context, such as a FEC in MPLS). The header includes a common header portion and a label stack. The common header portion includes information common to the label stack. The label stack includes, for each label value included in the label stack, a respective label value field encoding the respective label value where the respective label value field has a size that is based on the respective label value. At block 820, the top label value field in the label stack of the header is removed from the header. At block 830, the label value encoded within the top label value field is determined. The label value encoded within the top label value field may be determined by determining a size of the label value field and determining the label value based on the size of the label value field. At block 840, handling of the label switched packet is determined based on the label value. This may include a determination that the label value field is to be popped to expose the common header portion of the header of the label switched packet. At block 850, handling of the payload of the label switched packet is determined based on the common header portion of the header of the label switched packet. At block 860, the payload of the label switched packet is sent toward a network element. At block 899, method 800 ends. It will be appreciated that, in at least some embodiments, such functions may be supported by any node that receives a packet including a variable-sized encoding of a label value.

It will be appreciated that a destination network element may be configured to perform various other functions for supporting handling of label switched packets based on Flexi-MPLS.

It will be appreciated that, in at least some embodiments, various functions primarily presented as being supported by destination nodes may be supported by any node that receives a packet including a variable-sized encoding of a label value.

Various example embodiments for supporting packet forwarding in label switched packet networks may be configured to support interoperability between the Flexi-MPLS data plane and the MPLS data plane.

Various example embodiments for supporting packet forwarding in label switched packet networks may be configured to support connection or stitching of a Flexi-MPLS data plane to a MPLS data plane. A description of connection or stitching of a Flexi-MPLS data plane to a MPLS data plane follows.

The Flexi-MPLS data plane may be configured to support connection or stitching of a Flexi-MPLS data plane to a MPLS data plane. In such cases, a Flexi-MPLS label lookup in the ILM lookup leads to popping of the Flexi-MPLS Header and the ILM would point to a NHLFE entry that would push an MPLS label. It is noted that the Flexi-MPLS Label is to be the last entry in the Flexi-MPLS header and is not to be an intermediate entry. The EXP and TTL values from the popped Flexi-MPLS header are mapped to the pushed MPLS Label. The S bit in MPLS label is set based on the M bit of the Flexi-MPLS header (i.e., if M=0 then S=1, if M=1 then S=0).

The interoperability, or stitching, of the Flexi-MPLS data plane and the MPLS data plane may be further understood with respect to the following example. In this example, assume that a transitioning LSR receives the following Flexi-MPLS header (illustratively, including a single label value field having a label value of 10):

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|0 0|0|0 0| EXP |    TTL = 29   |         Length = 7          |
+-+-+-+-+-+-+-+-+-+-+-+-+-+-+-+-+-+-+-+-+-+-+-+-+-+-+-+-+-+-+-+-
|  10       |
+-+-+-+-+-+-+-+-+
```

The ILM Table lookup on Flexi-MPLS label 10 in the Flexi-MPLS label space leads to popping of this Flexi-MPLS label (and, since it is the final Flexi-MPLS label, also removal of the common header portion of the Flexi-MPLS header) and pushing of the MPLS label 131067 to a designated next-hop. As such, the packet sent towards the next-hop would include an MPLS header as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|           131067             | Exp |S|    TTL = 28   |
+-+-+-+-+-+-+-+-+-+-+-+-+-+-+-+-+-+-+-+-+-+-+-+-+-+-+-+-+-+-+-+-
```

It will be appreciated that connection or stitching of a Flexi-MPLS data plane to a MPLS data plane may be provided in various other ways.

Various example embodiments for supporting packet forwarding in label switched packet networks may be configured to support encapsulation of a Flexi-MPLS header within MPLS. A description of the encapsulation of a Flexi-MPLS header within MPLS follows.

The Flexi-MPLS data plane may be configured to support encapsulation of a Flexi-MPLS header within a traditional MPLS label stack. There are scenarios where a Flexi-MPLS header needs to be encapsulated within a traditional MPLS label stack. For example, a segment in SR could be a 'next hop style' anchor described by an IGP short-cut. Any IGP short-cut is an underlying RSVP-TE MPLS tunnel. In that case, the Flexi-MPLS Label Stack in the SR domain needs to be transported over the RSVP-RE tunnel. The LSR where RSVP-TE tunnel terminates needs to know that MPLS label carries a Flexi-MPLS header as its payload. This may be indicated using a special-purpose MPLS label, which is referred to herein as a "Flexi-MPLS Stack Indicator (FMSI)" label. The FMSI may be assigned any suitable label value from the IANA registry (e.g., "8", as used in the example below, or using any other suitable value).

The encapsulation of a Flexi-MPLS header within MPLS may be further understood with respect to the following example. In this example, assume that a traditional MPLS header, having a label of 131071, encapsulates and, thus, transports, a Flexi-MPLS label stack as follows:

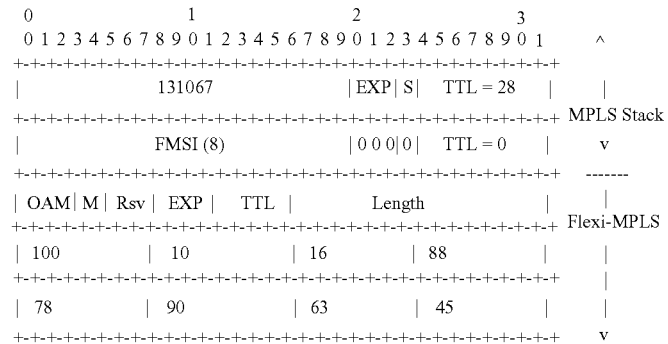

It will be appreciated that encapsulation of a Flexi-MPLS header within MPLS may be provided in various other ways.

Various example embodiments for supporting packet forwarding in label switched packet networks may be configured to support recursive stacking of Flexi-MPLS headers and MPLS headers. A description of recursive stacking of Flexi-MPLS headers and MPLS headers follows. For example, recursive stacking of Flexi-MPLS headers and MPLS headers may enable an MPLS header that encapsulates a Flexi-MPLS header to be further encapsulated by a Flexi-MPLS header (e.g., Flexi-MPLS stack→MPLS stack-→Flexi-MPLS stack. For example, recursive stacking of Flexi-MPLS headers and MPLS headers may enable a Flexi-MPLS header that encapsulates an MPLS header to be further encapsulated by an MPLS header (e.g., MPLS stack-→Flexi-MPLS stack→MPLS stack), an example of which follows:

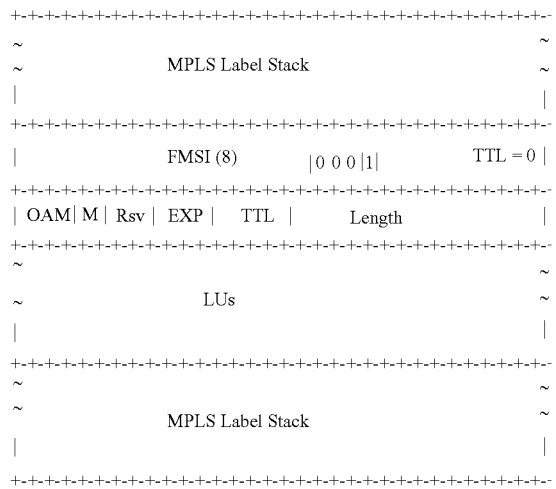

It will be appreciated that various other arrangements of Flexi-MPLS headers and MPLS headers may be used for recursive stacking of Flexi-MPLS headers and MPLS headers.

It will be appreciated that interoperability between the Flexi-MPLS data plane and the MPLS data plane may be provided in various other ways.

It will be appreciated that, although primarily presented herein within the context of embodiments in which the variable-sized encoding of a label value within a header of a packet is based on use of a variable-sized label value field, various embodiments for supporting packet forwarding in label switched packet networks may be configured to perform variable-sized encoding of a label value using other types of encodings.

In at least some embodiments, for example, variable-sized encoding of a label value may be provided using a type-length-value (TLV) construct. In at least some such embodiments, the TLV that is used to encode a label value may include a Type field which may be set in a manner indicating that the TLV includes a variable-sized encoding of a label value (e.g., a Type value indicating that the packet is associated with the Flexi-MPLS data plane), a Length field which indicates the length of the Value field, and a Value field that includes the variable-sized encoding of the label value.

In at least some embodiments, for example, variable-sized encoding of a label value may be provided using a type-value (TV) construct. In at least some such embodiments, the TV that is used to encode a label value may include a Type field which may be set in a manner indicating that the TV includes a variable-sized encoding of a label value (e.g., using multiple Flexi-MPLS data plane types to indicate the different sizes of the Value field, such as using three different type values to indicate three different label value encoding sizes) and a Value field that includes the variable-sized encoding of the label value.

It will be appreciated that various embodiments for supporting packet forwarding in label switched packet networks may be configured to perform variable-sized encoding of a label value using other types of encodings.

It will be appreciated that, although primarily presented herein within the context of embodiments in which specific routers performs specific functions while operating in specific roles (e.g., source node, transit node, or the like), various embodiments for supporting packet forwarding in label switched packet networks may be configured to use a variable-sized label value field at any node that handles a label or label stack (e.g., encoding of a label value using a variable-sized label value field may be performed by any node that generates or pushes a label or label stack, recovery of a label value encoded using a variable-sized label value field may be performed by any node reading or popping a label or label stack, or the like, as well as various combinations thereof). It will be appreciated that various routers may operate in various roles for different paths (and, thus, may support various combinations of such functions for handling packets of paths).

Figure 9:
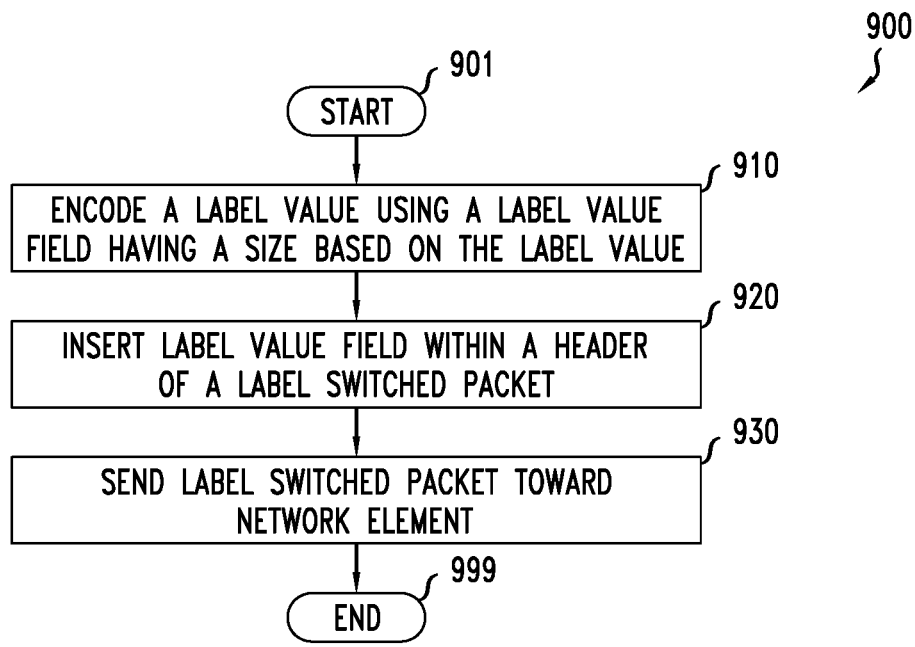
FIG. 9 depicts an example embodiment of a method for use by a sending network element to send a label switched packet based on encoding of a label value using a variable-sized label value field.

FIG. 9 depicts an example embodiment of a method for use by a sending network element to send a label switched packet based on encoding of a label value using a variable-sized label value field. It will be appreciated that, although primarily presented as being performed serially, at least a portion of the functions of method 900 may be performed contemporaneously or in a different order than as presented in FIG. 9. At block 901, method 900 begins. At block 910, a label value is encoded using a label value field having a size that is based on the label value. At block 920, the label value field is inserted within a header of a label switched packet. The header could be a header being generated at the network element, an existing header of a packet received or generated at the network element, or the like. The label switched packet could be a label switched packet being generated at the network element, a label switched packet received at the network element that is being processed at the network element, or the like. At block 930, the label switched packet is sent toward a network element (e.g., a next hop network element for the label switched packet). At block 999, method 900 ends. It will be appreciated that, in at least some embodiments, such functions may be supported by any node that performs a variable-sized encoding of a label value (e.g., a source node, a transit node, or the like).

Figure 10:
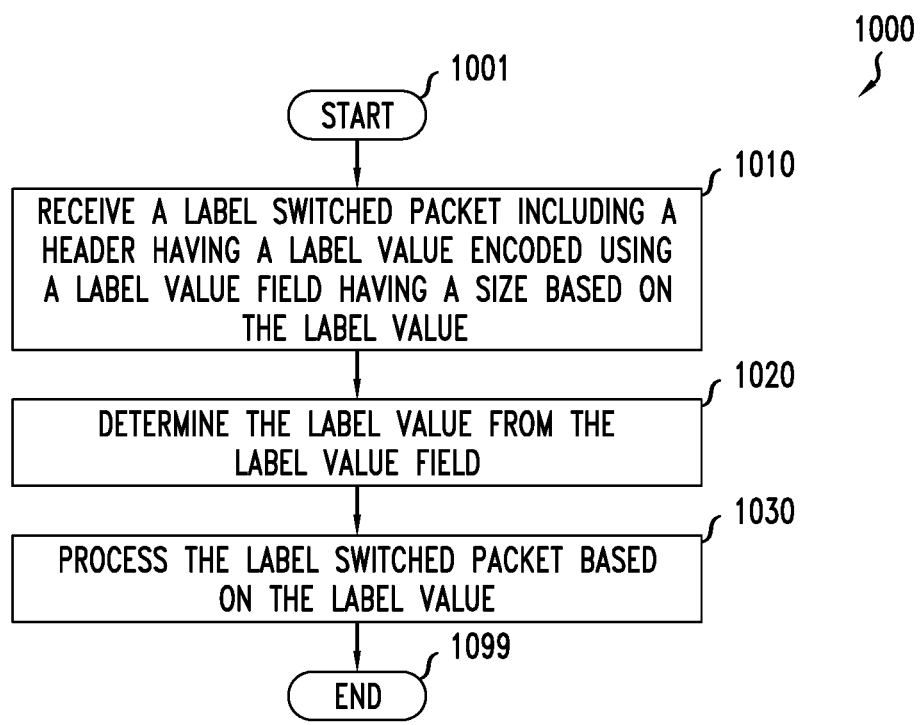
FIG. 10 depicts an example embodiment of a method for use by a receiving network element to receive and handle a label switched packet that includes a label value encoded using a variable-sized label value field.

FIG. 10 depicts an example embodiment of a method for use by a receiving network element to receive and handle a label switched packet that includes a label value encoded using a variable-sized label value field. It will be appreciated that, although primarily presented as being performed serially, at least a portion of the functions of method 1000 may be performed contemporaneously or in a different order than as presented in FIG. 10. At block 1001, method 1000 begins. At block 1010, a label switched packet, including a header having a label value encoded using a label value field having a size that is based on the label value, is received. At block 1020, the label value is determined from the label value field. This may or may not include popping the label value from the header of the label switched packet. At block 1030, the label switched packet is processed based on the label value. The processing of the label switched packet based on the label value may include determining a next-hop for the label switched packet, manipulating the label switched packet (e.g., pushing one or more label values into the header of the label switched packet), or the like, as well as various combinations thereof. At block 1099, method 1000 ends. It will be appreciated that, in at least some embodiments, such functions may be supported by any node that receives a packet including a variable-sized encoding of a label value.

Figure 11:
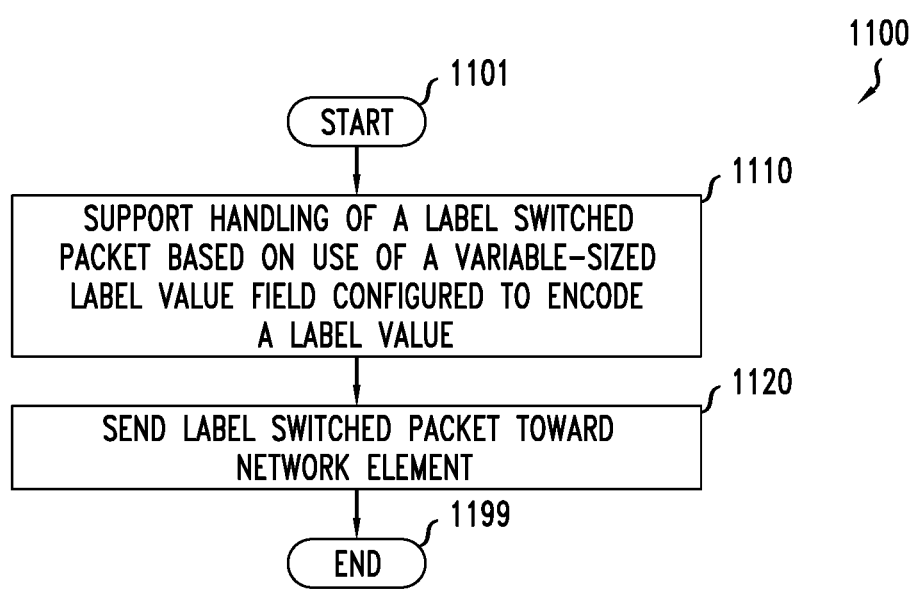
FIG. 11 depicts an example embodiment of a method for use by a network element to handle a label switched packet based on use of a variable-sized label value field configured to encode a label value.

FIG. 11 depicts an example embodiment of a method for use by a network element to handle a label switched packet based on use of a variable-sized label value field configured to encode a label value. It will be appreciated that, although primarily presented as being performed serially, at least a portion of the functions of method 1100 may be performed contemporaneously or in a different order than as presented in FIG. 11. At block 1101, method 1100 begins. At block 1110, handling of a label switched packet, based on use of a variable-sized label value field configured to encode a label value, is supported. The handling of the label switched packet may include encoding of a label value using a label value field having a size that is based on the label value and inserting the label value field within a header of the label switched packet (e.g., as discussed with respect to method 900 of FIG. 9). The handling of the label switched packet may include receiving the label switched packet where the packet includes a header having a label value encoded using a label value field having a size that is based on the label value, determining the label value from the label value field, and processing the packet based on the label value (e.g., as discussed with respect to method 1000 of FIG. 10). At block 1120, the label switched packet is forwarded toward a network element. At block 1199, method 1100 ends. It will be appreciated that, in at least some embodiments, such functions may be supported by any node that receives a packet including a variable-sized encoding of a label value.

It will be appreciated that, as noted above, various network elements operating in various roles for different label switched paths may support handling of label switched packets based on use of a variable-sized label value field configured to encode label values for the label switched paths in the data plane.

Various example embodiments for supporting packet forwarding in label switched packet networks are configured to support a Flexi-MPLS control plane.

Various example embodiments for supporting packet forwarding in label switched packet networks are configured to provide an SR control plane for Flexi-MPLS.

In SR, various types of control plane information are advertised across the network (e.g., between routers) by IGPs (e.g., IS-IS, OSPF, OSPFv3, or the like) and various types of control plane information are advertised to external agents (e.g., the PCE or others) by BGPs (e.g., BGP-LS or the like). For example, the control plane information advertised by IGPs may include the segments, the label mappings of the segments (e.g., SIDs), router capability information (e.g., the ability of the router to support Flexi-MPLS), advertisement of other label mappings (e.g. label mappings on behalf of non-SR-capable routers, externally injected label mappings, or the like), or the like, as well as various combinations thereof. For example, the control plane information advertised by BGPs may include labels mappings, router capabilities, or the like, as well as various combinations thereof.

Various example embodiments for supporting packet forwarding in label switched packet networks are configured to support use of IS-IS for SR with Flexi-MPLS.

Various example embodiments for supporting packet forwarding in label switched packet networks are configured to support use of IS-IS, for SR with Flexi-MPLS, for advertising various types of control plane information in various ways. It is noted that IS-IS extensions for SR are being standardized in the IETF in the "IS-IS Extensions for Segment Routing" draft (also denoted as SR-ISIS-DRAFT). SR-ISIS-DRAFT describes various SR SIDs distributed by the IS-IS Protocol. An SID describes a label mapping assigned to specific segment in the network. SR-ISIS-DRAFT defines the encodings for Prefix-SID, the Adjacency-SID, the LAN-Adjacency-SID, and the Binding-SID.

Various example embodiments for supporting packet forwarding in label switched packet networks are configured to support new SID definitions, which align with the approach in SR-ISIS-DRAFT, to distribute label mappings for the Flexi-MPLS data plane. It is noted that the procedures in SR-ISIS-DRAFT may be applicable to the new SID definitions as defined herein, unless specified otherwise herein.

Various example embodiments for supporting packet forwarding in label switched packet networks are configured to support use of the Prefix-SID for Flexi-MPLS in IS-IS. In general, a Prefix-SID represents a label mapping of a routable IPv4 or IPV6 prefix in the network. Section 2.1 in SR-ISIS-DRAFT describes the format for Prefix-SID as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |   Algorithm   |
+-+-+-+-+-+-+-+-+-+-+-+-+-+-+-+-+-+-+-+-+-+-+-+-+-+-+-+-+-+-+-+-+
|                   SID/Index/Label  (variable)                 |
+-+-+-+-+-+-+-+-+-+-+-+-+-+-+-+-+-+-+-+-+-+-+-+-+-+-+-+-+-+-+-+-+
```

The Prefix-SID, as indicated above, includes a Type field, a Length field, a Flags field, an Algorithm field, and an SID/Index/Label field. The Flags field is a 1-octet field including a set of one-bit flags configured to indicate various characteristics of the SID/Index/Label field. The Flags field of the Prefix-SID has the following format:

```
 0 1 2 3 4 5 6 7
+-+-+-+-+-+-+-+-+
|R|N|P|E|V|L|X| |
+-+-+-+-+-+-+-+-+
```

The R, N, P, E, V, and L Flags of the Flags field of the Prefix-SID use the encoding and rules as described in Section 2.1 of SR-ISIS-DRAFT. Various example embodiments for supporting packet forwarding in label switched packet networks introduce a Flexi-MPLS flag that is denoted as the X-Flag bit (underlined in the Flag field format provided above). The X-Flag is configured such that, if set (e.g., equal to "1"), then the value carried by the SID/Index/Label field of the Prefix-SID is generated for Flexi-MPLS data plane.

Various example embodiments for supporting packet forwarding in label switched packet networks are configured to support use of the Adjacency-SID for Flexi-MPLS in IS-IS. Section 2.2 in SR-ISIS-DRAFT describes two types of SIDs at per-Adjacency Levels: Adj-SID and LAN-Adj-SID. The encoding for both is the same (as shown below), except that the 6-octet System-ID typically is present in LAN-Adj-SID and not in the Adj-SID. Section 2.1 in SR-ISIS-DRAFT describes the format for Adjacency-SID as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |    Weight     |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                      System-ID  (6 octets)                    |
+                               +-+-+-+-+-+-+-+-+-+-+-+-+-+-+-+-+
|                               |
+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                   SID/Label/Index  (variable)                 |
+-+-+-+-+-+-+-+-+-+-+-+-+-+-+-+-+-+-+-+-+-+-+-+-+-+-+-+-+-+-+-+-+
```

The Adjacency-SID, as indicated above, includes a Type field, a Length field, a Flags field, a Weight field, a System ID field, and an SID/Index/Label field. The Flags field is a 1-octet field including a set of one-bit flags configured to indicate various characteristics of the SID/Index/Label field. The Flags field of the Adjacency-SID has the following format:

```
 0 1 2 3 4 5 6 7
+-+-+-+-+-+-+-+-+
|F|B|V|L|S|P|X| |
+-+-+-+-+-+-+-+-+
```

The F, B, V, L, S, and P Flags of the Flags field of the Adjacency-SID use the encoding and rules as described in Section 2.2 of SR-ISIS-DRAFT. Various example embodiments for supporting packet forwarding in label switched packet networks introduce a Flexi-MPLS flag that is denoted as the X-Flag bit (underlined in the Flag field format provided above). The X-Flag is configured such that, if set (e.g., equal to "1"), then the value carried by the SID/Index/Label field of the Adj-SID/LAN-Adj-SID is generated for Flexi-MPLS data plane.

Various example embodiments for supporting packet forwarding in label switched packet networks are configured to support advertisement of Flexi-MPLS capabilities based on IS-IS.

In general, SR typically relies upon each router advertising its SR data plane capability and the range of MPLS label values it uses for SR in the case where global SIDs (i.e., global indexes) are allocated.

Section 3 in SR-ISIS-DRAFT describes an SR-Capabilities sub-TLV to be inserted into IS-IS Router Capabilities TLV-242. Section 3 in SR-ISIS-DRAFT describes the format for SR-Capabilities sub-TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-
|                         Range                 |
+-+-+-+-+-+-+-+-+-+-+-+-+-+-+-+-+-+-+-+-+-+-+-+-+-+-+-+-+-+-+-+-
//              SID/Label Sub-TLV   (variable)                //
+-+-+-+-+-+-+-+-+-+-+-+-+-+-+-+-+-+-+-+-+-+-+-+-+-+-+-+-+-+-+-+-
```

The SR-Capabilities sub-TLV, as indicated above, includes a Type field, a Length field, and a Flags field, followed by one or more Segment Routing Global Block (SRGB) descriptor entries.

The Type field of the SR-Capabilities sub-TLV is a 1-octet field that is configured to indicate a type of the SR-Capabilities sub-TLV. The value of the Type field has yet to be determined (e.g., a value of 2 is suggested; however, it will be appreciated that other suitable values may be used).

The Length field of the SR-Capabilities sub-TLV is a 1-octet field configured to indicate a length of SR-Capabilities sub-TLV. The value of the Length field is variable.

The Flags field of the SR-Capabilities sub-TLV is a 1-octet field including a set of one-bit flags configured to indicate various capabilities. The Flags field of the SR-Capabilities sub-TLV has the following format:

```
 0 1 2 3 4 5 6 7
+-+-+-+-+-+-+-+-+
|I|V|X|         |
+-+-+-+-+-+-+-+-+
```

The I and V Flags of the Flags field of the SR-Capabilities sub-TLV use the encoding and rules as described in Section 3.1 of SR-ISIS-DRAFT. The I-Flag is the MPLS IPv4 flag which is configured such that, if set (e.g., equal to "1"), then the router is capable of processing SR MPLS encapsulated IPv4 packets on all interfaces. The V-Flag is the MPLS IPv6 flag which is configured such that, if set (e.g., equal to "1"), then the router is capable of processing SR MPLS encapsulated IPv6 packets on all interfaces. Various example embodiments for supporting packet forwarding in label switched packet networks introduce a Flexi-MPLS flag that is denoted as the X-Flag bit (underlined in the Flag field format provided above). The X-Flag is configured such that, if set (e.g., equal to "1"), then the router is capable of processing SR Flexi-MPLS encapsulated packets on all interfaces.

The SR-Capabilities sub-TLV, as noted above, includes multiple SRGB descriptor entries. As indicated above, each SRGB descriptor entry has 3-octets of Range and SID/Label Sub-TLV. The SID/Label Sub-TLV includes the first value of the SRGB, while the Range includes the number of SRGB elements.

Section 2.3 in SR-ISIS-DRAFT describes the format for the SID/Label sub-TLV for MPLS as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|                   SID/Label   (variable)                     |
+-+-+-+-+-+-+-+-+-+-+-+-+-+-+-+-+-+-+-+-+-+-+-+-+-+-+-+-+-+-+-+-+
```

The SID/Label sub-TLV for MPLS, as indicated above, includes a Type field, a Length field, and an SID/Label field. The value of the Type field has yet to be determined (e.g., a value of 1 is suggested; however, it will be appreciated that other suitable values may be used). The value of the Length field is variable (3 bytes or 4 bytes). The SID/Label field is a variable length field that is configured such that, if the length Field is set to 3, then the 20 rightmost bits of the SID/Label field represent an MPLS label.

Various example embodiments for supporting packet forwarding in label switched packet networks are configured to support an SID/Label sub-TLV for Flexi-MPLS. The SID/Label sub-TLV for Flexi-MPLS may have the same format as the SID/Label sub-TLV for MPLS (e.g., as defined in Section 2.3 in SR-ISIS-DRAFT for MPLS). Namely, the format for the SID/Label sub-TLV for Flexi-MPLS may be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|                   SID/Label   (variable)                     |
+-+-+-+-+-+-+-+-+-+-+-+-+-+-+-+-+-+-+-+-+-+-+-+-+-+-+-+-+-+-+-+-+
```

The SID/Label sub-TLV for Flexi-MPLS, as indicated above, includes a Type field, a Length field, and an SID/Label field. The value of the Type field has yet to be determined (e.g., a value of 2 is suggested; however, it will be appreciated that other suitable values may be used). The value that is ultimately used for the Type field for the SID/Label sub-TLV for Flexi-MPLS (e.g., 2 as suggested above, or some other suitable value) indicates that the SID/Label belongs to Flexi-MPLS Label Space. The value of the Length field is variable. The SID/Label field is a variable length field that includes a Flexi-MPLS label.

Section 3.3 in SR-ISIS-DRAFT describes the SR Local Block Sub-TLV that includes the range of labels that the node has reserved for Adjacency-SIDs. As an example, an application or a controller may instruct the router to allocate a specific local SID. As such, in order for such applications or controllers to know the local SIDs available in the router, the router advertises its SRLB. The format of the SR Local Block Sub-TLV is same as the format for the SR-Capabilities Sub-TLV described above; however, no Flags were defined in SR-ISIS-DRAFT for the SR Local Block Sub-TLV. Various example embodiments for supporting packet forwarding in label switched packet networks introduce a Flexi-MPLS flag for the SR Local Block Sub-TLV as follows:

```
0 1 2 3 4 5 6 7
+-+-+-+-+-+-+-+-+
|X|             |
+-+-+-+-+-+-+-+-+
```

As noted above, various example embodiments for supporting packet forwarding in label switched packet networks introduce a Flexi-MPLS flag that is denoted as the X-flag bit (underlined in the Flag field format provided above). The X-Flag is configured such that, if set (e.g., equal to "1"), this indicates that the local blocks are mapped into the Flexi-MPLS label space.

Various example embodiments for supporting packet forwarding in label switched packet networks are configured to support use of the SID-Label Binding TLV for Flexi-MPLS in IS-IS.

Section 2.4 in SR-ISIS-DRAFT describes an SID/Label Binding TLV that is used to advertise prefixes to SID/Label mappings. This functionality is called Segment Routing Mapping Server (SRMS). The SRMS function of an SR capable router allows distribution of mappings for prefixes not locally attached to the advertising router and, therefore, allows advertisement of mappings on behalf of non-SR capable routers. Section 2.4 in SR-ISIS-DRAFT describes the format for the SID/Label Binding TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |   Length      |    Flags      |   RESERVED    |
+-+-+-+-+-+-+-+-+-+-+-+-+-+-+-+-+-+-+-+-+-+-+-+-+-+-+-+-+-+-+-+-+
|          Range                |  Prefix Length |   Prefix     |
+-+-+-+-+-+-+-+-+-+-+-+-+-+-+-+-+-+-+-+-+-+-+-+-+-+-+-+-+-+-+-+-+
//                   Prefix (continued, variable)              //
+-+-+-+-+-+-+-+-+-+-+-+-+-+-+-+-+-+-+-+-+-+-+-+-+-+-+-+-+-+-+-+-+
|                      SubTLVs    (variable)                    |
+-+-+-+-+-+-+-+-+-+-+-+-+-+-+-+-+-+-+-+-+-+-+-+-+-+-+-+-+-+-+-+-+
```

The SID/Label Binding TLV, as indicated above, includes a Type field, a Length field, and a Flags field, followed by various other fields. The value of the Type field has yet to be determined (e.g., a value of 149 is suggested; however, it will be appreciated that other suitable values may be used). The Flags field is a 1-octet field including a set of one-bit flags configured to indicate various characteristics. The Flags field of the SID/Label Binding TLV has the following format:

```
0 1 2 3 4 5 6 7
+-+-+-+-+-+-+-+-+
|F|M|S|D|A|X|   |
+-+-+-+-+-+-+-+-+
```

The F, M, S, D, and A Flags of the Flags field of the SID/Label Binding TLV use the encoding and rules as described in Section 2.4 of SR-ISIS-DRAFT. Various example embodiments for supporting packet forwarding in label switched packet networks introduce a Flexi-MPLS flag that is denoted as the X-Flag bit (underlined in the Flag field format provided above). The X-Flag is configured such that, if set (e.g., equal to "1"), then the mappings in the SID/Label Binding TLV are from the Flexi-MPLS label space.

Section 2.5 in SR-ISIS-DRAFT describes a Multi-Topology SID-Label Binding TLV that is used to advertise prefixes to SID/Label mappings in Multi-Topology scenarios. Section 2.5 in SR-ISIS-DRAFT describes the format for the Multi-Topology SID-Label Binding TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |   Length      |              MTID             |
+-+-+-+-+-+-+-+-+-+-+-+-+-+-+-+-+-+-+-+-+-+-+-+-+-+-+-+-+-+-+-+-+
|    Flags      |   RESERVED    |            Range              |
+-+-+-+-+-+-+-+-+-+-+-+-+-+-+-+-+-+-+-+-+-+-+-+-+-+-+-+-+-+-+-+-+
| Prefix Length |          Prefix  (variable)                  //
+-+-+-+-+-+-+-+-+-+-+-+-+-+-+-+-+-+-+-+-+-+-+-+-+-+-+-+-+-+-+-+-+
|                      SubTLVs    (variable)                    |
+-+-+-+-+-+-+-+-+-+-+-+-+-+-+-+-+-+-+-+-+-+-+-+-+-+-+-+-+-+-+-+-+
```

The SID/Label Binding TLV, as indicated above, includes a Type field, a Length field, an MTID field, and a Flags field, followed by various other fields. The value of the Type field has yet to be determined (e.g., a value of 150 is suggested; however, it will be appreciated that other suitable values may be used). The Flags field is a 1-octet field including a set of one-bit flags configured to indicate various characteristics. The Flags field of the Multi-Topology SID-Label Binding TLV has the following format:

```
0 1 2 3 4 5 6 7
+-+-+-+-+-+-+-+-+
|F|M|S|D|A|X|   |
+-+-+-+-+-+-+-+-+
```

The F, M, S, D, and A Flags of the Flags field of the Multi-Topology SID-Label Binding TLV use the encoding and rules as described in Section 2.5 of SR-ISIS-DRAFT. Various example embodiments for supporting packet forwarding in label switched packet networks introduce a Flexi-MPLS flag that is denoted as the X Flag (underlined in the Flag field format provided above). The X-Flag is configured such that, if set (e.g., equal to "1"), then the mappings in the Multi-Topology SID/Label Binding TLV are from the Flexi-MPLS label space.

Various example embodiments for supporting packet forwarding in label switched packet networks are configured to support use of IS-IS for SR with Flexi-MPLS in various other ways.

Various example embodiments for supporting packet forwarding in label switched packet networks are configured to support use of OSPF for SR with Flexi-MPLS.

Various example embodiments for supporting packet forwarding in label switched packet networks are configured to support use of OSPF, for SR with Flexi-MPLS, for advertising various types of control plane information in various ways. It is noted that OSPF extensions for SR are being standardized in the IETF in the "OSPF Extensions for Segment Routing" draft (also denoted as SR-OSPF-DRAFT). SR-OSPF-DRAFT describes various SR SIDs distributed by the OSPF Protocol. An SID describes a label mapping assigned to a specific segment in the network. SR-OSPF-DRAFT defines the encodings for Prefix-SID, the Adjacency-SID, the LAN-Adjacency-SID, and the Binding-SID. Also, SR-OSPF-DRAFT describes the procedures for advertising SR capabilities by a router. Various example embodiments for supporting packet forwarding in label switched packet networks are configured to support new SID definitions and SR capabilities, which align with the approach in SR-OSPF-DRAFT, to distribute label mappings for the Flexi-MPLS data plane. It is noted that the procedures in SR-OSPF-DRAFT may be applicable to the new SID definitions as is, unless specified otherwise herein.

Various example embodiments for supporting packet forwarding in label switched packet networks are configured to support use of the Prefix-SID for Flexi-MPLS in OSPF. Section 5 in SR-OSPF-DRAFT defines Prefix-SID. Prefix-SID represents a label mapping of a routable IPv4 prefix in the network and is distributed with a Prefix LSA as its attribute (sub-TLV). Specifically, Prefix-SID Sub-TLV is a sub-TLV of the OSPF Extended Prefix TLV and OSPF Extended Prefix Range TLV. Section 5 in SR-OSPF-DRAFT describes the format for Prefix-SID as follows:

```
        0                   1                   2                   3
        0 1 2 3 4 5 6 7 8 9 0 1 2 3 4 5 6 7 8 9 0 1 2 3 4 5 6 7 8 9 0 1
       +-+-+-+-+-+-+-+-+-+-+-+-+-+-+-+-+-+-+-+-+-+-+-+-+-+-+-+-+-+-+-+-
       |         Type              |            Length                |
       +-+-+-+-+-+-+-+-+-+-+-+-+-+-+-+-+-+-+-+-+-+-+-+-+-+-+-+-+-+-+-+-
       |   Flags    |   Reserved   |    MT-ID     |   Algorithm       |
       +-+-+-+-+-+-+-+-+-+-+-+-+-+-+-+-+-+-+-+-+-+-+-+-+-+-+-+-+-+-+-+-
       |                   SID/Index/Label  (variable)                |
       +-+-+-+-+-+-+-+-+-+-+-+-+-+-+-+-+-+-+-+-+-+-+-+-+-+-+-+-+-+-+-+-
```

The Prefix-SID, as indicated above, includes a Type field, a Length field, a Flags field, followed by various other fields (including a SID/Index/Label field). The Flags field is a 1-octet field including a set of one-bit flags configured to indicate various characteristics of the SID/Index/Label field. The Flags field of the Prefix-SID has the following format:

```
               0 1 2 3 4 5 6 7
              +---+---+---+---+---+---+---+---+
              |    |NP|M|E|V|L|X|    |
              +---+---+---+---+---+---+---+---+
```

The NP, M, E, V, and L Flags of the Flags field of the Prefix-SID use the encoding and rules as described in Section 5 of SR-OSPF-DRAFT. Various example embodiments for supporting packet forwarding in label switched packet networks introduce a Flexi-MPLS flag that is denoted as the X-flag bit (underlined in the Flag field format provided above). The X-Flag is configured such that, if set (e.g., equal to "1"), then the value carried by the SID/Index/Label field of the Prefix-SID is the label mapping for Flexi-MPLS data plane.

Various example embodiments for supporting packet forwarding in label switched packet networks are configured to support use of the Adjacency-SID for Flexi-MPLS in OSPF. Section 6 in SR-OSPF-DRAFT describes two types of SIDs as label mapping per Adjacency Level: Adj-SID (defined in Section 6.1 of SR-OSPF-DRAFT) and LAN-Adj-SID (defined in Section 6.2 of SR-OSPF-DRAFT). The formats for the Adjacency-SIDs are as follows:

```
Adj-SID
-----------

0                   1                   2                   3
        0 1 2 3 4 5 6 7 8 9 0 1 2 3 4 5 6 7 8 9 0 1 2 3 4 5 6 7 8 9 0 1
       +-+-+-+-+-+-+-+-+-+-+-+-+-+-+-+-+-+-+-+-+-+-+-+-+-+-+-+-+-+-+-+-+
       |         Type              |            Length                |
       +-+-+-+-+-+-+-+-+-+-+-+-+-+-+-+-+-+-+-+-+-+-+-+-+-+-+-+-+-+-+-+-+
       |   Flags    |   Reserved   |    MT-ID     |     Weight        |
       +-+-+-+-+-+-+-+-+-+-+-+-+-+-+-+-+-+-+-+-+-+-+-+-+-+-+-+-+-+-+-+-+
       |                   SID/Label/Index  (variable)                |
       +--------------------------------------------------------------+

LAN-Adj-SID
-----------

0                   1                   2                   3
        0 1 2 3 4 5 6 7 8 9 0 1 2 3 4 5 6 7 8 9 0 1 2 3 4 5 6 7 8 9 0 1
       +-+-+-+-+-+-+-+-+-+-+-+-+-+-+-+-+-+-+-+-+-+-+-+-+-+-+-+-+-+-+-+-+
       |         Type              |            Length                |
       +-+-+-+-+-+-+-+-+-+-+-+-+-+-+-+-+-+-+-+-+-+-+-+-+-+-+-+-+-+-+-+-+
       |   Flags    |   Reserved   |    MT-ID     |     Weight        |
       +-+-+-+-+-+-+-+-+-+-+-+-+-+-+-+-+-+-+-+-+-+-+-+-+-+-+-+-+-+-+-+-+
       |                         Neighbor ID                          |
       +-+-+-+-+-+-+-+-+-+-+-+-+-+-+-+-+-+-+-+-+-+-+-+-+-+-+-+-+-+-+-+-+
       |                   SID/Label/Index  (variable)                |
       +--------------------------------------------------------------+
```

The Adjacency-SIDs, as indicated above, each include a Type field, a Length field, and a Flags field, followed by various other fields. The Flags field, for both the Adj-SID and the LAN-Adj-SID, is a 1-octet field including a set of one-bit flags configured to indicate various characteristics of the SID/Index/Label field. The Flags field of the Adjacency-SIDs has the following format:

```
               0 1 2 3 4 5 6 7
              +-+-+-+-+-+-+-+-+
              |B|V|L|G|P|X|   |
              +-+-+-+-+-+-+-+-+
```

The B, V, L, G, and P Flags of the Flags field of the Adjacency-SID use the encoding and rules as described in Section 6.1 of SR-OSPF-DRAFT. Various example embodiments for supporting packet forwarding in label switched packet networks introduce a Flexi-MPLS flag that is denoted as the X Flag (underlined in the Flag field format provided above). The X Flag is configured such that, if set (e.g., equal to "1"), then the value of the SID/Label/Index field carried by the Adjacency-SID is the label mapping for the Flexi-MPLS data plane.

Various example embodiments for supporting packet forwarding in label switched packet networks are configured to support advertisement of Flexi-MPLS capabilities based on OSPF.

In general, SR typically relies upon each router advertising its SR data plane capability and the range of MPLS label values it uses for SR in the case where global SIDs (i.e., global indexes) are allocated. Section 3 in SR-OSPF-DRAFT describes procedures for SR-Capabilities in OSPF. SR Capabilities in OSPF are advertised in the following TLVs within the Router Information Opaque LSA: (1) SR Algorithm TLV, (2) SID/Label Range TLV, (3) SR Local Block TLV, and (4) SRMS Preference TLV. As discussed further below, Flexi-MPLS capabilities may be advertised using the SID/Label Range TLV and the SR Local Block TLV.

Various example embodiments for supporting packet forwarding in label switched packet networks are configured to support advertisement of Flexi-MPLS Label Range in the SID/Label Range TLV.

As per Section 5 in SR-OSPF-DRAFT, Prefix SIDs may be advertised in the form of an index. Such index defines the offset in the SID/Label space advertised by the router. The SID/Label Range TLV is used to advertise such MPLS SID/Label space. The SID/Label Range TLV is a top-level TLV of the Router Information Opaque LSA (which is defined in RFC 7770). Section 5 in SR-OSPF-DRAFT states that the SID/Label Range TLV may appear multiple times in the Router Information Opaque LSA. Section 3.2 in SR-OSPF-DRAFT describes the format for the SID/Label Range TLV as follows:

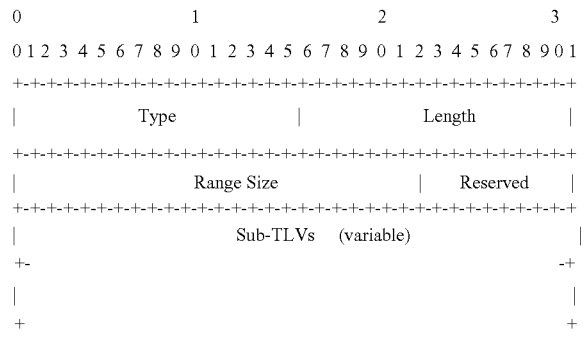

The SID/Label Range TLV, as indicated above, includes a Type field, a Length field, and a Range Size field, followed by various other fields. The value of the Type field is 9. The Length field is variable and dependent on the sub-TLVs. The Range Size field is a 3-octet field that includes the SID/label range size (i.e., the number of SID or labels in the range, including the first SID/label). It is noted that the Range Size field will be greater than 0.

As per Section 5 in SR-OSPF-DRAFT, the Sub-TLV that is initially supported for the SID/Label Range TLV is the SID/Label Sub-TLV. Section 2.1 in SR-OSPF-DRAFT describes the format for SID/Label Sub-TLV as follows:

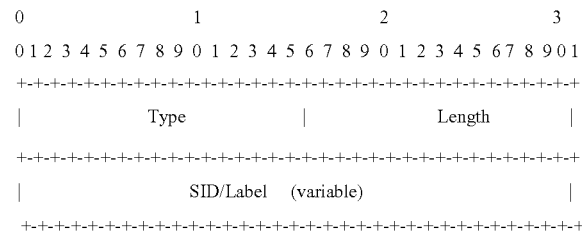

The SID/Label Sub-TLV, as indicated above, includes a Type field, a Length field, and an SID/Label field. The value of the Type field has yet to be determined (e.g., a value of 1 is suggested; however, it will be appreciated that other suitable values may be used). The Length field is variable (e.g., it may be 3 or 4 octets). The SID/Label field is a variable length field that is configured such that: (1) if length is set to 3, then the 20 rightmost bits of the SID/Label field represent a label and (2) if length is set to 4, then the value of the SID/Label field represents a 32-bit SID. SR-OSPF-DRAFT indicates that the receiving router ignores the SID/Label Sub-TLV if the length is other then 3 or 4. SR-OSPF-DRAFT indicates that the SID/Label Sub-TLV is to be included in the SID/Label Range TLV. SR-OSPF-DRAFT indicates that the SID/Label advertised in the SID/Label Sub-TLV represents the first SID/Label in the advertised range. SR-OSPF-DRAFT indicates that a single SID/Label Sub-TLV may be advertised in the SID/Label Range TLV and that, if more than one SID/Label Sub-TLV is present, the SID/Label Range TLV is to be ignored.

As noted above, various example embodiments for supporting packet forwarding in label switched packet networks are configured to support advertisement of Flexi-MPLS Label Range in the SID/Label Range TLV. The Flexi-MPLS Label Range may be advertised using a Flexi-MPLS SID/Label Sub-TLV, which may have the same format as the SID/Label Sub-TLV defined in Section 5 of SR-OSPF-DRAFT and provided above (but using a different Type). The presence of the Flexi-MPLS SID/Label Sub-TLV in the SID/Label Range TLV indicates that the SID/Label carried by the Flexi-MPLS SID/Label Sub-TLV is allocated from Flexi-MPLS Label Space. The Flexi-MPLS SID/Label Sub-TLV may have the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |            Length             |
+-+-+-+-+-+-+-+-+-+-+-+-+-+-+-+-+-+-+-+-+-+-+-+-+-+-+-+-+-+-+-+-+
|                       SID/Label (variable)                    |
+-+-+-+-+-+-+-+-+-+-+-+-+-+-+-+-+-+-+-+-+-+-+-+-+-+-+-+-+-+-+-+-+
```

The Flexi-MPLS SID/Label Sub-TLV, as indicated above, includes a Type field, a Length field, and an SID/Label field. The value of the Type field has yet to be determined (e.g., a value of 4 is suggested; however, it will be appreciated that other suitable values may be used). The Length field is variable (e.g., it may be 3 or 4 octets). The SID/Label field is a variable length field that is configured such that: (1) if length is set to 3, then the 20 rightmost bits of the SID/Label field represent a label and (2) if length is set to 4, then the value of the SID/Label field represents a 32-bit SID. As indicated above, the presence of the Flexi-MPLS SID/Label Sub-TLV in the SID/Label Range TLV indicates that the SID/Label carried by the Flexi-MPLS SID/Label Sub-TLV is allocated from Flexi-MPLS Label Space. For Flexi-MPLS, an OSPF router that supports Flexi-MPLS data plane is expected to send an SID/Label Range TLV that includes a Flexi-MPLS SID/Label Sub-TLV (e.g., type=4), which indicates that the OSPF router is capable of forwarding Flexi-MPLS packets. It is noted that any Flexi-MPLS Prefix SIDs advertised by the OSPF router in the form of an index will be the offset into the Flexi-MPLS label space advertised in the Flexi-MPLS SID/Label Sub-TLV.

Various example embodiments for supporting packet forwarding in label switched packet networks are configured to support advertisement of Flexi-MPLS Label Range in the SR Local Block TLV.

Section 3.3 in SR-OSPF-DRAFT describes the SR Local Block (SRLB) TLV. The SRLB TLV includes the range of labels that the node has reserved for local SIDs. SIDs from the SRLB may be used for Adjacency-SIDs, but also by components other than the OSPF protocol. As an example, an application or a controller may instruct the router to allocate a specific local SID. Some controllers or applications may use the control plane to discover the available set of local SIDs on a particular router. In such cases, the SRLB TLV is advertised in the control plane. The SRLB TLV is a top-level TLV of the Router Information Opaque LSA (which is defined in RFC 7770). Section 3.3 in SR-OSPF-DRAFT states that the SRLB TLV may appear multiple times in the Router Information Opaque LSA. Section 3.3 in SR-OSPF-DRAFT describes the format for the SRLB TLV as follows:

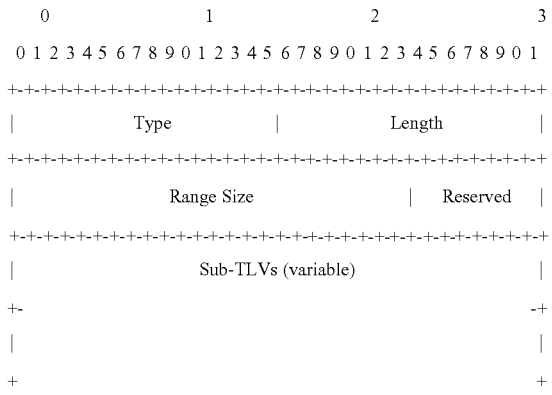

The SRLB TLV, as indicated above, includes a Type field, a Length field, and a Range Size field, followed by various other fields. The value of the Type field has yet to be determined (e.g., a value of 12 is suggested; however, it will be appreciated that other suitable values may be used). The Length field is variable and dependent on the sub-TLVs. The Range Size field is a 3-octet field that includes the SID/label range size (i.e., the number of SID or labels in the range, including the first SID/label). It is noted that the Range Size field will be greater than 0.

As per Section 2.1 in SR-OSPF-DRAFT, the Sub-TLV that is initially supported for the SRLB TLV is the SID/Label Sub-TLV. The SID/Label Sub-TLV is to be included in the SRLB TLV. The SID/Label advertised in the SID/Label Sub-TLV represents the first SID/Label in the advertised range. Section 2.1 in SR-OSPF-DRAFT describes the format for SID/Label Sub-TLV as follows:

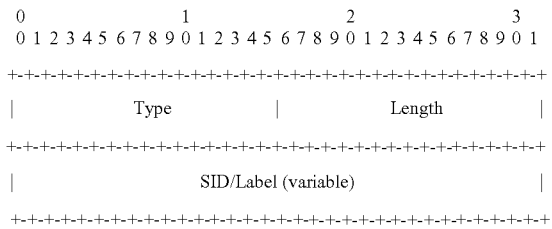

The SID/Label Sub-TLV, as indicated above, includes a Type field, a Length field, and an SID/Label field. The value of the Type field has yet to be determined (e.g., a value of 1 is suggested; however, it will be appreciated that other suitable values may be used). The Length field is variable (e.g., it may be 3 or 4 octets). The SID/Label field is a variable length field that is configured such that: (1) if length is set to 3, then the 20 rightmost bits of the SID/Label field represent a label and (2) if length is set to 4, then the value of the SID/Label field represents a 32-bit SID. SR-OSPF-DRAFT indicates that the SID/Label advertised in the SID/Label Sub-TLV represents the first SID/Label in the advertised range. SR-OSPF-DRAFT indicates that a single SID/Label Sub-TLV may be advertised in the SRLB TLV and that, if more than one SID/Label Sub-TLV is present, the SRLB TLV is to be ignored.

As noted above, various example embodiments for supporting packet forwarding in label switched packet networks are configured to support advertisement of Flexi-MPLS Label Range in the SRLB TLV. The Flexi-MPLS Label Range may be advertised using a Flexi-MPLS SID/Label Sub-TLV, which may have the same format as the SID/Label Sub-TLV defined in Section 5 of SR-OSPF-DRAFT and provided above (but using a different Type). The presence of the Flexi-MPLS SID/Label Sub-TLV in the SRLB TLV indicates that the SID/Label carried by the Flexi-MPLS SID/Label Sub-TLV is allocated from Flexi-MPLS Label Space. The Flexi-MPLS SID/Label Sub-TLV may have the following format:

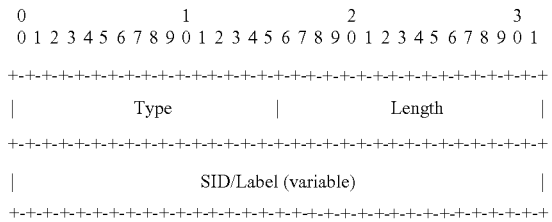

The Flexi-MPLS SID/Label Sub-TLV, as indicated above, includes a Type field, a Length field, and an SID/Label field. The value of the Type field has yet to be determined (e.g., a value of 4 is suggested; however, it will be appreciated that other suitable values may be used). The Length field is variable (e.g., it may be 3 or 4 octets). The SID/Label field is a variable length field that is configured such that: (1) if length is set to 3, then the 20 rightmost bits of the SID/Label field represent a label and (2) if length is set to 4, then the value of the SID/Label field represents a 32-bit SID. As indicated above, the presence of the Flexi-MPLS SID/Label Sub-TLV in the SID/Label Range TLV indicates that the SID/Label carried by the Flexi-MPLS SID/Label Sub-TLV is allocated from Flexi-MPLS Label Space. For Flexi-MPLS, an OSPF router that supports Flexi-MPLS data plane is expected to send an SRLB TLV that includes a Flexi-MPLS SID/Label Sub-TLV (e.g., type=4), which indicates that the OSPF router is capable of forwarding Flexi-MPLS packets. It is noted that any Flexi-MPLS Prefix SIDs advertised by the OSPF router in the form of an index will be the offset into the Flexi-MPLS label space advertised in the Flexi-MPLS SID/Label Sub-TLV in the SRLB TLV.

Various example embodiments for supporting packet forwarding in label switched packet networks are configured to support advertisement of the Extended Prefix Range TLV for Flexi-MPLS in OSPF.

Section 4 in SR-OSPF-DRAFT defines an OSPF Extended-Prefix-Range-TLV which is used to distribute Prefix-to-Label Mappings for prefixes injected externally into the OSPF domain. Such injection may be done from a Segment Routing Mapping Server (SRMS). The Extended- Prefix-Range-TLV is carried within an Extended-Prefix-LSA as a top-level TLV. Section 4 in SR-OSPF-DRAFT describes the format for the Extended-Prefix-Range-TLV as follows:

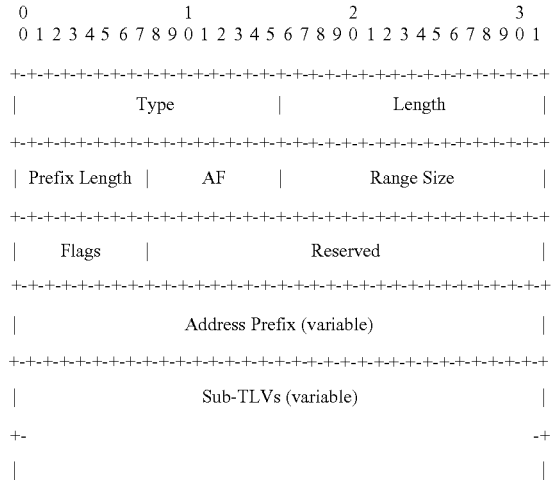

The Extended-Prefix-Range-TLV, as indicated above, includes a Type field, a Length field, a Prefix Length field, an AF field, a Range Size field, a Flags field, and various other fields. The Flags field is a 1-octet field including a set of one-bit flags configured to indicate various characteristics of the Prefix Range. The Flags field of the Extended-Prefix-Range-TLV has the following format:

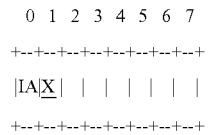

The IA Flag of the Flags field of the Extended-Prefix-Range-TLV uses the encoding and rules as described in Section 4 of SR-OSPF-DRAFT. Various example embodiments for supporting packet forwarding in label switched packet networks introduce a Flexi-MPLS flag that is denoted as the X Flag (underlined in the Flag field format provided above). The X Flag is configured such that, if set (e.g., equal to "1"), then the Prefix Range is generated for the Flexi-MPLS data plane.

Various example embodiments for supporting packet forwarding in label switched packet networks are configured to support use of OSPF for SR with Flexi-MPLS in various other ways.

Various example embodiments for supporting packet forwarding in label switched packet networks are configured to support use of OSPFv3 for SR with Flexi-MPLS.

Various example embodiments for supporting packet forwarding in label switched packet networks are configured to support use of OSPFv3, for SR with Flexi-MPLS, for advertising various types of control plane information in various ways. It is noted that OSPFv3 extensions for segment routing are being standardized in the IETF in the "OSPFv3 Extensions for Segment Routing" draft (also denoted as SR-OSPFv3-DRAFT). SR-OSPFv3-DRAFT describes various SR SIDs and SR Capabilities distributed by the OSPFv3 Protocol. A SID describes a label mapping assigned to a specific segment in the network. Various example embodiments for supporting packet forwarding in label switched packet networks are configured to support new SID definitions and segment routing capabilities, which align with the approach in SR-OSPFv3-DRAFT, to distribute label mappings for the Flexi-MPLS data plane. It is noted that the procedures in SR-OSPFv3-DRAFT may be applicable to these new definitions as is, unless specified otherwise herein.

Various example embodiments for supporting packet forwarding in label switched packet networks are configured to support use of the Prefix-SID for Flexi-MPLS in OSPF. Section 5 in SR-OSPFv3-DRAFT defines the Prefix-SID. Prefix-SID represents a label mapping of a routable IPv6 prefix in the network and is distributed with a Prefix LSA as its attribute (sub-TLV). Specifically, the Prefix-SID Sub-TLV is a sub-TLV of the following TLVs: (1) Intra-Area Prefix TLV, (2) Inter-Area Prefix TLV, (3) External Prefix TLV, and (4) OSPFv3 Extended Prefix Range TLV. Section 5 in SR-OSPFv3-DRAFT describes the format for Prefix-SID Sub-TLV as follows:

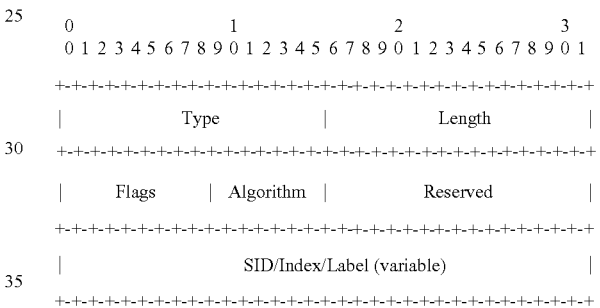

The Prefix-SID sub-TLV, as indicated above, includes a Type field, a Length field, a Flags field, and various other fields. The Flags field is a 1-octet field including a set of one-bit flags configured to indicate various characteristics of the SID/Index/Label field. The Flags field of the Prefix-SID sub-TLV has the following format:

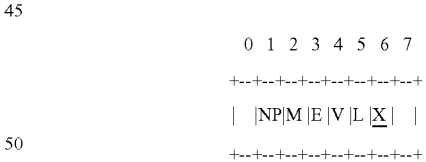

The NP, M, E, V, and L Flags of the Flags field of the Prefix-SID sub-TLV use the encoding and rules as described in Section 5 of SR-OSPFv3-DRAFT. Various example embodiments for supporting packet forwarding in label switched packet networks introduce a Flexi-MPLS flag that is denoted as the X Flag (underlined in the Flag field format provided above). The X Flag is configured such that, if set (e.g., equal to "1"), then the value of the SID/Index/Label field carried by the Prefix-SID sub-TLV is generated for the Flexi-MPLS data plane.

Various example embodiments for supporting packet forwarding in label switched packet networks are configured to support use of the Adjacency-SID for Flexi-MPLS in OSPFv3. Section 7 in SR-OSPFv3-DRAFT describes two types of SIDs as label mapping per IPv6 Adjacency Level:

Adj-SID (defined in Section 7.1 of SR-OSPFv3-DRAFT) and LAN-Adj-SID (defined in Section 7.2 of SR-OSPFv3-DRAFT). The formats for the Adjacency-SIDs are as follows:

Adj-SID
----------

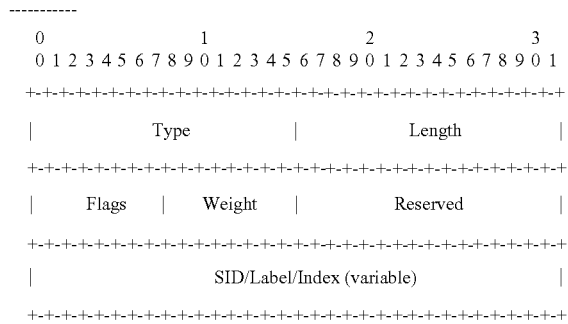

LAN-Adj-SID
-----------------

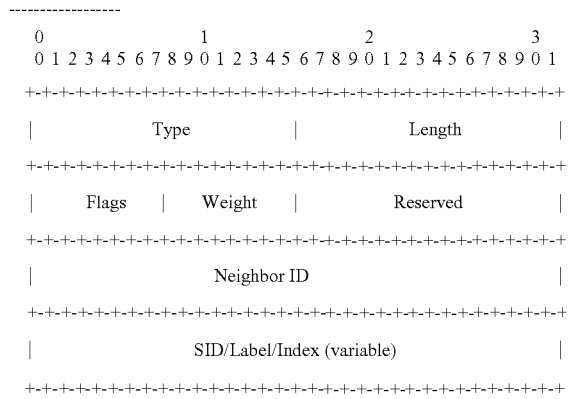

The Adjacency-SIDs, as indicated above, each include a Type field, a Length field, and a Flags field, followed by various other fields. The Flags field, for both the Adj-SID and the LAN-Adj-SID, is a 1-octet field including a set of one-bit flags configured to indicate various characteristics of the SID/Label/Index field. The Flags field of the Adjacency-SIDs has the following format:

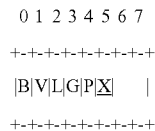

The B, V, L, G, and P Flags of the Flags field of the Adjacency-SID use the encoding and rules as described in Section 7.1 of SR-OSPFv3-DRAFT. Various example embodiments for supporting packet forwarding in label switched packet networks introduce a new Flexi-MPLS flag that is denoted as the X Flag (underlined in the Flag field format provided above). The X Flag is configured such that, if set (e.g., equal to "1"), then the value of the SID/Label/Index field carried by the Adjacency-SID is a label mapping for the Flexi-MPLS data plane.

Various example embodiments for supporting packet forwarding in label switched packet networks are configured to support advertisement of Flexi-MPLS capabilities based on OSPFv3.

In general, SR typically relies upon each router advertising its SR data plane capability and the range of MPLS label values it uses for SR in the case where global SIDs (i.e., global indexes) are allocated. Section 3 in SR-OSPFv3-DRAFT describes procedures for SR-Capabilities in OSPFv3. SR Capabilities in OSPFv3 are advertised in the following TLVs within the OSPFv3 Router Information LSA (which is defined in RFC 4970): (1) SR Algorithm TLV, (2) SID/Label Range TLV, (3) SR Local Block TLV, (4) SRMS Preference TLV, and (5) SR Forwarding Capabilities. As discussed further below, the Flexi-MPLS capabilities may be advertised using the SID/Label Range TLV, the SR Local Block TLV, and the SR Forwarding Capabilities.

Various example embodiments for supporting packet forwarding in label switched packet networks are configured to support advertisement of Flexi-MPLS Label Range in the SID/Label Range TLV.

As per Section 5 in SR-OSPFv3-DRAFT, Prefix SIDs may be advertised in a form of an index, where the index defines the offset in the SID/Label space advertised by the router. The SID/Label Range TLV is used to advertise such an MPLS SID/Label space. Section 3.2 in SR-OSPFv3-DRAFT states that the SID/Label Range TLV may appear multiple times in the OSPFv3 Router Information LSA. Section 3.2 in SR-OSPFv3-DRAFT describes the format for the SID/Label Range TLV as follows:

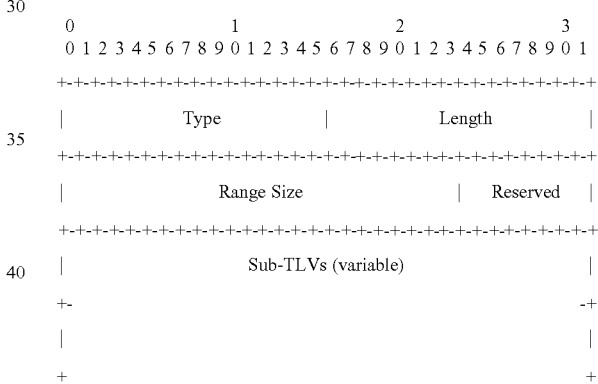

The SID/Label Range TLV, as indicated above, includes a Type field, a Length field, and a Range Size field, followed by various other fields. The value of the Type field is 9. The Length field is variable and dependent on the Sub-TLVs. The Range Size field is a 3-octet field that includes the SID/label range size (i.e., the number of SIDs or labels in the range, including the first SID/label). It is noted that the Range Size field will be greater than 0.

As per Section 2.1 in SR-OSPFv3-DRAFT, the Sub-TLV that is initially supported for the SID/Label Range TLV is the SID/Label Sub-TLV. The SID/Label Sub-TLV is to be included in the SID/Label Range TLV. The SID/Label advertised in the SID/Label Sub-TLV represents the first SID/Label in the advertised range. Section 2.1 in SR-OSPFv3-DRAFT describes the format for SID/Label Sub-TLV as follows:

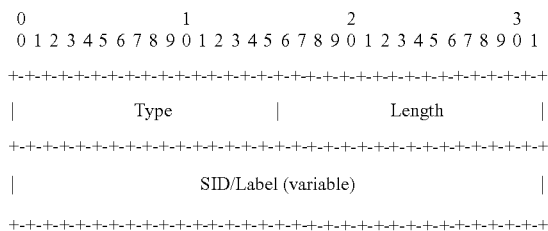

The SID/Label Sub-TLV, as indicated above, includes a Type field, a Length field, and an SID/Label field. The value of the Type field is 7. The Length field is variable (e.g., it may be 3 or 4 octets). The SID/Label field is a variable length field that is configured such that: (1) if length is set to 3, then the 20 rightmost bits of the SID/Label field represent a label and (2) if length is set to 4, then the value of the SID/Label field represents a 32-bit SID. SR-OSPFv3-DRAFT indicates that the receiving router ignores the SID/Label Sub-TLV if the length is other then 3 or 4. SR-OSPFv3-DRAFT indicates that the SID/Label Sub-TLV is to be included in the SID/Label Range TLV. SR-OSPFv3-DRAFT indicates that the SID/Label advertised in the SID/Label Sub-TLV represents the first SID/Label in the advertised range. SR-OSPFv3-DRAFT indicates that a single SID/Label Sub-TLV may be advertised in the SID/Label Range TLV and that, if more than one SID/Label Sub-TLV is present, the SID/Label Range TLV is to be ignored.

As noted above, various example embodiments for supporting packet forwarding in label switched packet networks are configured to support advertisement of Flexi-MPLS Label Range in the SID/Label Range TLV. The Flexi-MPLS Label Range may be advertised using a Flexi-MPLS SID/Label Sub-TLV, which may have the same format as the SID/Label Sub-TLV defined in Section 2.1 of SR-OSPFv3-DRAFT and provided above, but using a different Type. The presence of the Flexi-MPLS SID/Label Sub-TLV in the SID/Label Range TLV indicates that the SID/Label carried by the Flexi-MPLS SID/Label Sub-TLV is allocated from Flexi-MPLS Label Space. The Flexi-MPLS SID/Label Sub-TLV may have the following format:

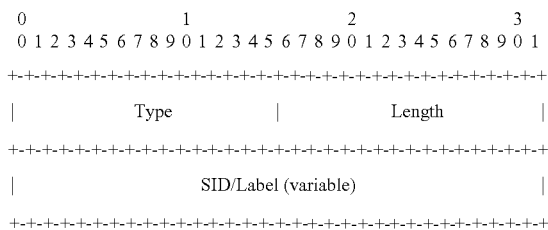

The Flexi-MPLS SID/Label Sub-TLV, as indicated above, includes a Type field, a Length field, and an SID/Label field. The value of the Type field has yet to be determined (e.g., a value of 15 is suggested; however, it will be appreciated that other suitable values may be used). The Length field is variable (e.g., it may be 3 or 4 octets). The SID/Label field is a variable length field that is configured such that: (1) if length is set to 3, then the 20 rightmost bits of the SID/Label field represent a label and (2) if length is set to 4, then the value of the SID/Label field represents a 32-bit SID. As indicated above, the presence of the Flexi-MPLS SID/Label Sub-TLV in the SID/Label Range TLV indicates that the SID/Label carried by the Flexi-MPLS SID/Label Sub-TLV is allocated from Flexi-MPLS Label Space. For Flexi-MPLS, an OSPFv3 router that supports Flexi-MPLS data plane is expected to send an SID/Label Range TLV that includes a Flexi-MPLS SID/Label Sub-TLV (e.g., type=15), which indicates that the OSPFv3 router is capable of forwarding Flexi-MPLS packets. It is noted that any Flexi-MPLS Prefix SIDs advertised by the OSPFv3 router in the form of an index will be the offset into the Flexi-MPLS label space advertised in the Flexi-MPLS SID/Label Sub-TLV in the SID/Label Range TLV.

Various example embodiments for supporting packet forwarding in label switched packet networks are configured to support advertisement of Flexi-MPLS Label Range in the SR Local Block TLV.

Section 3.3 in SR-OSPFv3-DRAFT describes an SR Local Block (SRLB) TLV. The SRLB TLV includes the range of labels that the node has reserved for local SIDs. SIDs from the SRLB may be used for Adjacency-SIDs, but also by components other than the OSPFv3 protocol. As an example, an application or a controller may instruct the router to allocate a specific local SID. Some controllers or applications may use the control plane to discover the available set of local SIDs on a particular router. In such cases, the SRLB TLV is advertised in the control plane. The SRLB TLV is a top-level TLV of the OSPFv3 Router Information Opaque LSA (which is defined in RFC 7770). Section 3.3 in SR-OSPFv3-DRAFT states that the SRLB TLV may appear multiple times in the OSPFv3 Router Information Opaque LSA. Section 3.3 in SR-OSPFv3-DRAFT describes the format for the SRLB TLV as follows:

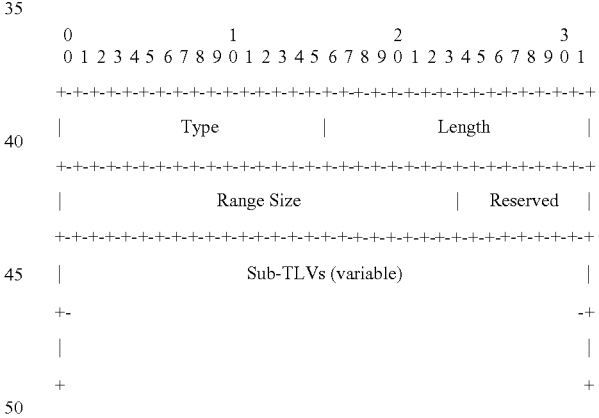

The SRLB TLV, as indicated above, includes a Type field, a Length field, and a Range Size field, followed by various other fields. The value of the Type field is 14. The Length field is variable and dependent on the Sub-TLVs. The Range Size field is a 3-octet field that includes the SID/label range size (i.e., the number of SIDs or labels in the range, including the first SID/label in the range). It is noted that the Range Size field will be greater than 0.

As per Section 2.1 in SR-OSPFv3-DRAFT, the Sub-TLV that is initially supported for the SRLB TLV is the SID/Label Sub-TLV. The SID/Label Sub-TLV is to be included in the SRLB TLV. The SID/Label advertised in the SID/Label Sub-TLV represents the first SID/Label in the advertised range. Section 2.1 in SR-OSPFv3-DRAFT describes the format for SID/Label Sub-TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                        SID/Label (variable)                   |
+-+-+-+-+-+-+-+-+-+-+-+-+-+-+-+-+-+-+-+-+-+-+-+-+-+-+-+-+-+-+-+-+
```

The SID/Label Sub-TLV, as indicated above, includes a Type field, a Length field, and an SID/Label field. The value of the Type field is 7. The Length field is variable (e.g., it may be 3 or 4 octets). The SID/Label field is a variable length field that is configured such that: (1) if length is set to 3, then the 20 rightmost bits of the SID/Label field represent a label and (2) if length is set to 4, then the value of the SID/Label field represents a 32-bit SID. SR-OSPFv3-DRAFT indicates that the SID/Label advertised in the SID/Label Sub-TLV represents the first SID/Label in the advertised range. SR-OSPFv3-DRAFT indicates that a single SID/Label Sub-TLV may be advertised in the SRLB TLV and that, if more than one SID/Label Sub-TLV is present, the SRLB TLV is ignored.

As noted above, various example embodiments for supporting packet forwarding in label switched packet networks are configured to support advertisement of Flexi-MPLS Label Range in the SRLB TLV. The Flexi-MPLS Label Range may be advertised using a Flexi-MPLS SID/Label Sub-TLV, which may have the same format as the SID/Label Sub-TLV defined in Section 2.1 of SR-OSPFv3-DRAFT and provided above, but using a different Type. The presence of the Flexi-MPLS SID/Label Sub-TLV in the SRLB indicates that the SID/Label carried by the Flexi-MPLS SID/Label Sub-TLV is allocated from Flexi-MPLS Label Space. The Flexi-MPLS SID/Label Sub-TLV may have the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|             Type              |            Length             |
+-+-+-+-+-+-+-+-+-+-+-+-+-+-+-+-+-+-+-+-+-+-+-+-+-+-+-+-+-+-+-+-
|                        SID/Label (variable)                   |
+-+-+-+-+-+-+-+-+-+-+-+-+-+-+-+-+-+-+-+-+-+-+-+-+-+-+-+-+-+-+-+-
```

The Flexi-MPLS SID/Label Sub-TLV, as indicated above, includes a Type field, a Length field, and an SID/Label field. The value of the Type field has yet to be determined (e.g., a value of 15 is suggested; however, it will be appreciated that other suitable values may be used). The Length field is variable (e.g., it may be 3 or 4 octets). The SID/Label field is a variable length field that is configured such that: (1) if length is set to 3, then the 20 rightmost bits of the SID/Label field represent a label and (2) if length is set to 4, then the value of the SID/Label field represents a 32-bit SID. As indicated above, the presence of the Flexi-MPLS SID/Label Sub-TLV in the SRLB TLV indicates that the SID/Label carried by the Flexi-MPLS SID/Label Sub-TLV is allocated from Flexi-MPLS Label Space. For Flexi-MPLS, an OSPFv3 router that supports Flexi-MPLS data plane is expected to send an SRLB TLV that includes a Flexi-MPLS SID/Label Sub-TLV (e.g., type=15), which indicates that the OSPFv3 router is capable of forwarding Flexi-MPLS packets. It is noted that any Flexi-MPLS Adj-SIDs advertised by the OSPFv3 router in the form of an index will be the offset into the Flexi-MPLS label space advertised in the Flexi-MPLS SID/Label Sub-TLV in the SRLB TLV.

Various example embodiments for supporting packet forwarding in label switched packet networks are configured to support advertisement of Flexi-MPLS in the SR Forwarding Capabilities.

Section 3.5 in SR-OSPFv3-DRAFT defines that an OSPFv3 router needs to advertise its SR data plane capabilities using the OSPF Router Informational Capabilities TLV (which is defined in Section 2.3 of RFC 4970). The format of the OSPF Router Informational Capabilities TLV follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|             Type              |            Length             |
+-+-+-+-+-+-+-+-+-+-+-+-+-+-+-+-+-+-+-+-+-+-+-+-+-+-+-+-+-+-+-+-
|                    Information Capabilities                   |
+-+-+-+-+-+-+-+-+-+-+-+-+-+-+-+-+-+-+-+-+-+-+-+-+-+-+-+-+-+-+-+-
```

SR-OSPFv3-DRAFT allocates the following bits in the OSPF Router Informational Capability TLV: (1) Bit-6 (MPLS IPv6 flag), which, if set (e.g., using a value of "1"), indicates that the router is capable of processing SR MPLS encapsulated IPv6 packets on all interfaces and (2) Bit-7, which, if set (e.g., using a value of "1"), indicates that the router is capable of processing the IPv6 Segment Routing Header on all interfaces.

As noted above, various example embodiments for supporting packet forwarding in label switched packet networks are configured to support advertisement of Flexi-MPLS in the SR Forwarding Capabilities. The Flexi-MPLS Label Range may be advertised using a new bit in OSPF Router Informational Capability TLV as follows: Bit-8 (Flexi-MPLS IPv6 flag), which, if set (e.g., using a value of "1"), indicates that the router is capable of processing SR Flexi-MPLS encapsulated IPv6 packets on all interfaces.

Various example embodiments for supporting packet forwarding in label switched packet networks are configured to support advertisement of the Extended Prefix Range TLV for Flexi-MPLS in OSPFv3.

Section 4 in SR-OSPFv3-DRAFT defines an OSPFv3 Extended-Prefix-Range-TLV which is used to distribute Prefix-to-Label Mappings for prefixes injected externally into the OSPFv3 domain. Such injection may be done from a Segment Routing Mapping Server (SRMS). The Extended-Prefix-Range-TLV is carried as a top-level TLV within the following TLVs: (1) E-Intra-Area-Prefix-LSA, (2) E-Inter-Area-Prefix-LSA, (3) E-AS-External-LSA, and (4) E-Type-7-LSA. Section 4 in SR-OSPFv3-DRAFT describes the format for the Extended-Prefix-Range-TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
| Prefix Length |      AF       |          Range Size           |
+-+-+-+-+-+-+-+-+-+-+-+-+-+-+-+-+-+-+-+-+-+-+-+-+-+-+-+-+-+-+-+-+
|     Flags     |                   Reserved                    |
+-+-+-+-+-+-+-+-+-+-+-+-+-+-+-+-+-+-+-+-+-+-+-+-+-+-+-+-+-+-+-+-+
|                    Address Prefix   (variable)                |
+-+-+-+-+-+-+-+-+-+-+-+-+-+-+-+-+-+-+-+-+-+-+-+-+-+-+-+-+-+-+-+-+
|                      Sub-TLVs    (variable)                   |
+-                                                             -+
|                                                               |
```

The Extended-Prefix-Range-TLV, as indicated above, includes a Type field, a Length field, a Prefix Length field, an AF field, a Range Size field, a Flags field, and various other field. The Flags field is a 1-octet field including a set of one-bit flags configured to indicate various characteristics of the Prefix Range. The Flags field of Extended-Prefix-Range-TLV has the following format:

```
 0 1 2 3 4 5 6 7
+--+--+--+--+--+--+--+--+
|IA|X|  |  |  |  |  |  |
+--+--+--+--+--+--+--+--+
```

The IA Flag of the Flags field of the Extended-Prefix-Range-TLV uses the encoding and rules as described in Section 4 of SR-OSPFv3-DRAFT. Various example embodiments for supporting packet forwarding in label switched packet networks introduce a Flexi-MPLS flag that is denoted as the X Flag (underlined in the Flag field format provided above). The X Flag is configured such that, if set (e.g., equal to "1"), then the label mapping for the Prefix Range is for the Flexi-MPLS data plane.

Various example embodiments for supporting packet forwarding in label switched packet networks are configured to support use of OSPFv3 for SR with Flexi-MPLS in various other ways.

Various example embodiments for supporting packet forwarding in label switched packet networks are configured to support use of BGP-LS for SR with Flexi-MPLS.

Various example embodiments for supporting packet forwarding in label switched packet networks are configured to support use of BGP-LS, for SR with Flexi-MPLS, for advertising various types of control plane information in various ways.

The flooding scope for IGP based methods of SR is IGP area-wide. As a result, the contents of a Link State Database (LSDB) or a TEDB have the scope of an IGP area and, therefore, by using the IGP alone, it may not be enough to construct segments across multiple IGP areas or Autonomous System (AS) boundaries.

In order to address the need for applications that may require topological visibility across IGP areas, or even across ASs, the BGP-LS address-family/sub-address-family have been defined to allow BGP to carry Link-State information. The BGP Network Layer Reachability Information (NLRI) encoding format for BGP-LS, and a new BGP Path Attribute called the BGP-LS attribute, are defined in RFC 7752. The BGP-LS specifications for SR are described in the "BGP Link-State extensions for Segment Routing" draft (also denoted as SR-BGP-LS-DRAFT).

Various example embodiments for supporting packet forwarding in label switched packet networks are configured to support use of new BGP-LS attributes, aligned with the approach in SR-BGP-LS-DRAFT, to distribute label mappings for the Flexi-MPLS data plane. It is noted that the procedures in SR-BGP-LS-DRAFT may be applicable to the new BGP-LS attributes as defined herein, unless specified otherwise herein.

Various example embodiments for supporting packet forwarding in label switched packet networks are configured to support use of new BGP-LS node attribute TLVs for Flexi-MPLS.

Section 2.1 in SR-BGP-LS-DRAFT describes several Node Attribute TLVs. As discussed further below, various example embodiments for supporting packet forwarding in label switched packet networks extend the SR-Capabilities-TLV and the SR-Local-Block-TLV of SR-BGP-LS-DRAFT, as well as the associated SID/Label Sub-TLV which may be used by the SR-Capabilities-TLV and the SR-Local-Block-TLV, for Flexi-MPLS.

Various example embodiments for supporting packet forwarding in label switched packet networks are configured to extend the SR-Capabilities-TLV of SR-BGP-LS-DRAFT, as well as the associated SID/Label Sub-TLV which may be used by the SR-Capabilities-TLV, for Flexi-MPLS.

Section 2.1.2 in SR-BGP-LS-DRAFT describes the SR-Capabilities-TLV. In general, SR typically relies upon each router advertising its SR data plane capability and the range of MPLS label values it uses for SR in the case where global SIDs (i.e., global indexes) are allocated. Section 2.1.2 in SR-BGP-LS-DRAFT describes the format for the SR-Capabilities-TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|     Flags     |    Reserved   |
+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                          Range Size                           |
+-+-+-+-+-+-+-+-+-+-+-+-+-+-+-+-+-+-+-+-+-+-+-+-+-+-+-+-+-+-+-+-+
//              SID/Label sub-TLV  (variable)                  //
+-+-+-+-+-+-+-+-+-+-+-+-+-+-+-+-+-+-+-+-+-+-+-+-+-+-+-+-+-+-+-+-+
```

The SR-Capabilities TLV, as indicated above, includes a Type field, a Length field, a Flags field, and a RESERVED field, followed by multiple Segment Routing Global Block (SRGB) descriptor entries. The value of the Type field has yet to be determined (e.g., a value of 1034 is suggested; however, it will be appreciated that other suitable values may be used). The value of the Length field is variable. The Flags field is a 1-octet field including a set of one-bit flags configured to indicate various capabilities. The Flags field of the SR-Capabilities TLV has the following format:

```
 0 1 2 3 4 5 6 7
+-+-+-+-+-+-+-+-+
|I|V|X|         |
+-+-+-+-+-+-+-+-+
```

The I and V Flags of the Flags field of the SR-Capabilities TLV use the encoding and rules as described in Section 2.1.2 in SR-BGP-LS-DRAFT. The I Flag is the MPLS IPv4 flag which is configured such that, if set (e.g., equal to "1"), then the router is capable of processing SR MPLS encapsulated IPv4 packets on all interfaces. The V Flag is the MPLS IPv6 flag which is configured such that, if set (e.g., equal to "1"), then the router is capable of processing SR MPLS encapsulated IPv6 packets on all interfaces. Various example embodiments for supporting packet forwarding in label switched packet networks introduce a Flexi-MPLS flag that is denoted as the X-flag bit (underlined in the Flag field format provided above). The X-Flag is configured such that, if set (e.g., equal to "1"), then the router is capable of processing SR Flexi-MPLS encapsulated packets on all interfaces.

The SR-Capabilities TLV, as noted above, may include multiple SRGB descriptor entries. Each SRGB descriptor entry has 3-octets of Range and an SID/Label Sub-TLV. The SID/Label Sub-TLV includes the first value of the SRGB, while the Range includes the number of SRGB elements.

Section 2.1.1 in SR-BGP-LS-DRAFT describes the format for SID/Label Sub-TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|              Type             |             Length            |
+-+-+-+-+-+-+-+-+-+-+-+-+-+-+-+-+-+-+-+-+-+-+-+-+-+-+-+-+-+-+-+-
|                       SID/Label (variable)                    |
+-+-+-+-+-+-+-+-+-+-+-+-+-+-+-+-+-+-+-+-+-+-+-+-+-+-+-+-+-+-+-+-
```

The SID/Label sub-TLV, as indicated above, includes a Type field, a Length field, and an SID/Label field. The value of the Type field has yet to be determined (e.g., a value of 1161 is suggested; however, it will be appreciated that other suitable values may be used). The value of the Length field is variable. The SID/Label field is a variable length field that is configured such that, if the length Field is set to 3, then the 20 rightmost bits of the SID/Label field represent an MPLS label.

Various example embodiments for supporting packet forwarding in label switched packet networks are configured to support a new type of SID/Label sub-TLV for Flexi-MPLS. The SID/Label sub-TLV for Flexi-MPLS includes the same format as defined in Section 2.1.1 of SR-BGP-LS-DRAFT for MPLS. Namely, the format for the SID/Label sub-TLV for Flexi-MPLS may be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|              Type             |             Length            |
+-+-+-+-+-+-+-+-+-+-+-+-+-+-+-+-+-+-+-+-+-+-+-+-+-+-+-+-+-+-+-+-
|                       SID/Label (variable)                    |
+-+-+-+-+-+-+-+-+-+-+-+-+-+-+-+-+-+-+-+-+-+-+-+-+-+-+-+-+-+-+-+-
```

The SID/Label sub-TLV for Flexi-MPLS, as indicated above, includes a Type field, a Length field, and SID/Label field. The value of the Type field has yet to be determined (e.g., a value of 1162 is suggested; however, it will be appreciated that other suitable values may be used). The value of the Length field is variable. The value that is ultimately used for the Type field for the SID/Label sub-TLV for Flexi-MPLS (e.g., 1162 as suggested above, or some other suitable value) indicates that the SID/Label belongs to Flexi-MPLS Label Space.

Various example embodiments for supporting packet forwarding in label switched packet networks are configured to extend the SR-Capabilities TLV of SR-BGP-LS-DRAFT, as well as the associated SID/Label Sub-TLV which may be used by the SR-Capabilities-TLV, for Flexi-MPLS in various other ways.

Various example embodiments for supporting packet forwarding in label switched packet networks are configured to extend the SR Local Block TLV of SR-BGP-LS-DRAFT for Flexi-MPLS.

Section 2.1.4 in SR-BGP-LS-DRAFT describes the SR Local Block (SRLB) TLV that includes the range of labels that the node has reserved for local SIDs. Local SIDs are used, e.g., in IGPs (IS-IS, OSPF, or the like) for Adjacency-SIDs, and may also be allocated by components other than IGP protocols. As an example, an application or a controller may instruct the router to allocate a specific local SID. As such, in order for applications or controllers to know the local SIDs available in the router, the router advertises its SRLB. Section 2.1.4 in SR-BGP-LS-DRAFT describes the format for SRLB TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|              Type             |             Length            |
+-+-+-+-+-+-+-+-+-+-+-+-+-+-+-+-+-+-+-+-+-+-+-+-+-+-+-+-+-+-+-+-
|     Flags     |    RESERVED   |                               |
+-+-+-+-+-+-+-+-+-+-+-+-+-+-+-+-+

+-+-+-+-+-+-+-+-+-+-+-+-+-+-+-+-+-+-+-+-+-+-+-+-+
|                       Range Size                              |
+-+-+-+-+-+-+-+-+-+-+-+-+-+-+-+-+-+-+-+-+-+-+-+-+-+-+-+-+-+-+-+-
//                   SID/Label Sub-TLV (variable)              //
+-+-+-+-+-+-+-+-+-+-+-+-+-+-+-+-+-+-+-+-+-+-+-+-+-+-+-+-+-+-+-+-
```

The SRLB TLV, as indicated above, includes a Type field, a Length field, a Flags field, and a RESERVED field, followed by multiple SRLB descriptor entries. Section 2.1.4 in SR-BGP-LS-DRAFT describes the format for the SRLB TLV; however, no Flags were defined in SR-BGP-LS-DRAFT for the SRLB TLV. Various example embodiments for supporting packet forwarding in label switched packet networks introduce a Flexi-MPLS flag for the SRLB TLV as follows:

```
 0 1 2 3 4 5 6 7
+-+-+-+-+-+-+-+-+
|X|             |
+-+-+-+-+-+-+-+-+
```

As noted above, various example embodiments for supporting packet forwarding in label switched packet networks introduce a new Flexi-MPLS flag that is denoted as the X Flag (emphasized underlined in the Flag field format provided above). The X Flag is configured such that, if set (e.g., equal to "1"), this indicates that the local blocks are mapped into the Flexi-MPLS label space.

The SRLB TLV, as noted above, may include multiple SRLB descriptor entries. Each SRGB descriptor entry has 3-octets of Range and an SID/Label Sub-TLV. The SID/Label Sub-TLV includes the first value of the SLGB, while the Range includes the number of SLGB elements.

Section 2.1.1 in SR-BGP-LS-DRAFT describes the format for SID/Label Sub-TLV as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|              Type             |             Length            |
+-+-+-+-+-+-+-+-+-+-+-+-+-+-+-+-+-+-+-+-+-+-+-+-+-+-+-+-+-+-+-+-
|                       SID/Label (variable)                    |
+-+-+-+-+-+-+-+-+-+-+-+-+-+-+-+-+-+-+-+-+-+-+-+-+-+-+-+-+-+-+-+-
```

The SID/Label sub-TLV, as indicated above, includes a Type field, a Length field, and an SID/Label field. The value of the Type field has yet to be determined (e.g., a value of 1161 is suggested; however, it will be appreciated that other suitable values may be used). The value of the Length field is variable. The SID/Label field is a variable length field that is configured such that, if the length Field is set to 3, then the 20 rightmost bits of the SID/Label field represent an MPLS label.

Various example embodiments for supporting packet forwarding in label switched packet networks are configured to support a new type of SID/Label sub-TLV for Flexi-MPLS. The SID/Label sub-TLV for Flexi-MPLS includes the same format as defined in Section 2.1.1 of SR-BGP-LS-DRAFT for MPLS. Namely, the format for the SID/Label sub-TLV for Flexi-MPLS may be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|              Type             |             Length            |
+-+-+-+-+-+-+-+-+-+-+-+-+-+-+-+-+-+-+-+-+-+-+-+-+-+-+-+-+-+-+-+-
|                       SID/Label (variable)                    |
+-+-+-+-+-+-+-+-+-+-+-+-+-+-+-+-+-+-+-+-+-+-+-+-+-+-+-+-+-+-+-+-
```

The SID/Label sub-TLV for Flexi-MPLS, as indicated above, includes a Type field, a Length field, and SID/Label field. The value of the Type field has yet to be determined (e.g., a value of 1162 is suggested; however, it will be appreciated that other suitable values may be used). The value of the Length field is variable. The value that is ultimately used for the Type field for the SID/Label sub-TLV for Flexi-MPLS (e.g., 1162 as suggested above, or some other suitable value) indicates that the SID/Label belongs to Flexi-MPLS Label Space.

Various example embodiments for supporting packet forwarding in label switched packet networks are configured to extend the SR Local Block TLV of SR-BGP-LS-DRAFT for Flexi-MPLS in various other ways.

Various example embodiments for supporting packet forwarding in label switched packet networks are configured to support use of new BGP-LS node attribute TLVs for Flexi-MPLS in various other ways.

Various example embodiments for supporting packet forwarding in label switched packet networks are configured to support use of new BGP-LS link attribute TLVs for Flexi-MPLS.

Section 2.2 in SR-BGP-LS-DRAFT describes three types of Link Attribute TLVs. As discussed further below, various example embodiments for supporting packet forwarding in label switched packet networks extend these TLVs for the Flexi-MPLS data plane. Section 2.2 in SR-BGP-LS-DRAFT describes two types of SIDs at per Adjacency Levels: Adj-SID (defined in Section 2.2.1 of SR-BGP-LS-DRAFT) and LAN-Adj-SID (defined in Section 2.2.2 of SR-BGP-LS-DRAFT). The formats for the Adjacency-SIDs are as follows:

Adj-SID
----------

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|     Flags     |    Weight     |            Reserved           |
+-+-+-+-+-+-+-+-+-+-+-+-+-+-+-+-+-+-+-+-+-+-+-+-+-+-+-+-+-+-+-+-+
|                    SID/Label/Index  (variable)                |
+---------------------------------------------------------------
```

LAN-Adj-SID
--------------

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|     Flags     |    Weight     |            Reserved           |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|        OSPF Neighbor ID    /    IS-IS System-ID               |
+                               +-+-+-+-+-+-+-+-+-+-+-+-+-+-+-+-+
|                               |
+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                    SID/Label/Index  (variable)                |
+---------------------------------------------------------------
```

The Adjacency-SIDs, as indicated above, each include a Type field, a Length field, and a Flags field, followed by various other fields. The Flags field, for both the Adj-SID and the LAN-Adj-SID, is a 1-octet field including a set of one-bit flags configured to indicate various characteristics of the SID/Index/Label field. The Flags field of the Adjacency-SIDs has the following format:

```
 0 1 2 3 4 5 6 7
+-+-+-+-+-+-+-+-+
|B|V|L|G|P|X|   |
+-+-+-+-+-+-+-+-+
```

The B, V, L, G, and P Flags of the Flags field of the Adjacency-SIDs use the encoding and rules as described in Section 2.2 in SR-BGP-LS-DRAFT. Various example embodiments for supporting packet forwarding in label switched packet networks introduce a Flexi-MPLS flag that is denoted as the X-Flag bit (underlined in the Flag field format provided above). The X-Flag is configured such that, if set (e.g., equal to "1"), then the value/index carried by the Adj-SID/LAN-Adj-SID is generated for the Flexi-MPLS data plane.

Various example embodiments for supporting packet forwarding in label switched packet networks are configured to support use of new BGP-LS link attribute TLVs for Flexi-MPLS in various other ways.

Various example embodiments for supporting packet forwarding in label switched packet networks are configured to support use of new BGP-LS prefix attribute TLVs for Flexi-MPLS.

Section 2.3 in SR-BGP-LS-DRAFT describes several Prefix Attribute TLVs. As discussed further below, various example embodiments for supporting packet forwarding in label switched packet networks extend the Prefix-SID TLV for the Flexi-MPLS data plane. Section 2.3 in SR-BGP-LS-DRAFT describes the format of Prefix-SID as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type       |      Length     |
+-+-+-+-+-+-+-+-+-+-+-+-+-+-+-+-+-+-+-+-+-+-+-+-+-+-+-+-+-+-+-+-+
|     Flags       |   Algorithm     |    Reserved     |
+-+-+-+-+-+-+-+-+-+-+-+-+-+-+-+-+-+-+-+-+-+-+-+-+-+-+-+-+-+-+-+-+
|                   SID/Index/Label  (variable)                |
+-+-+-+-+-+-+-+-+-+-+-+-+-+-+-+-+-+-+-+-+-+-+-+-+-+-+-+-+-+-+-+-+
```

The Prefix-SID TLV, as indicated above, includes a Flags field. SR-BGP-LS-DRAFT indicates that, in the context of BGP-LS, the Flags field format and the semantics of each individual flag are taken from the corresponding source protocol (e.g., the protocol of origin of the Prefix-SID being advertised in BGP-LS). Various example embodiments for supporting packet forwarding in label switched packet networks are configured such that, if a Prefix TLV is advertised for Flexi-MPLS, then the Flags field is to set the X-Flag bit in the flag definitions in the respective IGPs (e.g., IS-IS, OSPF, OSPFv3) as described hereinabove.

Various example embodiments for supporting packet forwarding in label switched packet networks are configured to support use of new BGP-LS prefix attribute TLVs for Flexi-MPLS in various other ways.

Various example embodiments for supporting packet forwarding in label switched packet networks are configured to support use of BGP-LS for SR with Flexi-MPLS in various other ways.

Various example embodiments for supporting packet forwarding in label switched packet networks are configured to provide an SR control plane for Flexi-MPLS in various other ways.

Various example embodiments for supporting packet forwarding in label switched packet networks are configured to provide signaling of Flexi-MPLS in the MPLS control plane.

Various example embodiments for supporting packet forwarding in label switched packet networks may be configured such that, when the Flexi-MPLS architecture is deployed in a network for SR, the Flexi-MPLS data plane also is used for MPLS-based applications to provide thereby a seamless Flexi-MPLS data plane. This avoids switching between the MPLS and Flexi-MPLS stacks. The use of the Flexi-MPLS data plane for MPLS-based applications may be based on extensions of the MPLS control planes of LDP, RSVP-TE, and BGP to signal Flexi-MPLS control plane information (e.g., capabilities, label mappings, or the like, as well as various combinations thereof). The extensions of the MPLS control planes of LDP, RSVP-TE, and BGP to signal Flexi-MPLS label mappings are discussed further below.

Various example embodiments for supporting packet forwarding in label switched packet networks are configured to support advertisement of Flexi-MPLS control information in the MPLS control plane using LDP. A description of the use of LDP for signaling Flexi-MPLS in the MPLS control plane follows. The LDP specification is provided in RFC 5036.

Various example embodiments for supporting packet forwarding in label switched packet networks are configured to support advertisement of Flexi-MPLS capabilities in the MPLS control plane using LDP.

RFC 5561 defines a generic method of capability negotiation in LDP peers. When LDP is used as the label distribution protocol, the peers may negotiate Flexi-MPLS data plane capabilities during bring-up of the session between the peers. Various example embodiments for supporting packet forwarding in label switched packet networks are configured to support a Flexi-MPLS Label Capability TLV that can be announced in LDP Initialization or Capability Messages. The Type value for the Flexi-MPLS Label Capability TLV may be any suitable Type value from the IANA registry (e.g., a value of "0x207" is suggested; however, any suitable value may be used). The format of the Flexi-MPLS Label Capability TLV is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|1|0|Flexi-MPLS Label Capability|        Length = 1            |
+-+-+-+-+-+-+-+-+-+-+-+-+-+-+-+-+-+-+-+-+-+-+-+-+-+-+-+-+-+-+-+-
|S|  Reserved   |
+-+-+-+-+-+-+-+-+
```

The Flexi-MPLS Label Capability TLV, as indicated above and discussed further below, includes a number of fields, including a U bit field, an F bit field, a Flexi-MPLS Label Capability field (which also may be referred to as the TLV Code Point field), a Length field, an S bit field, and a Reserved field.

The Flexi-MPLS Label Capability TLV, as indicated above, includes a U bit field. The U bit field includes the Unknown TLV bit, as described in RFC 5036. The value of the U bit field could be either 0 or 1 as specified in the Capability document associated with the given capability.

The Flexi-MPLS Label Capability TLV, as indicated above, includes an F bit field. The F bit field includes the Forward Unknown TLV bit, as described in RFC 5036. The value of this bit will be 0 since a Capability Parameter TLV typically is sent only in Initialization and Capability messages, which are not forwarded.

The Flexi-MPLS Label Capability TLV, as indicated above, includes a Length field. The Length field indicates a length of "1" (the 1-bit S field and the 7-bit Reserved field).

The Flexi-MPLS Label Capability TLV, as indicated above, includes a Flexi-MPLS Label Capability field (which also may be referred to as the TLV Code Point field). The TLV type that is included in the Flexi-MPLS Label Capability field identifies a specific capability. This is an IANA-assigned code point (e.g., assigned from the TLV Type namespace) for a given capability as requested in the associated capability document.

The Flexi-MPLS Label Capability TLV, as indicated above, includes an S bit field. The S bit field includes the State Bit, which indicates whether the sender is advertising or withdrawing the capability corresponding to the TLV code point in the Flexi-MPLS Label Capability field. The State Bit value may be used as follows: (1) a value of "1" indicates that the TLV is advertising the capability specified by the TLV code point and (2) a value of "0" indicates that the TLV is withdrawing the capability specified by the TLV code point.

It is noted that, if Flexi-MPLS Label Capability is negotiated in a peering session, then Flexi-MPLS Labels can be distributed over the peering sessions in LDP Messages. For example, assume that an LDP speaker receives a Flexi-MPLS Label Mapping from neighbor A for FEC-X. The LDP speaker decides to advertise the Flexi-MPLS Label Mapping to neighbor B for the same FEC-X. If neighbor B has not yet advertised Flexi-MPLS capability, then the Label Mapping for FEC-X may be sent to B with a traditional MPLS Label, rather than with a Flexi-MPLS Label. By contrast, if neighbor B has advertised Flexi-MPLS capability, then the Label Mapping for FEC-X may be sent to B with a Flexi-MPLS Label, rather than with a traditional MPLS Label.

Various example embodiments for supporting packet forwarding in label switched packet networks are configured to support advertisement of Flexi-MPLS capabilities in the MPLS control plane using LDP in various other ways.

Various example embodiments for supporting packet forwarding in label switched packet networks are configured to support advertisement of Flexi-MPLS labels in the MPLS control plane using LDP.

Section 3.4.2 in RFC 5036 describes the following Label TLVs that may be used to encode a Label: Generic Label TLV, ATM Label TLV, and Frame Relay Label TLV. Label TLVs are carried by the messages used to advertise, request, release, and withdraw label mappings. Various example embodiments for supporting packet forwarding in label switched packet networks are configured to support a Flexi-MPLS Label TLV. The Type value for the Flexi-MPLS Label Capability TLV may be any suitable Type value from the IANA registry (e.g., a value of "0x208" is suggested; however, any suitable value may be used). The format of the Flexi-MPLS Label TLV is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0|Type (Flexi-MPLS Label)|          Length                   |
+-+-+-+-+-+-+-+-+-+-+-+-+-+-+-+-+-+-+-+-+-+-+-+-+-+-+-+-+-+-+-+-+
|          Label                                                |
+-+-+-+-+-+-+-+-+-+-+-+-+-+-+-+-+-+-+-+-+-+-+-+-+-+
```

The Flexi-MPLS Label TLV, as indicated above and discussed further below, includes a number of fields, including a U bit field, an F bit field, a Type field (which also may be referred to as the TLV Code Point field), a Length field, and a Label field.

The Flexi-MPLS Label TLV, as indicated above, includes a U bit field. The U bit field includes the Unknown TLV bit, as described in RFC 5036. The value of the U bit field could be either 0 or 1 as specified in RFC 5036.

The Flexi-MPLS Label TLV, as indicated above, includes an F bit field. The F bit field includes the Forward Unknown TLV bit, as described in RFC 5036. The value of the F bit field could be either 0 or 1 as specified in RFC 5036.

The Flexi-MPLS Label TLV, as indicated above, includes a Type field which includes a value indicative that the TLV includes a label from the Flexi-MPLS Label Space (e.g., a value of 0x208 or any other suitable value). This is an IANA-assigned code point.

The Flexi-MPLS Label TLV, as indicated above, includes a Length field. The Length field indicates the length of the Label field.

The Flexi-MPLS Label TLV, as indicated above, includes a Label field, which includes the Flexi-MPLS label that is being advertised.

Various example embodiments for supporting packet forwarding in label switched packet networks are configured to support advertisement of Flexi-MPLS control information in the MPLS control plane using LDP in various other ways.

Various example embodiments for supporting packet forwarding in label switched packet networks are configured to support advertisement of Flexi-MPLS control information in the MPLS control plane using RSVP-TE. A description of the use of RSVP-TE for signaling Flexi-MPLS in the MPLS control plane follows. The RSVP-TE specification is defined in RFC 3209.

Section 4.1 in RFC 3209 describes a Label Object which is carried in the Resv Message. The Label Object has a LABEL class of 16 and a C_Type of 1. The format of the Label object is as follows:

```
 0                   1                   2                   3
 0 1 2 3 4 5 6 7 8 9 0 1 2 3 4 5 6 7 8 9 0 1 2 3 4 5 6 7 8 9 0
+-+-+-+-+-+-+-+-+-+-+-+-+-+-+-+-+-+-+-+-+-+-+-+-+-+-+-+-+-+-+-+
|        Length (8)             | Class-Num(16) |  C-Type (1)  |
+-+-+-+-+-+-+-+-+-+-+-+-+-+-+-+-+-+-+-+-+-+-+-+-+-+-+-+-+-+-+-+
|                           Label                              |
+-+-+-+-+-+-+-+-+-+-+-+-+-+-+-+-+-+-+-+-+-+-+-+-+-+-+-+-+-+-+-+
```

The Label Object, as indicated above and discussed further below, includes a Length field, a Class-Num field, a C-Type field, and a Label field.

The Length field, Class-Num field, and C-Type field of the Label Object may be considered to be an RSVP object (e.g., an RSVP object including Length, Class-Num, and C-Type as described in Section 3.1.2 of RFC 2205).

The Label field of the Label Object includes a single label, encoded in 4 octets. Each generic MPLS label is an unsigned integer in the range 0 through 1048575. Generic MPLS labels and FR labels are encoded right-aligned in 4 octets. ATM labels are encoded with the VPI right justified in bits 0-15 and the VCI right justified in bits 16-31.

Various example embodiments for supporting packet forwarding in label switched packet networks are configured to support a Flexi-MPLS Label Object in RSVP-TE. It is noted that the rules for processing a Flexi-MPLS Label Object are same as the rules for processing an MPLS Label Object, except that the Flexi-MPLS Label Object carries a label from the Flexi-MPLS Label Space. The Flexi-MPLS Label Object may have the following format (with a LABEL class of 16 and a C_Type of 2):

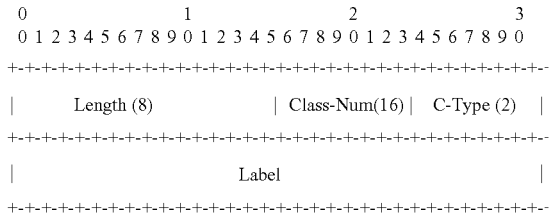

The Flexi-MPLS Label Object, as indicated above and discussed further below, includes a Length field, a Class-Num field, a C-Type field, and a Label field.

The Length field, Class-Num field, and C-Type field of the Flexi-MPLS Label Object may be considered to be an RSVP object.

The Label field of the Flexi-MPLS Label Object includes a single Flexi-MPLS label.

Various example embodiments for supporting packet forwarding in label switched packet networks are configured to support advertisement of Flexi-MPLS control information in the MPLS control plane using RSVP-TE in various other ways.

Various example embodiments for supporting packet forwarding in label switched packet networks are configured to support advertisement of Flexi-MPLS control information in the MPLS control plane using BGP. A description of the use of BGP for signaling Flexi-MPLS in the MPLS control plane follows.

Section 3 in RFC 3107 describes a method for carrying label mapping information in BGP. Label mapping information is carried as part of the Network Layer Reachability Information (NLRI) in the Multiprotocol Extensions attributes. The AFI indicates, as usual, the address family of the associated route. The fact that the NLRI contains a label is indicated by using SAFI value 4. The Network Layer Reachability information is encoded as one or more triples of the form <length, label, prefix>, whose fields are described below:

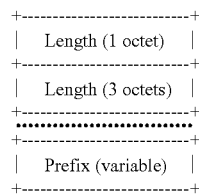

Various example embodiments for supporting packet forwarding in label switched packet networks are configured to support a new SAFI type in BGP for use in encoding a label from the Flexi-MPLS Label Space. The new SAFI type may have a value of 9 (e.g., SAFI type=9); however, it will be appreciated that other suitable values may be used. The value for the new SAFI type may be any suitable value from the IANA registry (e.g., "9", as used in the example above, or using any other suitable value). It is noted that the remaining rules for processing an NLRI with a Flexi-MPLS Label may be the same as the rules for processing an NLRI with an MPLS label.

Various example embodiments for supporting packet forwarding in label switched packet networks are configured to support advertisement of Flexi-MPLS control information in the MPLS control plane using BGP in various other ways.

Various example embodiments for supporting packet forwarding in label switched packet networks are configured to provide signaling of Flexi-MPLS in the MPLS control plane in various other ways.

Various example embodiments for supporting packet forwarding in label switched packet networks, as indicated above, are configured to support distribution and use of control plane information for supporting packet forwarding in label switched packet networks. The control plane information may include various information types, various information, or the like, as well as various combinations thereof. The control plane information may be advertised in various ways (e.g., based on various types of control planes, various types of protocols, or the like, as well as various combinations thereof).

Figure 12:
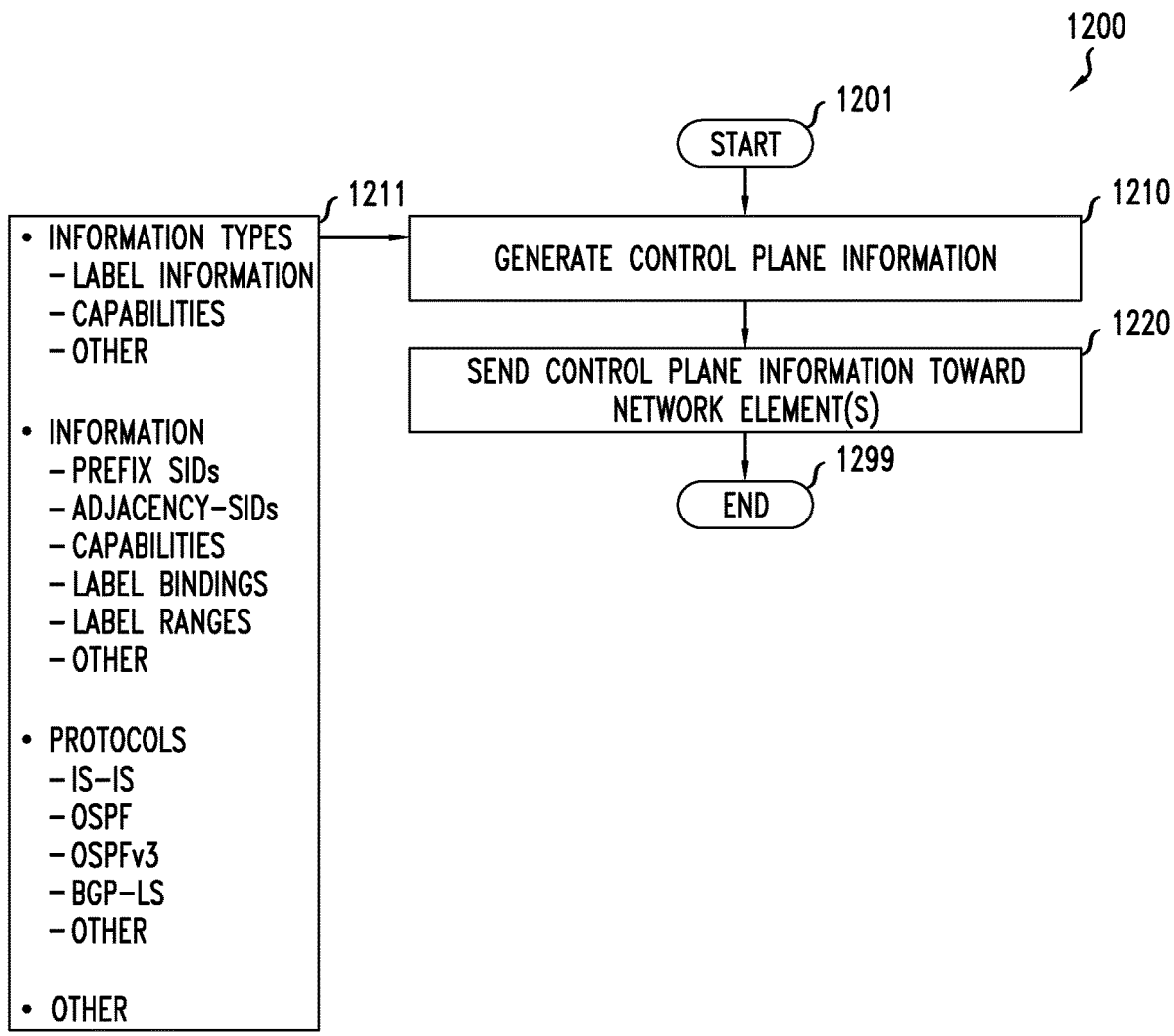
FIG. 12 depicts an example embodiment of a method for use by a network element to generate and send control plane information for supporting use of Flexi-MPLS.

FIG. 12 depicts an example embodiment of a method for use by a network element to generate and distribute control plane information for supporting use of Flexi-MPLS. It will be appreciated that, although primarily presented as being performed serially, at least a portion of the functions of method 1200 may be performed contemporaneously or in a different order than as presented in FIG. 12. At block 1201, method 1200 begins. At block 1210, control plane information is generated. As indicated at block 1211, the control plane information may include various information types (e.g., label mappings, capabilities, or the like, as well as various combinations thereof), may include various information (e.g., Prefix-SIDs, Adjacency-SIDs, capabilities, label bindings, label ranges, or the like, as well as various combinations thereof), may be based on various protocols (e.g., IS-IS, OSPF, OSPFv3, BGP-LS, LDP, RSVP-TE, BGP, or the like, as well as various combinations thereof), or the like, as well as various combinations thereof. At block 1220, the control plane information is sent toward one or more network elements. The control plane information may be sent using various control planes (e.g., an SR control plane, signaling in the MPLS control plane, or the like), protocols (e.g., IS-IS, OSPF, OSPFv3, BGP-LS, LDP, RSVP-TE, BGP, or the like, as well as various combinations thereof), or the like, as well as various combinations thereof. At block 1299, method 1200 ends.

Figure 13:
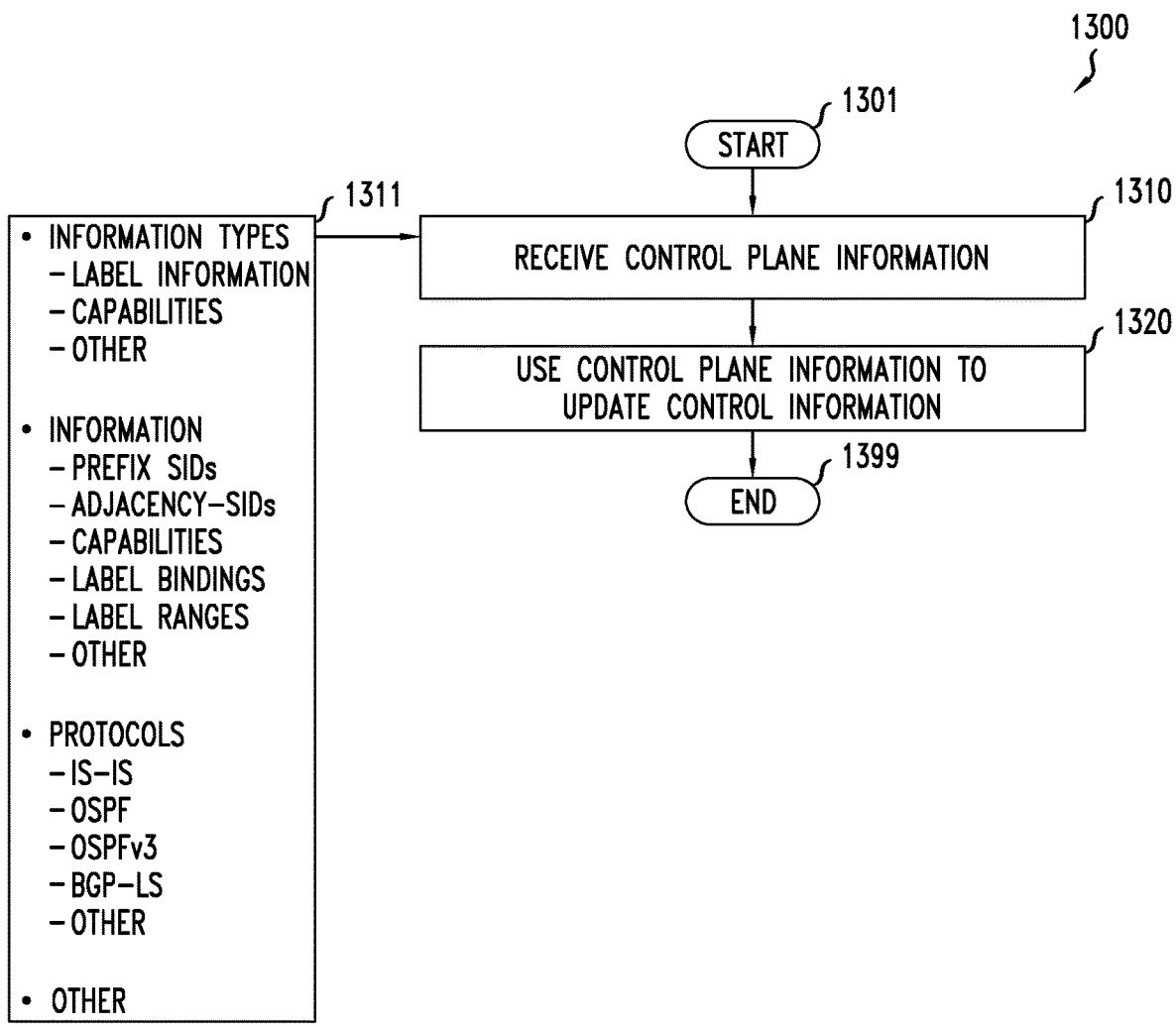
FIG. 13 depicts an example embodiment of a method for use by a network element to receive and use control plane information for supporting use of Flexi-MPLS.

FIG. 13 depicts an example embodiment of a method for use by a network element to receive and use control plane information for supporting use of Flexi-MPLS. It will be appreciated that, although primarily presented as being performed serially, at least a portion of the functions of method 1300 may be performed contemporaneously or in a different order than as presented in FIG. 13. At block 1301, method 1300 begins. At block 1310, control plane information is received. As indicated at block 1311, the control plane information may include various information types (e.g., label mappings, capabilities, or the like, as well as various combinations thereof), may include various information (e.g., Prefix-SIDs, Adjacency-SIDs, capabilities, label bindings, label ranges, or the like, as well as various combinations thereof), may be based on various protocols (e.g., IS-IS, OSPF, OSPFv3, BGP-LS, LDP, RSVP-TE, BGP, or the like, as well as various combinations thereof), or the like, as well as various combinations thereof. The control plane information may be received using various control planes (e.g., an SR control plane, signaling in the MPLS control plane, or the like), protocols (e.g., IS-IS, OSPF, OSPFv3, BGP-LS, LDP, RSVP-TE, BGP, or the like, as well as various combinations thereof), or the like, as well as various combinations thereof. At block 1320, the control plane information is used to update control information (e.g., control information in the data plane of the network element, control information in the control plane of the network element, or the like, as well as various combinations thereof) at the network element. The updating of the control information enables use of Flexi-MPLS by the network element. At block 1399, method 1300 ends.

Various example embodiments for supporting packet forwarding in label switched packet networks are configured to support use of OAM capabilities for connectivity verification and fault isolation in Flexi-MPLS.

It will be appreciated that, although primarily presented herein within the context of embodiments in which support for packet forwarding in label switched packet networks based on used of variable-sized label value fields is provided within the context of MPLS (at least some embodiments of which are referred to herein as Flexi-MPLS), various embodiments supporting packet forwarding in label switched packet networks based on used of variable-sized label value fields may be provided within various other contexts (e.g., in label switched packet networks using other label switching protocols, in other types of networks using labels for forwarding of packets in the data plane, or the like). In at least some embodiments, support for packet forwarding based on label values transported using variable-sized label value fields may be provided for any label value that identifies the context of forwarding a packet in the data plane (which may be referred to herein as a forwarding context of the label value that identifies the context of forwarding a packet in the data plane). In MPLS, for example, the forwarding context typically is referred to as a FEC, where a FEC may be any object to which a label value (e.g., a Flexi-MPLS label value in various embodiments herein) may be assigned (e.g., an adjacency/next-hop between directly connected routers (which is called a Adjacency-Segment-Id in SR), a routable prefix (which is called a Prefix-Segment-Id in SR), a VPN instance, a VPRN instance, a VPLS instance, a PW, an IGP area, an AS, or the like, as well as various combinations thereof). It will be appreciated that, in other protocols (which, as indicated above, may be at other layers of the communication protocol stack), the forwarding context for a label value may represent other objects to which the label value may be assigned. Accordingly, in various example embodiments, various MPLS-specific terms used herein may be referred to more generally (e.g., a Flexi-MPLS label space may be referred to more generally as a Flexi-label space, a Flexi-MPLS label may be referred to more generally as a Flexi-label, a Flexi-MPLS label value may be referred to herein as a Flexi-label value, or the like, as well as various combinations thereof).

Figure 14:
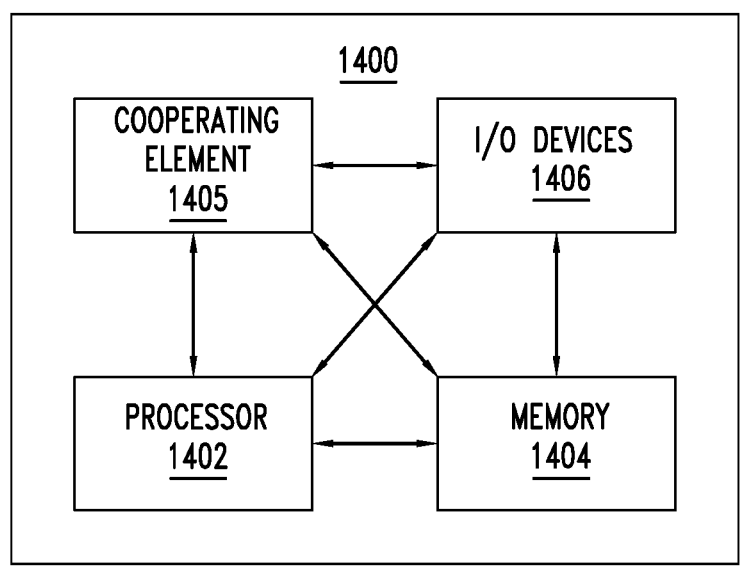
FIG. 14 depicts a high-level block diagram of a computer suitable for use in performing various functions presented herein.

FIG. 14 depicts a high-level block diagram of a computer suitable for use in performing various functions described herein.

The computer 1400 includes a processor 1402 (e.g., a central processing unit (CPU), a processor having a set of processor cores, a processor core of a processor, or the like) and a memory 1404 (e.g., a random access memory (RAM), a read only memory (ROM), or the like). The processor 1402 and the memory 1404 may be communicatively connected.

The computer 1400 also may include a cooperating element 1405. The cooperating element 1405 may be a hardware device. The cooperating element 1405 may be a process that can be loaded into the memory 1404 and executed by the processor 1402 to implement functions as discussed herein (in which case, for example, the cooperating element 1405 (including associated data structures) can be stored on a non-transitory computer-readable storage medium, such as a storage device or other storage element (e.g., a magnetic drive, an optical drive, or the like)).

The computer 1400 also may include one or more input/output devices 1406. The input/output devices 1406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1400 of FIG. 14 may represent a general architecture and functionality suitable for implementing functional elements described herein, portions of functional elements described herein, or the like, as well as various combinations thereof. For example, computer 1400 may provide a general architecture and functionality that is suitable for implementing one or more elements presented herein.

It will be appreciated that various functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that various functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    at least one processor; and
    at least one memory including program code;
    wherein the at least one memory and the program code are configured to, with the at least one processor, cause the apparatus to at least:
        handle a label switched packet including a header and a payload, wherein the header includes a label value field encoding a label value, wherein a size of the label value field is based on the label value, wherein the label value is encoded in the label value field using a set of label units, wherein a quantity of label units used to encode the label value in the label value field is based on the label value.

2. The apparatus of claim 1, wherein the label value is associated with a forwarding context.

3. The apparatus of claim 1, wherein the size of the label value field is a first size when the label value is within a first range of values, the size of the label value field is a second size when the label value is within a second range of values, or the size of the label value field is a third size when the label value is within a third range of values.

4. The apparatus of claim 3, wherein the first range of values is 1 to 127, the second range of values is 128 to 16383, and the third range of values is 16384 to 2097151.

5. The apparatus according to claim 1, wherein the quantity of label units used to encode the label value in the label value field is one label unit when the label value is within a first range of values, two label units when the label value is within a second range of values, or three label units when the label value is within a third range of values.

6. The apparatus of claim 5, wherein the first range of values is 1 to 127, the second range of values is 128 to 16383, and the third range of values is 16384 to 2097151.

7. The apparatus of claim 1, wherein each of the label units in the set of label units includes a value field configured to encode at least a portion of the label value and a size indicator field configured to indicate whether the respective label unit is a last label unit in the set of label units.

8. The apparatus of claim 7, wherein the value field is a 7-bit field and the size indicator field is a 1-bit field.

9. The apparatus of claim 1, wherein the header includes a common header portion and a label stack, wherein the label value field is included within the label stack.

10. The apparatus of claim 9, wherein the common header portion includes:
a field configured to indicate a length of the label stack; and
a field configured to indicate whether an additional label is present below the label stack.

11. The apparatus of claim 1, wherein the header includes a label having a fixed-sized label value field encoding an additional label value.

12. The apparatus of claim 1, wherein, to handle the label switched packet, the at least one memory and the program code are configured to, with the at least one processor, cause the apparatus to at least:
generate the header including the label value field;
associate the header with the payload to form thereby the label switched packet; and
send the label switched packet toward a network element.

13. The apparatus of claim 1, wherein, to handle the label switched packet, the at least one memory and the program code are configured to, with the at least one processor, cause the apparatus to at least:
receive the label switched packet;
process the label switched packet based on the header of the label switched packet; and
send the label switched packet toward a network element.

14. The apparatus of claim 1, wherein, to handle the label switched packet, the at least one memory and the program code are configured to, with the at least one processor, cause the apparatus to at least:
receive the label switched packet;
process the label switched packet based on the header of the label switched packet; and
send the payload of the label switched packet toward a network element.

15. The apparatus of claim 1, wherein, to handle the label switched packet, the at least one memory and the program code are configured to, with the at least one processor, cause the apparatus to at least:
encode the label value within the label value field or decode the label value from the label value field.

16. The apparatus of claim 1, wherein the at least one memory and the program code are configured to, with the at least one processor, cause the apparatus to at least:
support advertisement of control plane information configured to support use of variable-sized label value fields.

17. The apparatus of claim 16, wherein the control plane information includes at least one of a capability of the apparatus to support use of variable-sized label value fields or label information associated with use of variable-sized label value fields.

18. The apparatus of claim 16, wherein the control plane information is advertised using at least one of a segment routing control plane or a label switching control plane.

19. A non-transitory computer-readable storage medium storing instructions configured to cause an apparatus to at least:
handle a label switched packet including a header and a payload, wherein the header includes a label value field encoding a label value, wherein a size of the label value field is based on the label value, wherein the label value is encoded in the label value field using a set of label units, wherein a quantity of label units used to encode the label value in the label value field is based on the label value.

20. A method, comprising:
handling a label switched packet including a header and a payload, wherein the header includes a label value field encoding a label value, wherein a size of the label value field is based on the label value, wherein the label value is encoded in the label value field using a set of label units, wherein a quantity of label units used to encode the label value in the label value field is based on the label value.

* * * * *